United States Patent
Lee

(10) Patent No.: US 9,817,717 B2
(45) Date of Patent: Nov. 14, 2017

(54) STRIPE RECONSTITUTING METHOD PERFORMED IN STORAGE SYSTEM, METHOD OF PERFORMING GARBAGE COLLECTION BY USING THE STRIPE RECONSTITUTING METHOD, AND STORAGE SYSTEM PERFORMING THE STRIPE RECONSTITUTING METHOD

(71) Applicant: Ju-Pyung Lee, Incheon (KR)

(72) Inventor: Ju-Pyung Lee, Incheon (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 73 days.

(21) Appl. No.: 14/968,472

(22) Filed: Dec. 14, 2015

(65) Prior Publication Data

US 2016/0188410 A1    Jun. 30, 2016

(30) Foreign Application Priority Data

Dec. 29, 2014    (KR) .................. 10-2014-0192551

(51) Int. Cl.
G06F 11/00    (2006.01)
G06F 11/10    (2006.01)

(52) U.S. Cl.
CPC ...... *G06F 11/1088* (2013.01); *G06F 11/1044* (2013.01)

(58) Field of Classification Search
CPC .................................................. G06F 11/1088
USPC ............. 714/6.24, 6.23, 6.21, 6.2, 6.13, 6.11
See application file for complete search history.

(56) References Cited

U.S. PATENT DOCUMENTS

| | | | |
|---|---|---|---|
| 7,010,645 | B2 | 3/2006 | Hetzler et al. |
| 7,047,358 | B2 * | 5/2006 | Lee ............... G06F 11/1076 707/999.202 |
| 7,206,899 | B2 | 4/2007 | Schmisseur |
| 7,761,655 | B2 | 7/2010 | Mizushima et al. |
| 8,130,554 | B1 | 3/2012 | Linnell |
| 8,554,988 | B2 | 10/2013 | Kitahara |
| 8,713,268 | B2 | 4/2014 | Dillow et al. |
| 8,719,501 | B2 | 5/2014 | Flynn et al. |
| 2003/0037281 | A1 | 2/2003 | Hitz et al. |
| 2010/0100664 | A1 | 4/2010 | Shimozono |

(Continued)

FOREIGN PATENT DOCUMENTS

| | | |
|---|---|---|
| JP | 06-266510 | 9/1994 |
| KR | 1020130092482 A | 8/2013 |

OTHER PUBLICATIONS

Tzi-cker Chiueh et al., "Software Orchestrated Flash Array", ACM SYSTOR'14, Jun. 10-12, 2014, Haifa, Israel, pp. 1-11.

*Primary Examiner* — Dieu-Minh Le
(74) *Attorney, Agent, or Firm* — Volentine & Whitt, PLLC

(57) ABSTRACT

A stripe reconstituting method in a storage system, a garbage collection method employing the stripe reconstituting method, and the storage system performing the stripe reconstituting method are provided. The stripe reconstituting method includes the operations of selecting a target stripe in which an imbalance between valid page ratios of memory blocks included in the target stripe exceeds an initially-set threshold value, from among stripes produced in a log-structured storage system; and reconstituting a stripe by regrouping the memory blocks included in the target stripe such that the imbalance between the valid page ratios of the memory blocks included in the target stripe is reduced.

20 Claims, 57 Drawing Sheets

(56) References Cited

U.S. PATENT DOCUMENTS

| | | |
|---|---|---|
| 2010/0138672 A1 | 6/2010 | Horie et al. |
| 2010/0306452 A1 | 12/2010 | Weber et al. |
| 2010/0325351 A1* | 12/2010 | Bennett ............... G06F 12/0246 711/103 |
| 2011/0271039 A1 | 11/2011 | Baek et al. |
| 2012/0151124 A1* | 6/2012 | Baek ................... G06F 12/0246 711/103 |
| 2013/0227346 A1* | 8/2013 | Lee ..................... G06F 11/1076 714/6.24 |
| 2014/0025887 A1 | 1/2014 | Kim et al. |
| 2014/0108713 A1 | 4/2014 | Yamamoto et al. |
| 2014/0189202 A1 | 7/2014 | Hosaka |
| 2014/0380092 A1 | 12/2014 | Kim et al. |

* cited by examiner

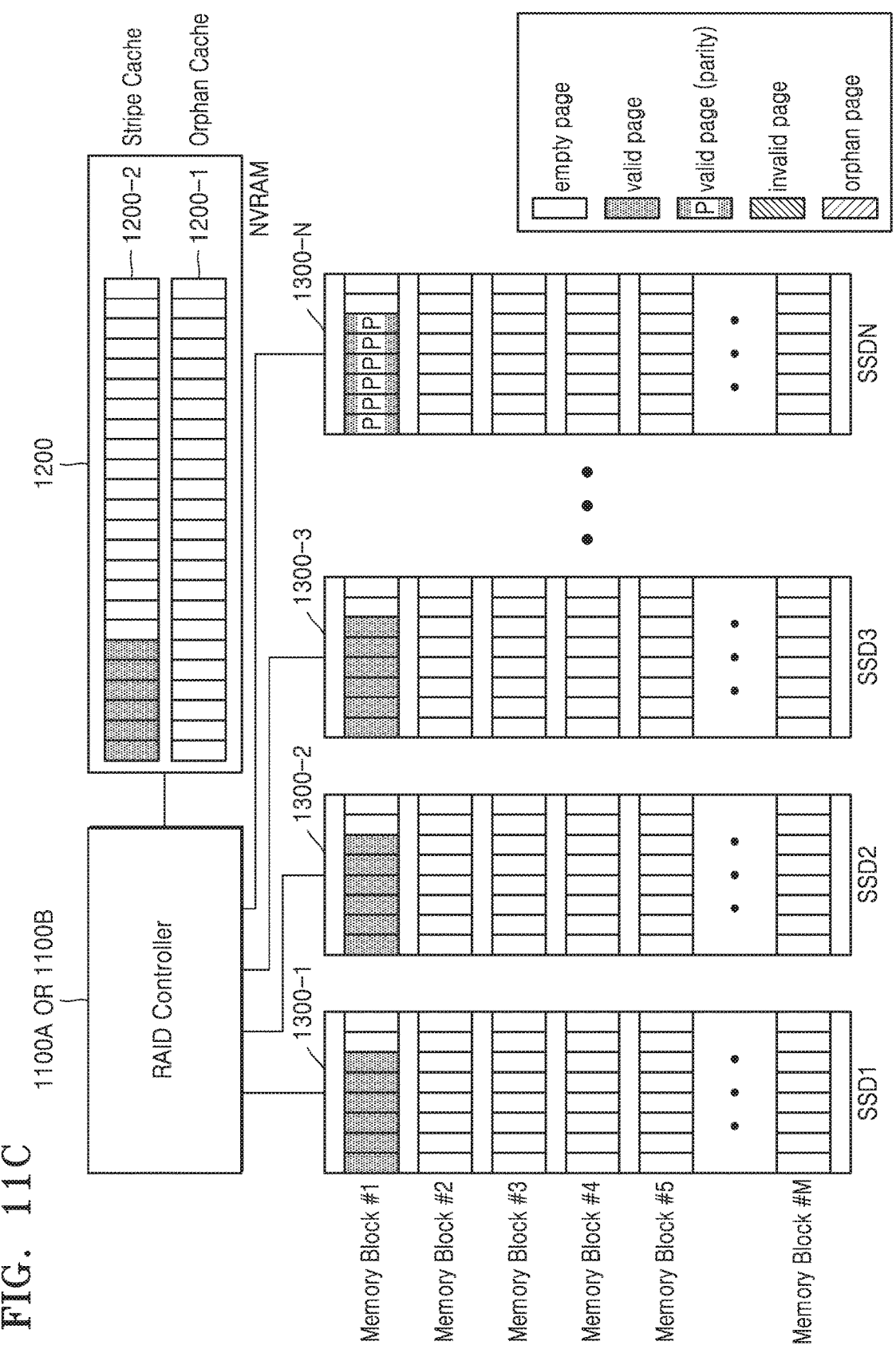

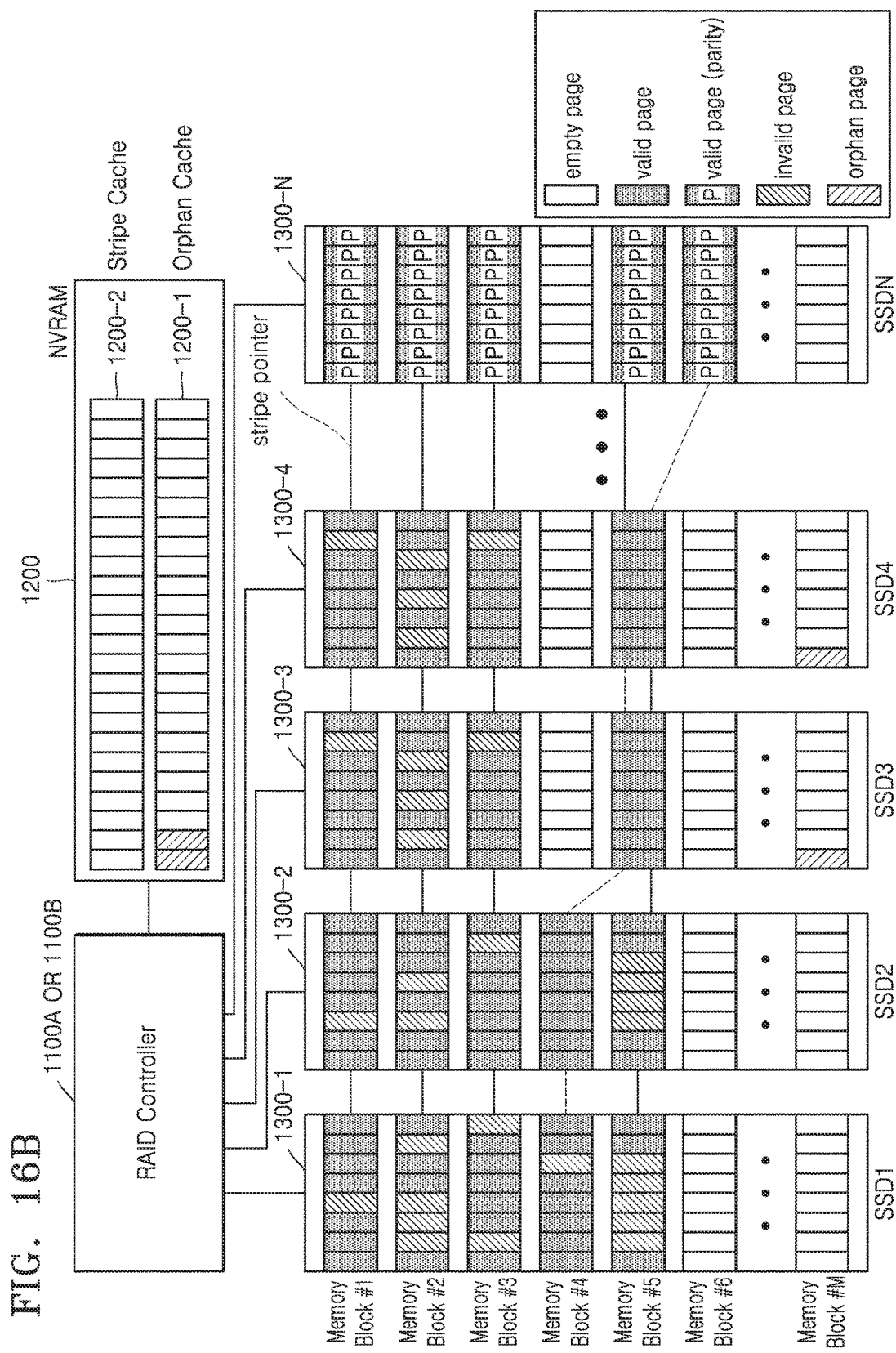

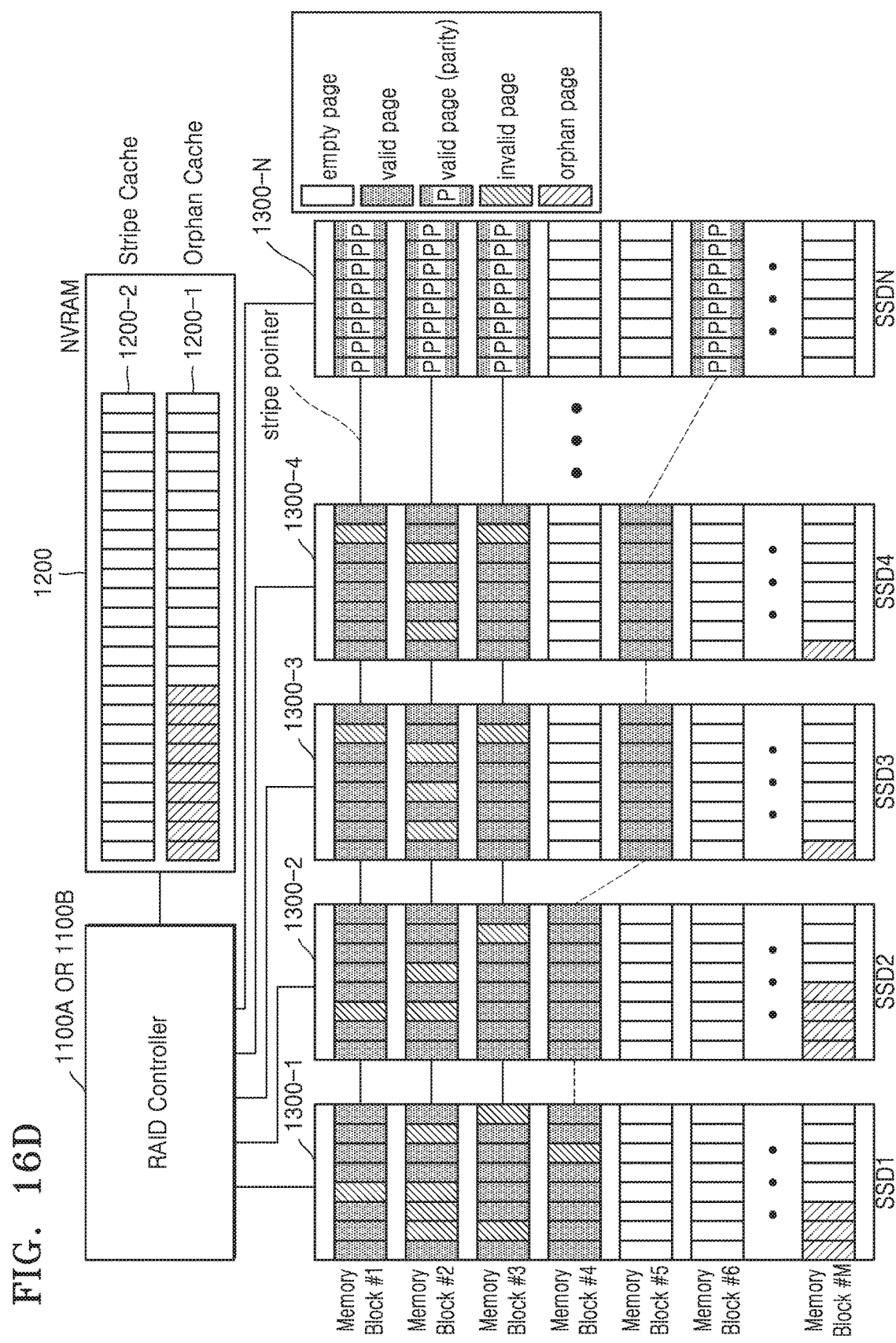

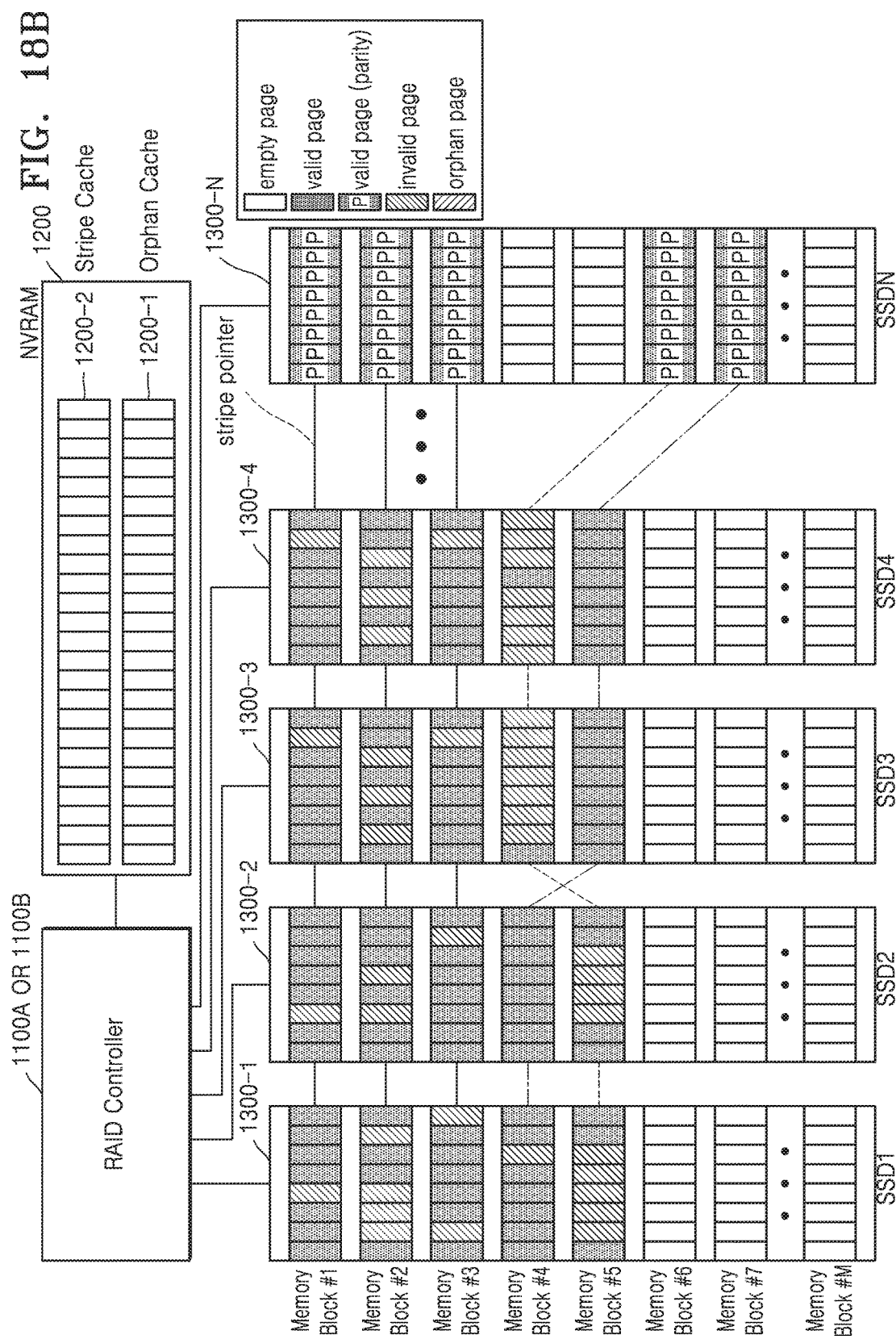

STRIPE RECONSTITUTING METHOD PERFORMED IN STORAGE SYSTEM, METHOD OF PERFORMING GARBAGE COLLECTION BY USING THE STRIPE RECONSTITUTING METHOD, AND STORAGE SYSTEM PERFORMING THE STRIPE RECONSTITUTING METHOD

CROSS-REFERENCE TO RELATED APPLICATIONS

This application claims the benefit of Korean Patent Application No. 10-2014-0192551, filed on Dec. 29, 2014, in the Korean Intellectual Property Office, the disclosure of which is incorporated herein in its entirety by reference.

BACKGROUND

The disclosure relates to a method and apparatus for processing data in a storage system, and more particularly, to a stripe reconstituting method performed in a storage system, a method of performing garbage collection by using the stripe reconstituting method, and the storage system performing the stripe reconstituting method.

A redundant array of independent disks (RAID) is technology for distributing and storing data in a plurality of hard disk devices. Due to technical developments, solid state drives (SSDs) are used instead of hard disk drives (HDDs). Research into ensuring data reliability even if there is a defect in some of the SSDs configuring a storage system, to which the RAID technology is applied, and reducing a write amplification factor (WAF) during, for example, garbage collection, is required.

SUMMARY

The disclosure provides a stripe reconstituting method performed in a storage system in order to reduce the number of valid page copying operations performed in a storage device during garbage collection.

The disclosure also provides a method of performing garbage collection in a storage system by applying stripe constitution that enables an imbalance between valid page ratios of memory blocks included in a stripe to be reduced.

The disclosure also provides a storage system which reconstitutes stripes so that an imbalance between valid page ratios of memory blocks included in a stripe is reduced.

According to an aspect of the disclosure, there is provided a stripe reconstituting method in a log-structured storage system, the stripe reconstituting method including selecting a target stripe in which an imbalance between valid page ratios of memory blocks included in the target stripe exceeds an initially-set threshold value, from among stripes produced in the log-structured storage system; and reconstituting a stripe by regrouping the memory blocks included in the target stripe such that the imbalance between the valid page ratios of the memory blocks included in the target stripe is reduced.

According to another aspect of the disclosure, there is provided a storage system including a plurality of storage devices (SDs) comprising memory blocks for storing data; a main memory which stores a stripe mapping table comprising information about a constitution of stripes; and a controller which controls the plurality of SDs based on a log-structured storage environment. The controller searches for a target stripe in which an imbalance between the valid page ratios of memory blocks included in the target stripe exceeds an initially-set threshold value, from stripes registered in the stripe mapping table, reconstitutes a stripe by regrouping the memory blocks included in a found target stripe in order to reduce the imbalance between the valid page ratios of the memory blocks included in the found target stripe, and updates the stripe mapping table based on the reconstituted stripe.

According to another aspect of the disclosure, there is provided a garbage collection method including selecting a target stripe in which an imbalance between valid page ratios of memory blocks included in the target stripe exceeds an initially-set threshold value, from among stripes produced in a log-structured storage system; reconstituting a stripe by regrouping the memory blocks included in the target stripe such that the imbalance between the valid page ratios of the memory blocks included in the target stripe is reduced; and performing garbage collection with respect to at least one memory block excluded from the stripe reconstitution from among the memory blocks included in the target stripe.

According to another aspect of the disclosure, there is provided a stripe creation method executed by a processor of a memory controller in a log-structured storage system. The method includes identifying, among multiple stripes that each comprises first and second memory blocks, a stripe having a difference of valid-to-invalid page ratios between the first and second memory blocks exceeding a threshold value. A new stripe is created having first and second memory blocks including one or more valid pages of the identified stripe's first memory block.

BRIEF DESCRIPTION OF THE DRAWINGS

Exemplary embodiments of the disclosure will be more clearly understood from the following detailed description taken in conjunction with the accompanying drawings in which:

FIGS. 11A-11D are conceptual diagrams illustrating a data storing process in an example of writing data to SDs in units of pages in a storage system according to an exemplary embodiment of the disclosure;

FIGS. 16A-16D illustrate an example of a stripe reconstituting operation performed in a storage system according to an exemplary embodiment of the disclosure;

FIGS. 18A and 18B illustrate another example of a stripe reconstituting operation performed in a storage system according to an exemplary embodiment of the disclosure;

DETAILED DESCRIPTION OF THE EMBODIMENTS

Figure 1:
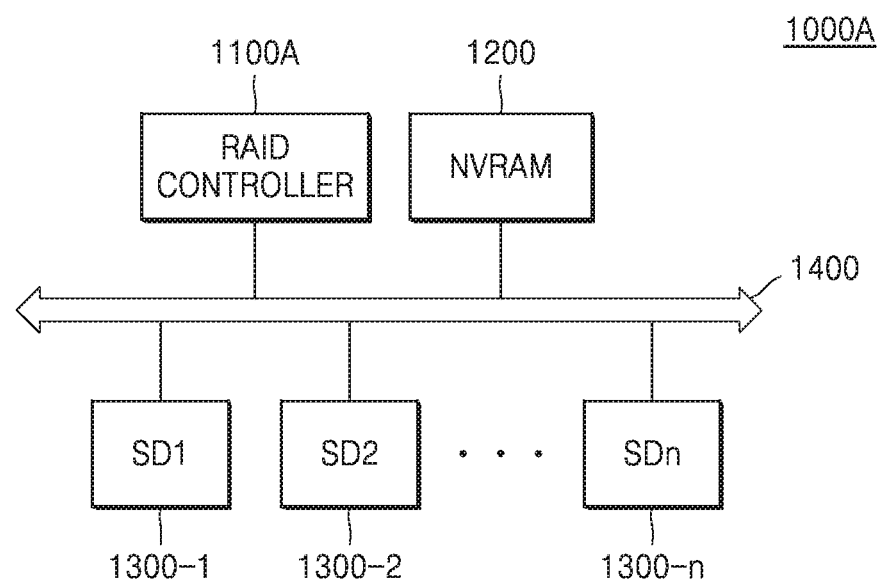
FIG. 1 is a block diagram of a storage system according to an exemplary embodiment of the disclosure.

Hereinafter, the disclosure will be described more fully with reference to the accompanying drawings, in which exemplary embodiments of the disclosure are shown. These embodiments are provided so that this disclosure will be thorough and complete, and will fully convey the scope of the disclosure to one of ordinary skill in the art. As the disclosure allows for various changes and numerous embodiments, particular exemplary embodiments will be illustrated in the drawings and described in detail in the written description. However, this is not intended to limit the disclosure to particular modes of practice, and it is to be appreciated that all changes, equivalents, and substitutes that do not depart from the spirit and technical scope of the disclosure are encompassed in the disclosure. In the drawings, like reference numerals denote like elements and the sizes or thicknesses of elements may be exaggerated for clarity of explanation.

The terms used in the present specification are merely used to describe particular exemplary embodiments, and are not intended to limit the disclosure. An expression used in the singular encompasses the expression in the plural, unless it has a clearly different meaning in the context. In the present specification, it is to be understood that the terms such as "including", "having", etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Unless defined differently, all terms used in the description including technical and scientific terms have the same meaning as generally understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Herein, for convenience of explanation, a storage system according to the disclosure is described as a redundant array of independent disks (RAID) storage system. However, the storage system according to the disclosure may be any of various types of storage systems without being limited to a RAID storage system. The term "RAID controller" used herein may also be indicated as "controller".

FIG. 1 is a block diagram of a storage system 1000A according to an exemplary embodiment of the disclosure.

Referring to FIG. 1, the storage system 1000A includes a RAID controller 1100A, a non-volatile random access memory (NVRAM) 1200, a plurality of storage devices (SDs), namely, first through n-th SDs 1300-1 through 1300-n, and a bus 1400. The components of the storage system 1000A are electrically connected to each other via the bus 1400.

Examples of a RAID method include a method of restoring data by using a mirroring-based technique and a method of restoring data by using a parity-based technique, in order to prevent data loss when some storage devices are defective. For example, the storage system 1000A may employ a parity-based RAID method.

The first through n-th SDs 1300-1 through 1300-n may be implemented by using solid state drives (SSDs) or hard disk drives (HDDs). According to exemplary embodiments of the disclosure, the first through n-th SDs 1300-1 through 1300-n are SSDs. SSDs implement storage devices by using a plurality of non-volatile memory chips. For example, SSDs may implement storage devices by using a plurality of flash memory chips.

The NVRAM 1200 is RAM in which stored data is retained if power is removed. The NVRAM 1200 functions as a main memory. For example, the NVRAM 1200 may be implemented by using phase change RAM (PRAM), ferroelectric RAM (FeRAM), or magnetic RAM (MRAM). An another example, the NVRAM 1200 may be implemented according to a method of applying power to dynamic RAM (DRAM) or static RAM (SRAM), which is volatile memory, by using a battery or a capacitor. According to this method, even when system power is removed, data stored in the DRAM or SRAM may be retained.

The NVRAM 1200 may include a cache that stores data, which is temporarily not protected by parity information, during a garbage collection operation. The data that is temporarily not protected by parity information is referred to as orphan data. A cache allocated to the NVRAM 1200 for storing orphan data is referred to as an orphan cache.

For example, a cache for storing data that is to be written in units of stripes to the first through n-th SDs 1300-1 through 1300-n may be allocated to the NVRAM 1200. The cache allocated to the NVRAM 1200 for storing data that is to be written in units of stripes is referred to as a stripe cache.

For example, the NVRAM 1200 may store mapping table information that is used in the storage system 1000A. The mapping table information includes an address mapping table which converts a logical address to a physical address, and a stripe mapping table which represents information about stripe grouping. The information about stripe grouping may include information representing memory blocks that constitute each stripe. The stripe mapping table may include valid page ratio information of each stripe.

For example, the address mapping table may store a physical address of an SD that corresponds to a logical address. In detail, the address mapping table may store a number of an SD corresponding to a logical address and a physical address of the SD.

The RAID controller 1100A controls the first through n-th SDs 1300-1 through 1300-n, based on a log-structured RAID environment. In detail, when updating data stored in the first through n-th SDs 1300-1 through 1300-n, the RAID controller 1100A controls the storage system 1000A not to overwrite data but instead write data to a new location according to a log format. For example, a plurality of memory blocks to which data is written in the log format and a memory block that stores parity information about the data written to the plurality of memory blocks constitute one stripe.

The RAID controller 1100A registers pieces of location information of memory blocks of the first through n-th SDs 1300-1 through 1300-n, which constitute a stripe, in the stripe mapping table.

The RAID controller 1100A may perform address conversion or stripe grouping by using the mapping table information stored in the NVRAM 1200. In detail, the RAID controller 1100A converts a logical address to a physical address by using the address mapping table. The RAID controller 1100A performs garbage collection in units of stripes by using the stripe mapping table.

The RAID controller 1100A selects a victim stripe for garbage collection by using the mapping table information. For example, the RAID controller 1100A may search for, as the victim stripe, a stripe having a lowest valid page ratio from among a plurality of stripes by using the stripe mapping table.

The RAID controller 1100A copies, into the NVRAM 1200, valid pages of the first through n-th SDs 1300-1 through 1300-n that are included in the victim stripe for garbage collection, and controls a garbage collection operation by using data corresponding to the valid pages copied into the NVRAM 1200. In detail, the RAID controller 1100A copies, into the orphan cache of the NVRAM 1200, the valid pages of the first through n-th SDs 1300-1 through 1300-n that are included in the victim stripe for garbage collection.

The RAID controller 1100A erases a memory block of the victim stripe that stores parity information, copies the valid pages included in the victim stripe into memory blocks that are used to constitute a new stripe, and erases memory blocks of the victim stripe that have stored the valid pages copied into the memory blocks that are used to constitute the new stripe.

The RAID controller 1100A calculates parity information about pieces of data copied into the orphan cache of the NVRAM 1200 and copies the calculated parity information into a memory block that is used to constitute the new stripe.

The RAID controller 1100A registers stripe grouping information, regarding a constitution of a new stripe, with the memory blocks into which the valid pages included in the victim stripe have been copied and the memory block into which the parity information has been copied in the stripe mapping table. The RAID controller 1100A deletes stripe grouping information about the victim stripe from the stripe mapping table. Accordingly, the memory blocks included in the victim stripe become free blocks. A free block denotes an empty memory block in which data is not stored.

After erasing the memory block that is included in the victim stripe and in which the parity information is stored, during a garbage collection operation of the storage system 1000A, the valid pages written to the memory blocks included in the victim stripe can no longer be protected by the parity information. In other words, if there is a defect in some of the first through n-th SDs 1300-1 through 1300-n, the valid pages written to the memory blocks of the defective SDs in the victim stripe are unable to have incorrect data restored using the parity information, because this parity information has been erased.

According to an exemplary embodiment of the disclosure, since the valid pages of the first through n-th SDs 1300-1 through 1300-n included in the victim stripe are stored in the orphan cache of the NVRAM 1200, even if some of the first through n-th SDs 1300-1 through 1300-n have defects, the valid pages written to the memory blocks of the SDs having defects may be restored by the data stored in the orphan cache of the NVRAM 1200.

When a request to read the pages included in the victim stripe occurs during the garbage collection operation, the RAID controller 1100A reads data corresponding to the pages requested to be read from the orphan cache of the NVRAM 1200.

For example, when a request to read the pages included in the victim stripe is transmitted from an external host (not shown) to the storage system 1000A during the garbage collection operation, the RAID controller 1100A may read the data corresponding to the pages requested to be read from the orphan cache of the NVRAM 1200 and transmit the read data to the external host.

The RAID controller 1100A may control the storage system 1000A according to the flowcharts of FIGS. 36-48, in order to perform stripe reconstitution and garbage collection.

In detail, the RAID controller 1100A may perform a stripe reconstituting process for reducing an imbalance between respective valid page ratios of the memory blocks included in a stripe, as described below.

The RAID controller 1100A searches for a target stripe in which the imbalance between the valid page ratios of the memory blocks included therein exceeds an initially-set threshold value, from the stripes registered in the stripe mapping table. The RAID controller 1100A regroups the memory blocks included in the found target stripe in order to reduce the imbalance between the valid page ratios of the memory blocks included in the found target stripe and updates the stripe mapping table by using the regrouped memory blocks.

For example, the RAID controller 1100A may change a stripe constitution in the stripe mapping table such that at least one target memory block having a low valid page ratio, from among the memory blocks included in the target stripe, is replaced by a memory block having a higher valid page ratio than the at least one target memory block, from among memory blocks included in another stripe.

As another example, the RAID controller 1100A may change stripe a constitution in the stripe mapping table such that at least one target memory block having a relatively low valid page ratio, from among the memory blocks included in the target stripe, is excluded from the target stripe.

As another example, the RAID controller 1100A may search for another target stripe in which a memory block having a relatively high valid page ratio does not overlap a memory block having a relatively high valid page ratio from among the memory blocks included in the target stripe and a change stripe constitution in the stripe mapping table such that a new stripe comprised of memory blocks having low valid page ratios and another new stripe comprised of memory blocks having high valid page ratios are generated by exchanging memory blocks between the two target stripes.

As another example, the RAID controller 1100A may search for another target stripe in which a memory block having a relatively high valid page ratio does not overlap a memory block having a relatively high valid page ratio from among the memory blocks included in the target stripe, change a stripe constitution in the stripe mapping table such that a new stripe comprised of memory blocks having relatively high valid page ratios is generated by exchanging memory blocks between the two target stripes, and perform garbage collection with respect to memory blocks not included in the new stripe from among the memory blocks included in the two target stripes.

The RAID controller 1100A may control the components of the storage system 1000A to perform the operations of the flowcharts of FIGS. 36-48.

Figure 2:
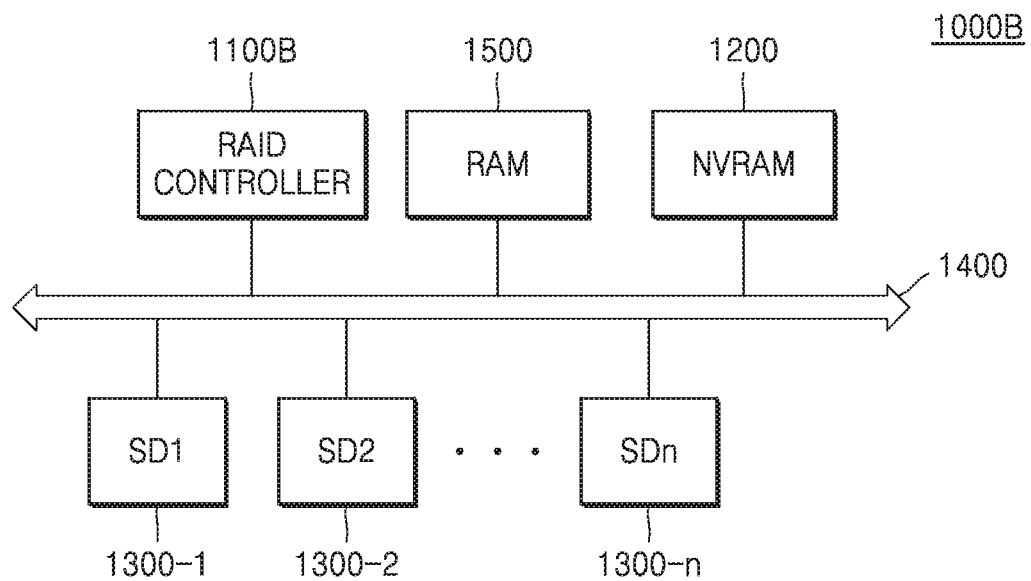
FIG. 2 is a block diagram of a storage system according to another exemplary embodiment of the disclosure.

FIG. 2 is a block diagram of a storage system 1000B according to another exemplary embodiment of the disclosure.

Referring to FIG. 2, the storage system 1000B includes a RAID controller 1100B, an NVRAM 1200, a plurality of SDs, namely, first through n-th SDs 1300-1 through 1300-n, a bus 1400, and a RAM 1500. The components of the storage system 1000B are electrically connected to each other via the bus 1400.

The NVRAM 1200, the first through n-th SDs 1300-1 to 1300-n, and the bus 1400 of FIG. 2 have already been described above with reference to FIG. 1, and thus, detailed descriptions thereof will be omitted here.

The storage system 1000B may additionally include the RAM 1500, unlike the storage system 1000A of FIG. 1.

The RAM 1500 is a volatile memory, and may be DRAM or SRAM. The RAM 1500 functions as a main memory. The RAM 1500 may store information or program codes necessary for operating the storage system 1000B.

Accordingly, the RAM 1500 may store the mapping table information. The mapping table information may include an address mapping table which converts a logical address to a physical address, and a stripe mapping table which represents information about stripe grouping. The stripe mapping table may include valid page ratio information of each stripe.

For example, the RAID controller 1100B may read the mapping table information from the NVRAM 1200 and may load the mapping table information into the RAM 1500. As another example, the RAID controller 1100B may read mapping table information from one of the first through n-th SDs 1300-1 to 1300-n and load the mapping table information into the RAM 1500.

The RAID controller 1100B may perform address conversion during a read operation or a write operation in the storage system 1000B by using the mapping table information loaded in the RAM 1500.

The RAID controller 1100B controls the first through n-th SDs 1300-1 through 1300-n, based on a log-structured RAID environment. In detail, when updating data stored in the first through n-th SDs 1300-1 through 1300-*n*, the RAID controller 1100B controls the storage system 1000B not to overwrite data but to instead write data to a new location according to a log format. For example, a plurality of memory blocks to which data is written in the log format and a memory block that stores parity information for the data written to the plurality of memory blocks constitute one stripe.

The RAID controller 1100B registers pieces of location information of memory blocks of the first through n-th SDs 1300-1 through 1300-*n*, which constitute a stripe, in the stripe mapping table.

The RAID controller 1100B may update the mapping table information stored in the RAM 1500 due to a write operation or a garbage collection operation and reflect the updated mapping table information in the mapping table information stored in the NVRAM 1200. For example, the updated mapping table information may be overwritten in the NVRAM 1200.

The RAID controller 1100B may perform address conversion or stripe grouping by using the mapping table information stored in the RAM 1500. In detail, the RAID controller 1100B converts a logical address to a physical address by using the address mapping table. The RAID controller 1100B performs garbage collection in units of stripes by using the stripe mapping table.

A garbage collection control operation which is performed by the RAID controller 1100B is the same as that of the RAID controller 1100A of FIG. 1, and thus, detailed descriptions thereof will be omitted here. Stripe reconstitution performed by the RAID controller 1100B in order to reduce an imbalance between the valid page ratios of the memory blocks included in a stripe is the same as that performed by the RAID controller 1100A, and thus detailed descriptions thereof will be omitted here.

Figure 3:
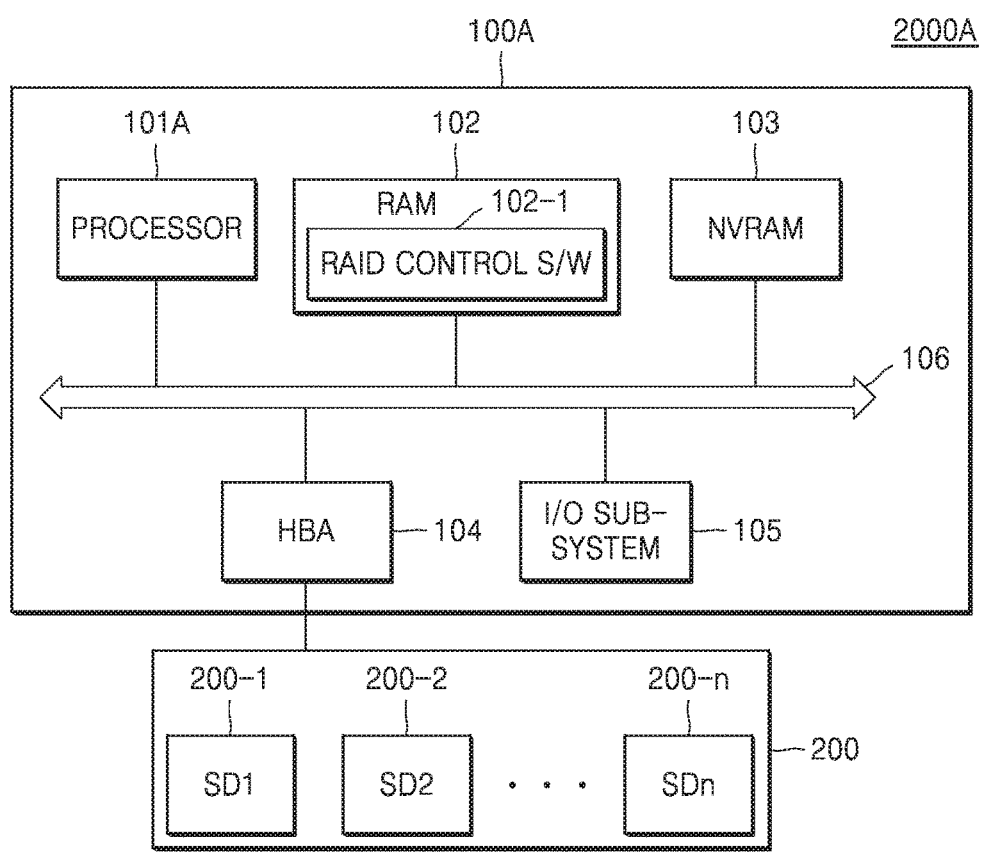
FIG. 3 is a block diagram of a storage system according to another exemplary embodiment of the disclosure.

FIG. 3 is a block diagram of a storage system 2000A according to another exemplary embodiment of the disclosure.

Referring to FIG. 3, the storage system 2000A may include a processor 101A, a RAM 102, an NVRAM 103, a host bus adaptor (HBA) 104, an input/output (I/O) sub-system 105, a bus 106, and storage devices 200.

In FIG. 3, a block including the processor 101A, the RAM 102, the NVRAM 103, the HBA 104, the I/O sub-system 105, and the bus 106 is a host 100A, and the devices 200 may be external devices connected to the host 100A.

For example, the storage system 2000A may be assumed to be a server. As another example, the storage system 2000A may be a personal computer (PC), a set-top-box, a digital camera, a navigation device, a mobile device, or the like. For example, the devices 200 that are connected to the host 100A may include first through n-th SDs 200-1 through 200-*n*.

The processor 101A may include a circuit, interfaces, or a program code for processing data and controlling operations of the components of the storage system 2000A. For example, the processor 101A may include a central processing unit (CPU), an advanced risk machine (ARM) processor, or an application specific integrated circuit (ASIC).

The RAM 102 is a volatile memory, and may include SRAM or DRAM, which stores data, commands, or program codes which are necessary for operations of the storage system 2000A. The RAM 102 functions as a main memory. The RAM 102 stores RAID control SW 102-1. The RAID control software 102-1 includes program codes for controlling the storage system 2000A according to a log-structured RAID method. For example, the RAID control software 102-1 may include program codes for performing a stripe reconstituting method and a garbage collection operation illustrated in the flowcharts of FIGS. 36-48.

The NVRAM 103 is RAM in which stored data is retained if power is removed. For example, the NVRAM 103 may be implemented by using PRAM, FeRAM, or MRAM. An another example, the NVRAM 103 may be implemented according to a method of applying power to DRAM or SRAM, which is volatile memory, by using a battery or a capacitor. According to this method, even when system power is removed, data stored in the DRAM or SRAM may be retained.

The NVRAM 103 may include a cache that stores data that is temporarily not protected by parity information during a garbage collection operation.

For example, a cache for storing data that is to be written in units of stripes to the first through n-th SDs 200-1 through 200-*n* may be allocated to the NVRAM 103.

For example, the NVRAM 103 may store mapping table information that is used in the storage system 2000A. The mapping table information includes an address mapping table which converts a logical address to a physical address and a stripe mapping table which represents information about stripe grouping. The stripe mapping table may include valid page ratio information of each stripe. For example, the address mapping table may store a physical address of an SD that corresponds to a logical address.

The processor 101A controls operations of the storage system 2000A according to the log-structured RAID method by using the program codes stored in the RAM 102. For example, the processor 101A drives the RAID control software 102-1 stored in the RAM 102 to perform the stripe reconstituting method and the garbage collection operation illustrated in FIGS. 36-48.

The HBA 104 connects the first through n-th SDs 200-1 through 200-*n* to the host 100A of the storage system 2000A. For example, the HBA 104 may include a small computer system interface (SCSI) adaptor, a fiber channel adaptor, a serial advanced technology attachment (ATA) adaptor, or the like. In detail, the HBA 104 may be directly connected to the first through n-th SDs 200-1 through 200-*n*, which are based on a fiber channel (FC) HBA. The HBA 104 may interface the host 100A with the first through n-th SDs 200-1 through 200-*n* by being connected to the first through n-th SDs 200-1 through 200-*n* in a storage area network (SAN) environment.

The I/O sub-system 105 may include a circuit, interfaces, or a program code capable of operating to perform data communication between the components of the storage system 2000A. The I/O sub-system 105 may include at least one standardized bus and at least one bus controller. Accordingly, the I/O sub-system 105 may recognize devices connected to the bus 106, list the devices connected to the bus 106, and allocate or deallocate resources for various devices connected to the bus 106. In other words, the I/O sub-system 105 may operate to manage communications on the bus 106. For example, the I/O sub-system 105 may be a peripheral component interconnect express (PCIe) system, and may include a PCIe root complex and at least one PCIe switch or bridge.

The first through n-th SDs 200-1 through 200-*n* may be implemented by using SSDs or HDDs. According to an exemplary embodiment of the disclosure, the first through n-th SDs 200-1 through 200-*n* are SSDs.

The processor 101A controls the first through n-th SDs 200-1 to 200-*n* connected via the HBA 104, based on the log-structured RAID environment. In detail, when data written to the first through n-th SDs 200-1 through 200-*n* is updated, the processor 101A controls the storage system 2000A to not overwrite data but instead write data to a new location in a log format. For example, a plurality of memory blocks to which data is written in the log format to the first through n-th SDs 200-1 to 200-*n* and a memory block that stores parity information about the data stored in the plurality of memory blocks constitute one stripe.

The processor 101A registers pieces of location information of memory blocks of the first through n-th SDs 200-1 through 200-*n*, which constitute a stripe, in the stripe mapping table.

The processor 101A may perform address conversion or stripe grouping by using the mapping table information stored in the NVRAM 103. In detail, the processor 101A converts a logical address to a physical address by using the address mapping table. The processor 101A performs garbage collection in units of stripes by using the stripe mapping table.

The processor 101A selects a victim stripe for garbage collection by using the mapping table information. For example, the processor 101A may search for a stripe having a lowest valid page ratio from among a plurality of stripes by using the stripe mapping table and select a found stripe as a victim stripe.

The processor 101A copies, into the NVRAM 103, valid pages of the first through n-th SDs 200-1 through 200-*n* that are included in the victim stripe for garbage collection and controls a garbage collection operation by using data copied into the NVRAM 103. In detail, the processor 101A copies, into an orphan cache of the NVRAM 103, the valid pages of the first through n-th SDs 200-1 through 200-*n* that are included in the victim stripe for garbage collection.

The processor 101A erases a memory block that is included in the victim stripe and stores parity information from among the respective memory blocks of the first through n-th SDs 200-1 through 200-*n*, copies the valid pages included in the victim stripe into memory blocks that are to constitute a new stripe, and erases the memory blocks of the victim stripe in which the valid pages copied into the memory blocks that are to constitute the new stripe were stored.

The processor 101A calculates parity information about pieces of data copied into the orphan cache of the NVRAM 103 and copies the calculated parity information into a new memory block that is used to constitute a stripe from among the respective memory blocks of the first through n-th SDs 200-1 through 200-*n*.

The processor 101A registers stripe grouping information regarding a constitution of a new stripe having the memory blocks into which the valid pages included in the victim stripe have been copied and the memory block into which the parity information has been copied, in the stripe mapping table. The processor 101A deletes the stripe grouping information about the victim stripe from the stripe mapping table. Accordingly, the memory blocks included in the victim stripe become free blocks.

After erasing the memory block that is included in the victim stripe and in which the parity information has been stored, during a garbage collection operation of the storage system 2000A, the valid pages written to the memory blocks included in the victim stripe of the first through n-th SDs 200-1 through 200-*n* may not be protected by the parity information. In other words, if there is a defect in some of the first through n-th SDs 200-1 through 200-*n*, the valid pages written to the memory blocks of the defective SDs in the victim stripe are unable to have the incorrect data restored using the parity information.

According to an exemplary embodiment of the disclosure, since the valid pages of the first through n-th SDs 200-1 through 200-*n* included in the victim stripe are stored in the orphan cache of the NVRAM 103, even if some of the first through n-th SDs 200-1 through 200-*n* have defects, the valid pages written to the memory blocks of the SDs having defects may be restored by the data stored in the orphan cache of the NVRAM 103.

When a request to read the pages included in the victim stripe occurs during the garbage collection operation, the processor 101A directly reads data corresponding to the pages requested to be read from the orphan cache of the NVRAM 103.

The processor 101A may perform a stripe reconstitution process for reducing an imbalance between valid page ratios of the memory blocks included in a stripe, as described below.

The processor 101A searches for a target stripe in which an imbalance between the valid page ratios of the memory blocks included therein exceeds an initially set threshold value, from among the stripes registered in the stripe mapping table, regroups the memory blocks included in the found target stripe so that the imbalance between the valid page ratios of the memory blocks included in the found target stripe is reduced, and updates the stripe mapping table by using the regrouped memory blocks.

For example, the processor 101A may change a stripe constitution in the stripe mapping table such that at least one target memory block having a low valid page ratio from among the memory blocks included in the target stripe is replaced by a memory block having a higher valid page ratio than the at least one target memory block from among memory blocks included in another stripe.

As another example, the processor 101A may change a stripe constitution in the stripe mapping table such that at least one target memory block having a low valid page ratio from among the memory blocks included in the target stripe is excluded from the target stripe.

As another example, the processor 101A may search for another target stripe in which a memory block having a relatively high valid page ratio does not overlap a memory block having a relatively high valid page ratio from among the memory blocks included in the target stripe and change a stripe constitution in the stripe mapping table such that a new stripe comprised of memory blocks having low valid page ratios and another new stripe comprised of memory blocks having high valid page ratios are generated by exchanging memory blocks between the two target stripes.

As another example, the processor 101A may search for another target stripe in which a memory block having a relatively high valid page ratio does not overlap a memory block having a relatively high valid page ratio from among the memory blocks included in the target stripe, change stripe constitution in the stripe mapping table such that a new stripe comprised of memory blocks having relatively high valid page ratios is generated by exchanging memory blocks between the two target stripes, and perform garbage collection with respect to memory blocks not included in the new stripe from among the memory blocks included in the two target stripes.

Figure 4:
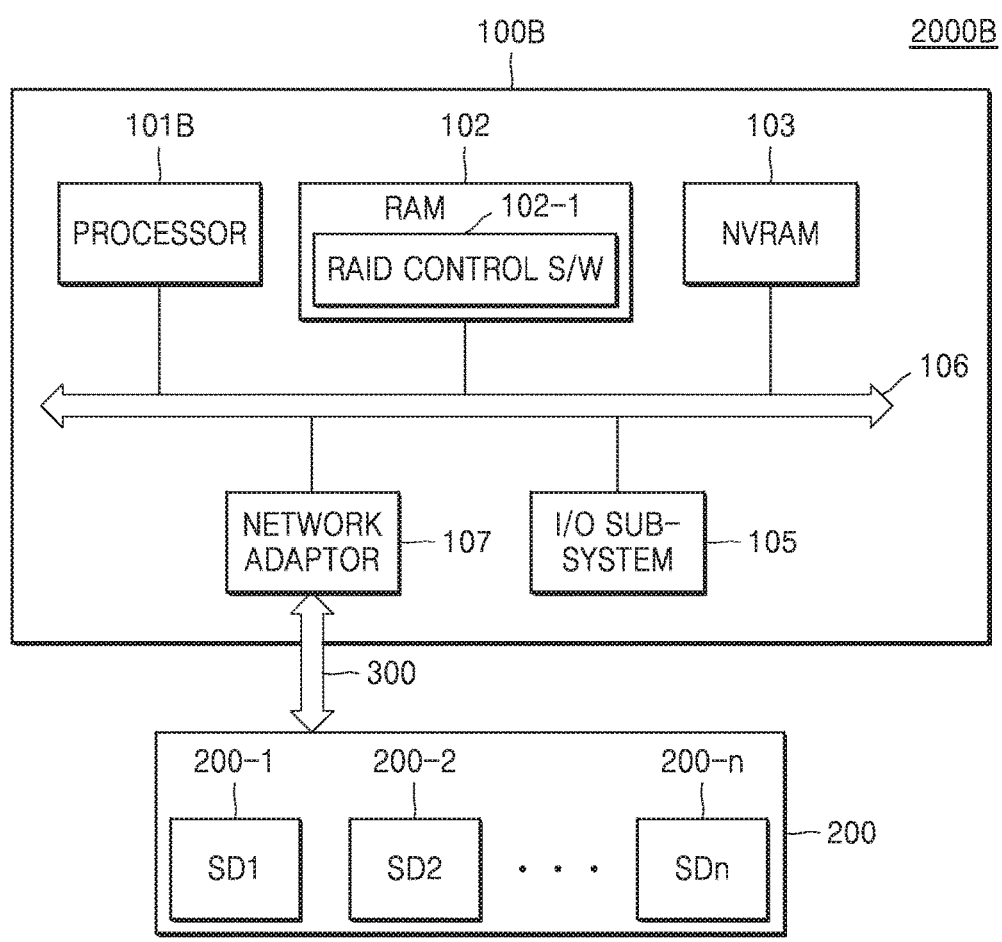
FIG. 4 is a block diagram of a storage system according to another exemplary embodiment of the disclosure.

FIG. 4 is a block diagram of a storage system 2000B according to another exemplary embodiment of the disclosure.

Referring to FIG. 4, the storage system 2000B includes a host 100B, storage devices 200, and a link unit 300.

The host 100B includes a processor 101B, a RAM 102, an NVRAM 103, a network adaptor 107, an I/O sub-system 105, and a bus 106. For example, the host 100B may be assumed to be a server. In another example, the host 100B may be a PC, a set-top-box, a digital camera, a navigation device, a mobile device, or the like.

Since the RAM 102, the NVRAM 103, the I/O subsystem 105, and the bus 106 included in the host 100B have already been described above with reference to the storage system 2000A of FIG. 3, repeated descriptions thereof will be omitted.

The network adaptor 107 may be combined with the devices 200 via the link unit 300. For example, the link unit 300 may include copper wiring, fiber optic cabling, at least one wireless channel, or a combination thereof.

The network adaptor 107 may include a circuit, interfaces, or a code capable of operating to transmit and receive data according to at least one networking standard. For example, the network adaptor 107 may communicate with the devices 200 according to at least one Ethernet standard.

The devices 200 may include a plurality of first through n-th SDs 200-1 through 200-n. For example, the first through n-th SDs 200-1 through 200-n may be implemented by using SSDs or HDDs. According to an exemplary embodiment of the disclosure, the first through n-th SDs 200-1 through 200-n are SSDs.

The processor 101B controls operations of the storage system 2000B according to the log-structured RAID method by using the program codes stored in the RAM 102. For example, the processor 101B drives the RAID control software 102-1 stored in the RAM 102 to perform the stripe regrouping method and the garbage collection operation illustrated in FIGS. 36-48.

The processor 101B controls the first through n-th SDs 200-1 to 200-n connected via the network adaptor 107, based on the log-structured RAID environment. In detail, when data written to the first through n-th SDs 200-1 through 200-n is updated, the processor 101B controls the storage system 2000A to not overwrite data but instead write data to a new location in a log format. For example, a plurality of memory blocks to which data is written in the log format to the first through n-th SDs 200-1 to 200-n and a memory block that stores parity information about the data stored in the plurality of memory blocks constitute one stripe.

The processor 101B registers pieces of location information of memory blocks of the first through n-th SDs 200-1 through 200-n, which constitute a stripe, in the stripe mapping table.

The processor 101B may perform address conversion or stripe grouping by using the mapping table information stored in the NVRAM 103. In detail, the processor 101B converts a logical address to a physical address by using the address mapping table. The processor 101B performs garbage collection in units of stripes by using the stripe mapping table.

A garbage collection operation which is performed by the processor 101B is substantially the same as that performed by the processor 101A of FIG. 3, and thus repeated descriptions thereof will be omitted. Stripe reconstitution performed by the processor 101B for reducing an imbalance between the valid page ratios of the memory blocks included in a stripe is also the same as that performed by the processor 101A, and thus repeated descriptions thereof will be omitted.

Figure 5A:
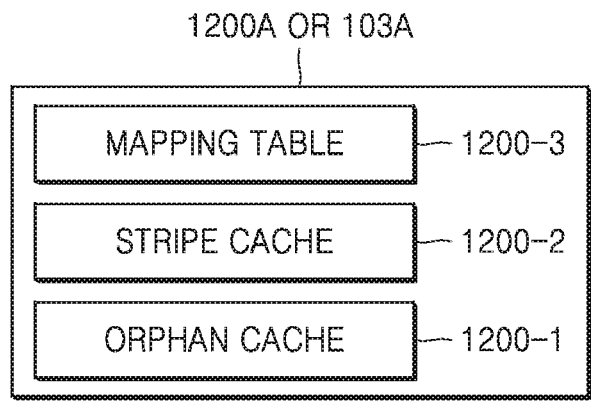
FIGS. 5A-5C show various examples of setting storage regions in a non-volatile random access memory (NVRAM) shown in FIGS. 1-4.
Figure 5B:
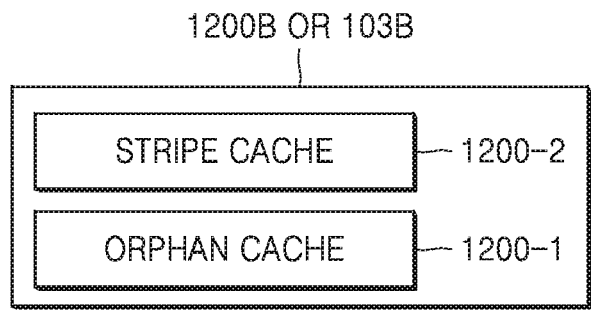
Figure 5C:
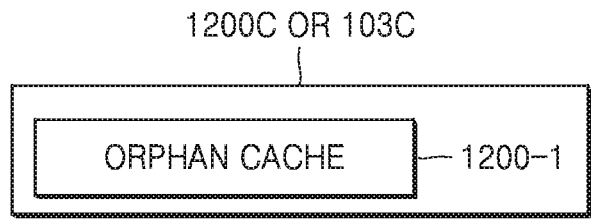

FIGS. 5A-5C show various examples of setting storage regions in the NVRAM 1200 or 103 shown in FIGS. 1-4.

Referring to FIG. 5A, an orphan cache 1200-1, a stripe cache 1200-2, and a mapping table storage region 1200-3 are allocated to an NVRAM 1200A or 103A according to an exemplary embodiment.

The orphan cache 1200-1 stores orphan data that is temporarily not protected by parity information during garbage collection. The stripe cache 1200-2 temporarily stores data that is to be written to SDs in units of stripes. The mapping table storage region 1200-3 stores an address mapping table which converts a logical address to a physical address and a stripe mapping table which represents information about stripe grouping. The stripe mapping table may include valid page ratio information of each constituted stripe. For example, the address mapping table may store a physical address of an SD that corresponds to a logical address.

Referring to FIG. 5B, an orphan cache 1200-1 and a stripe cache 1200-2 are allocated to an NVRAM 1200B or 103B according to another exemplary embodiment. In the present exemplary embodiment, a mapping table storage region 1200-3 may be allocated to the RAM 1500 or 102 of FIGS. 1-4.

Referring to FIG. 5C, an orphan cache 1200-1 is allocated to an NVRAM 1200C or 103C according to another exemplary embodiment. In the present exemplary embodiment, a stripe cache 1200-2 and a mapping table storage region 1200-3 may be allocated to the RAM 1500 or 102 of FIGS. 1-4.

Figure 6:
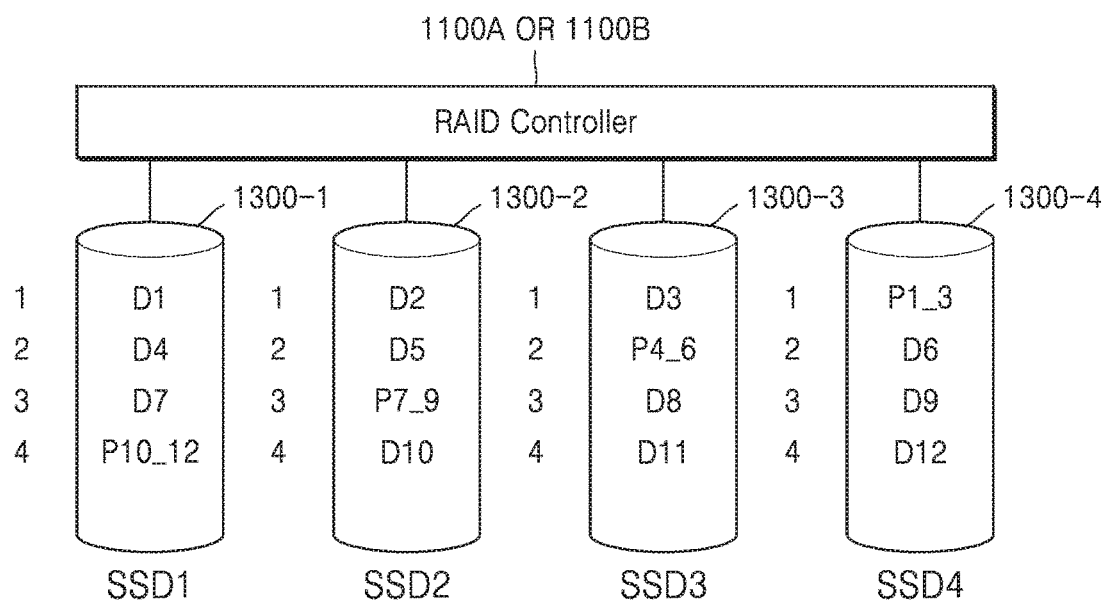
FIG. 6 is a conceptual view illustrating a write operation according to a parity-based redundant array of independent disks (RAID) method in a storage system according to an exemplary embodiment of the disclosure.

FIG. 6 is a conceptual view illustrating a write operation according to a parity-based RAID method in a storage system according to an exemplary embodiment of the disclosure.

For convenience of description, FIGS. 6-13B show the RAID controller 1100A or 1100B and the SDs (for example, four SSDs, namely, first through fourth SSDs 1300-1 through 1300-4), which are the main elements of the storage system 1000A or 1000B shown in FIG. 1 or 2.

For reference, in the storage system 2000A or 2000B shown in FIG. 3 or 4, the processor 101A or 101B may perform operations of the RAID controller 1100A or 1100B. In the storage system 2000A or 2000B shown in FIG. 3 or 4, the four SSDs may be indicated by reference numerals 200-1 to 200-4.

FIG. 6 shows an example in which a parity-based RAID method is applied to the first through fourth SSDs 1300-1 through 1300-4. Parity information with respect to each of pieces of data having the same address is stored in one of the first to fourth SSDs 1300-1 to 1300-4. For example, the parity information may be a result obtained by performing an XOR calculation with respect to the value of each of the data pieces having the same address. Even if one piece of data from among the pieces of data having the same address is lost, the lost data may be restored by using the parity information and the other pieces of data. According to the above principle, even if one of the SSDs is damaged, the data stored in the SSD may be restored.

Referring to FIG. 6, pieces of data are sequentially stored in the first through fourth SSD 1300-1 through 1300-4. For example, parity information P1_3 for data D1 through data D3 is stored in the fourth SSD 1300-4. Parity information P4_6 for data D4 through data D6 is stored in the third SSD 1300-3, parity information P7_9 for data D7 to data D9 is stored in the second SSD 1300-2, and parity information P10_12 for data D10 to data D12 is stored in the first SSD 1300-1.

It is assumed that the second SSD 1300-2 is defective. In this case, the data D2 in a first memory block of the second SSD 1300-2 may be restored by using a value obtained by performing an XOR calculation on the data D1, the data D3, and the parity information P1_3, data D5 in a second memory block thereof may be restored by using a value obtained by performing an XOR calculation on the data D4, the data D6, and the parity information P4_6, and the data D10 in a fourth memory block thereof may be restored by using a value obtained by performing an XOR calculation on the data D11, the data D12, and the parity information P10_12.

In such a parity-based RAID method, one small write-update operation may cause two read operations and two write operations, thereby degrading the entire I/O performance and accelerating abrasion of the SSDs.

In FIG. 6, it is assumed that the data D3 stored in the third SSD 1300-3 is updated. In this case, the parity information P1_3 for the data D3 also needs to be updated so as to ensure reliability of the data D3. Therefore, in order to write new data D3', existing data D3 is read and existing parity information P1_3 is read. And, new parity information P1_3' is generated by performing an XOR calculation on the data D3, the parity information P1_3, and the new data D3'. Then, the new data D3' is written and the new parity information P1_3' is also written. As described above, a problem that one write operation is amplified to two read operations and two write operations is referred to as a read-modify-write problem.

According to one or more exemplary embodiments of the disclosure, the read-modify-write problem may be addressed by using the log-structured RAID method. This will now be described in detail with reference to FIG. 7.

Figure 7:
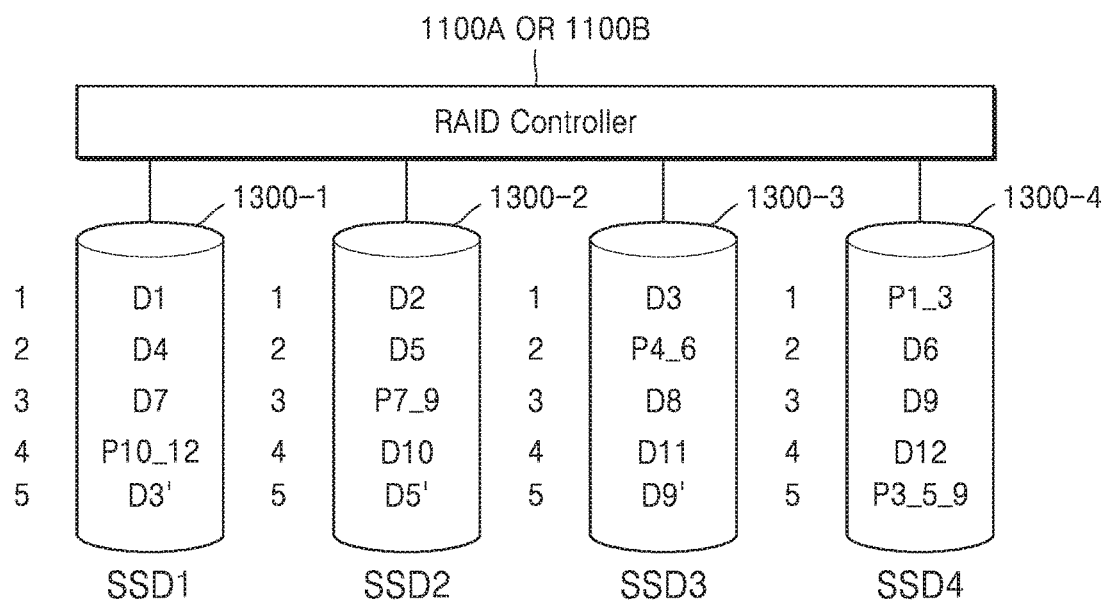
FIG. 7 is a conceptual view illustrating a log-structured RAID method in a storage system according to an exemplary embodiment of the disclosure.

FIG. 7 is a conceptual view illustrating a log-structured RAID method in a storage system according to an exemplary embodiment of the disclosure.

First, it is assumed that the storage system updates the data D3 with the data D3' when data has been stored in the first to fourth SSDs 1300-1 to 1300-4 as illustrated in FIG. 6. In this case, the new data D3' is not overwritten at a first address of the third SSD 1300-3, in which the data D3 has already been written, but is written at a fifth address of the first SSD 1300-1, which is a new location in the first SSD 1300-1. Similarly, new data D5' and new data D9' are written in the log format at new locations without being overwritten at the addresses where the data D5 and the data D9 have respectively already been written. When write operations with respect to the new data D3', the new data D5', and the new data D9', which constitute one stripe, are completed, parity information P3_5_9 about the new data D3', the new data D5', and the new data D9' constituting one stripe is written to the fourth SSD 1300-4.

When the above-described updating process according to the log-structured RAID method is completed, the first to fourth SSDs 1300-1 to 1300-4 store updated data and updated parity information as shown in FIG. 7.

A case where the first to fourth SSDs 1300-1 to 1300-4 independently perform a garbage collection operation will now be described below.

For example, it will be assumed that: (1) the data D3 that becomes invalid when the data D3' is written has been deleted from the third SSD 1300-3 through a garbage collection operation and (2) subsequently, the second SSD 1300-2 becomes defective. Then, in order to restore the data D2 stored in the second SSD 1300-2, the data D1 stored in the first SSD 1300-1, the data D3 stored in the third SSD 1300-3, and the parity information P1_3 stored in the fourth SSD 1300-4 are necessary. However, since the data D3 was deleted from the third SSD 1300-3 through a garbage collection operation, restoration of the data D2 is impossible.

According to exemplary embodiments of the disclosure, in order to address this problem, the garbage collection operation is performed in units of stripes. For example, the data D1, the data D2, the data D3, and the parity information P1_3 constituting one stripe are processed through one garbage collection operation.

If the log-structured RAID method is applied, a RAID layer (RAID controller) may use a logical-to-logical address mapping table, and an SSD layer may use a logical-to-physical address mapping table, thereby performing an address conversion process. For example, in the logical-to-logical address mapping table in the RAID layer, numbers of SDs corresponding to logical block addresses and numbers of memory blocks of the SDs may be stored and, in the logical-to-physical address mapping table in the SSD layer, a physical address of a flash memory corresponding to the logical block address may be stored.

When two mapping tables are used as described above, a mapping table size increases and garbage collection operations are performed separately in the RAID layer and the SSD layer, and thus, a write amplification factor (WAF) may increase. The garbage collection operation in the RAID layer is necessary for newly ensuring a logical empty space for a new write operation, and the garbage collection operation in the SSD layer is necessary for newly ensuring a physical empty space by performing an erase operation on the memory block of a flash memory chip for a new write operation.

According to an exemplary embodiment of the disclosure, the logical-to-logical address mapping table in the RAID layer and the logical-to-physical address mapping table in the SSD layer are combined into a combined address mapping table and the combined address mapping table is managed by the processor 101A or 101B of the host 100A or 100B of the RAID controller 1100A or 1100B.

The combined address mapping table may store pieces of mapping information for directly converting a logical address into a physical address. For example, the address mapping table may store a physical address of an SD that corresponds to a logical address. In detail, the address mapping table may store a number of an SD corresponding to a logical address, and a physical address of the SD.

Figure 8:
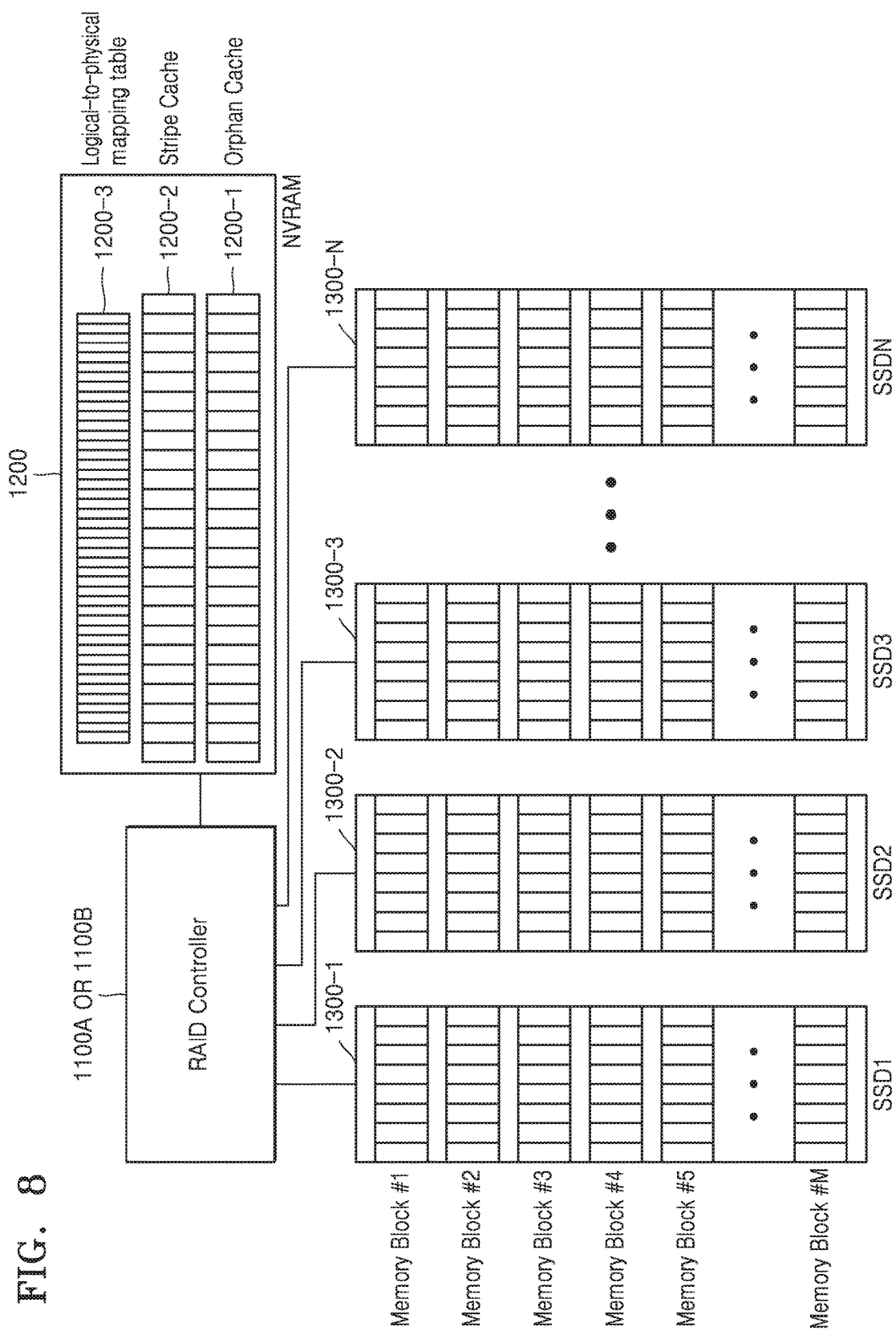
FIG. 8 is a block diagram illustrating an example of executing a solid state drive (SSD)-based log-structured RAID method by using an NVRAM in a storage system, according to an exemplary embodiment of the disclosure.

FIG. 8 is a block diagram illustrating an example of executing an SSD-based log-structured RAID method by using an NVRAM in a storage system, according to an exemplary embodiment of the disclosure.

For example, first through N-th SSDs 1300-1 through 1300-N each include a plurality of memory blocks, namely, M memory blocks. In an SSD, a read or write operation may be performed in units of pages, but an erase operation is performed in units of memory blocks. For reference, a memory block may also be referred to as an erase block. In addition, each of the M memory blocks includes a plurality of pages.

In FIG. 8, one memory block includes eight pages. However, exemplary embodiments of the disclosure are not limited thereto, and one memory block may include a plurality of pages less than or greater than the eight pages.

In FIG. 8, the orphan cache 1200-1, the stripe cache 1200-2, and the mapping table storage region 1200-3 are allocated to the NVRAM 1200.

The RAID controller 1100A or 1100B converts the logical address into the physical address by using the address mapping table stored in the mapping table storage region 1200-3.

An example of performing a write operation by using the NVRAM according to the SSD-based log-structured RAID method in the storage system of FIG. 8 will now be described with reference to FIGS. 9A and 9B.

Figure 9A:
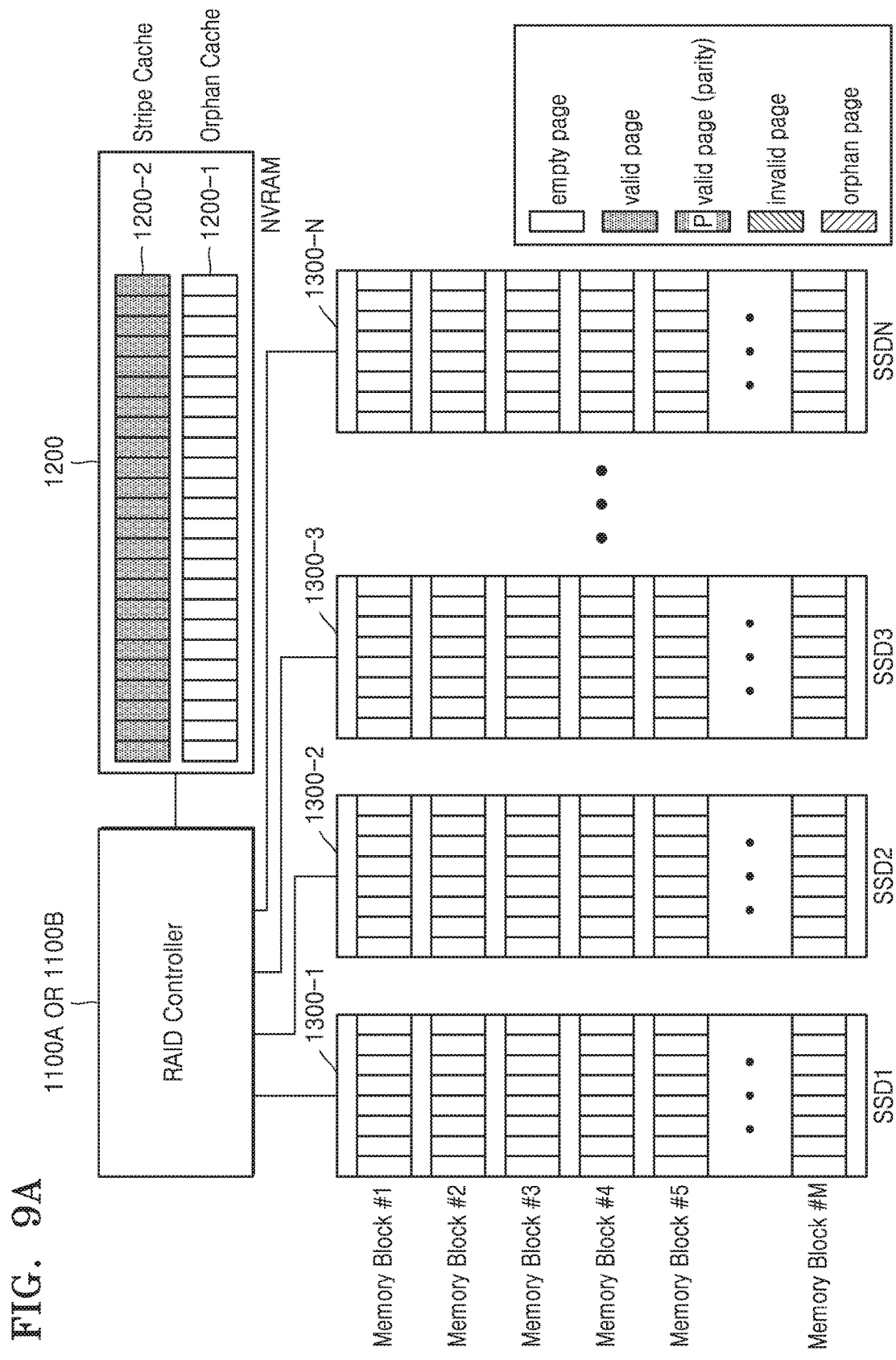
FIGS. 9A and 9B are conceptual diagrams illustrating a write operation performed in units of stripes in the storage system of FIG. 8, according to an exemplary embodiment of the disclosure.
Figure 9B:
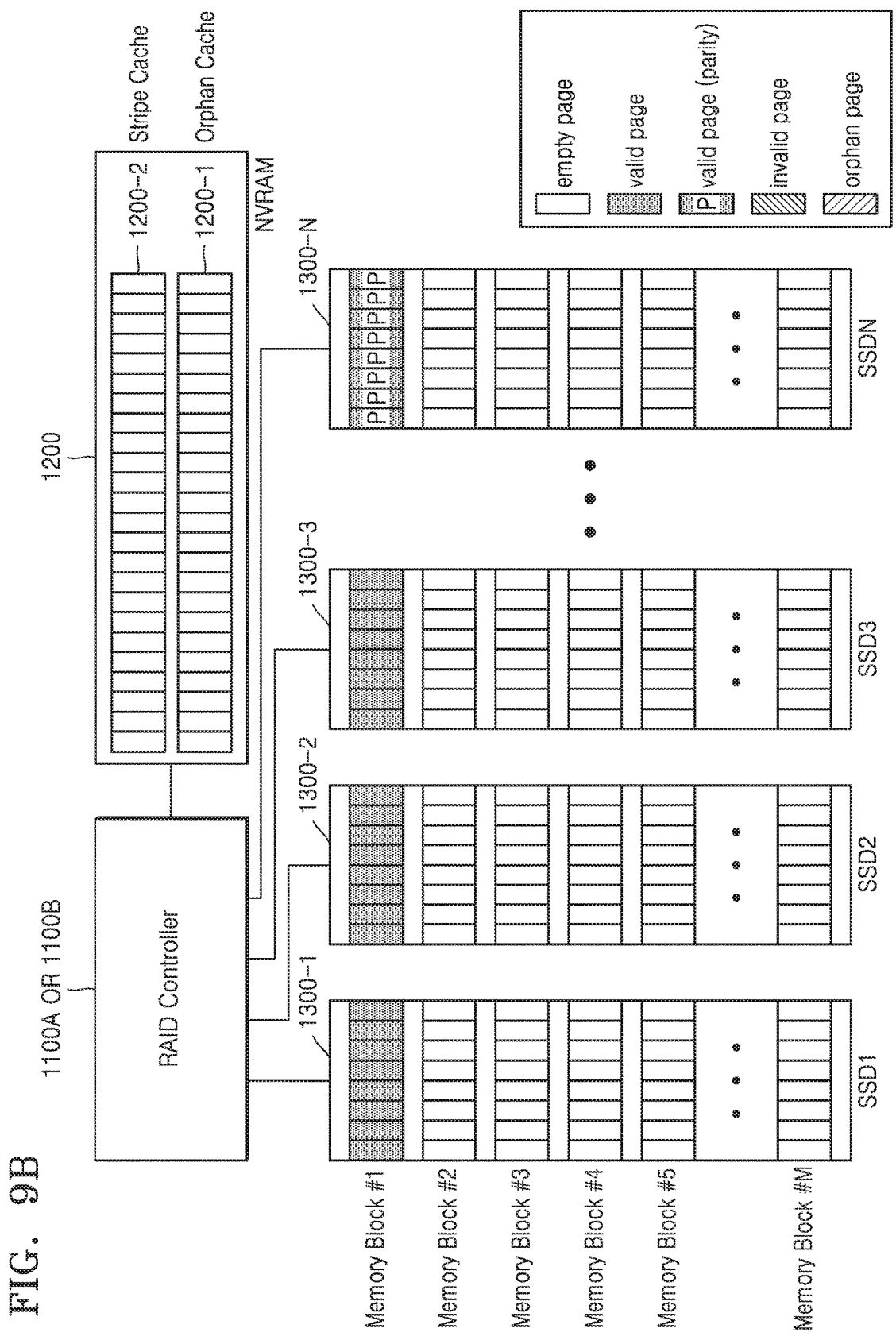

FIGS. 9A and 9B are conceptual diagrams illustrating a write operation performed in units of stripes in the storage system of FIG. 8, according to an exemplary embodiment of the disclosure.

When a write request occurs in the storage system 1000A or 1000B, the RAID controller 1100A or 1100B first stores data that is to be written, in the stripe cache 1200-2 of the NVRAM 1200. The data to be written is first stored in the stripe cache 1200-2 in order to write data of one full stripe, including parity information, in the first through N-th SSDs 1300-1 through 1300-N at one time. FIG. 9A shows an example in which data that is to be written in units of stripes is stored in the stripe cache 1200-2 of the NVRAM 1200.

Next, the RAID controller 1100A or 1100B calculates parity information about the data stored in the stripe cache 1200-2. Thereafter, the RAID controller 1100A or 1100B writes data of one full stripe, the data including calculated parity information and the data stored in the stripe cache 1200-2, to the first through N-th SSDs 1300-1 through 1300-N. In FIG. 9B, the data stored in the stripe cache 1200-2 is stored in memory blocks #1 in the first through (N−1)th SSDs 1300-1 through 1300-(N−1), and the parity information is stored in the N-th SSD 1300-N. In FIG. 9B, the memory blocks #1 respectively included in the first through N-th SSDs 1300-1 through 1300-N are registered as a new stripe.

As described above, in the exemplary embodiment illustrated in FIGS. 9A and 9B, data corresponding to one full stripe is written at one time. According to this method, parity information corresponding to the size of a memory block may be collected and calculated at once, and thus, fragmented write & parity calculation may be prevented. However, a stripe cache space that is as large as the size of one full stripe needs to be secured and an excessively large number of write I/Os per one time and parity calculation overhead may be generated.

According to another exemplary embodiment of the disclosure, data may be written to the first through N-th SSDs 1300-1 through 1300-N in units of memory blocks. According to another exemplary embodiment of the disclosure, data may be written to the first through N-th SSDs 1300-1 through 1300-N in units of pages.

FIGS. 10A-10D are conceptual diagrams illustrating a data storing process in an example of writing data to SDs in units of memory blocks in a storage system according to an exemplary embodiment of the disclosure.

Figure 10A:
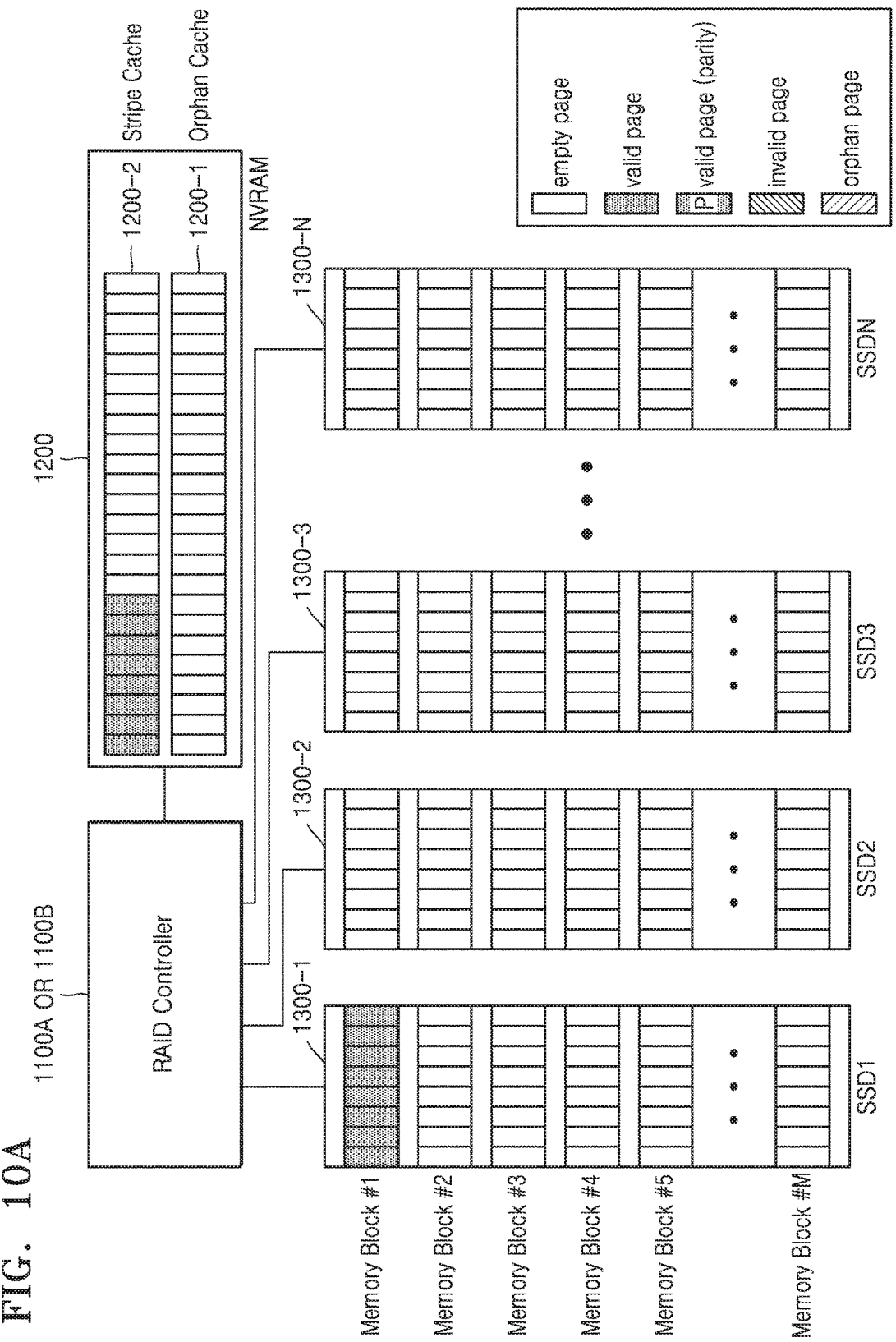
FIGS. 10A-10D are conceptual diagrams illustrating a data storing process in an example of writing data to storage devices (SDs) in units of memory blocks in a storage system according to an exemplary embodiment of the disclosure.

The RAID controller 1100A or 1100B sequentially stores data that is to be written, in the NVRAM 1200. When pieces of data whose combined size is equivalent to the size of one memory block are initially collected in the NVRAM 1200, the RAID controller 1100A or 1100B reads the data from the NVRAM 1200 and writes the read data in a memory block #1 of the first SSD 1300-1, which is empty. Accordingly, as shown in FIG. 10A, data is stored in the NVRAM 1200 and the first SSD 1300-1.

Figure 10B:
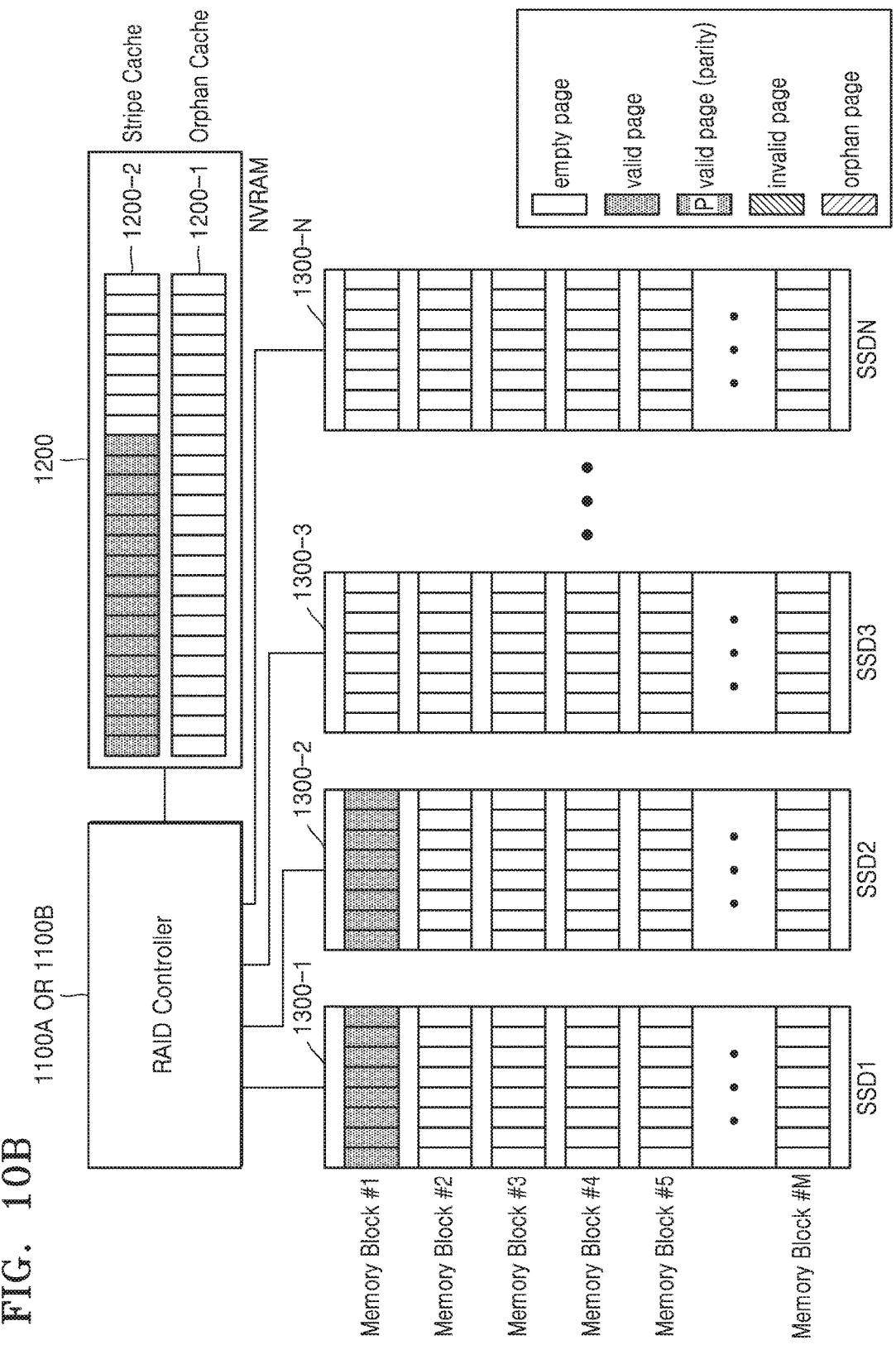

Next, when pieces of data whose combined size is equivalent to the size of one memory block are secondly collected in the NVRAM 1200, the RAID controller 1100A or 1100B reads the secondly-collected data from the NVRAM 1200 and writes the read data to a memory block #1 of the second SSD 1300-2, which is empty. Accordingly, as shown in FIG. 10B, data is stored in the NVRAM 1200 and the first and second SSDs 1300-1 and 1300-2.

Figure 10C:
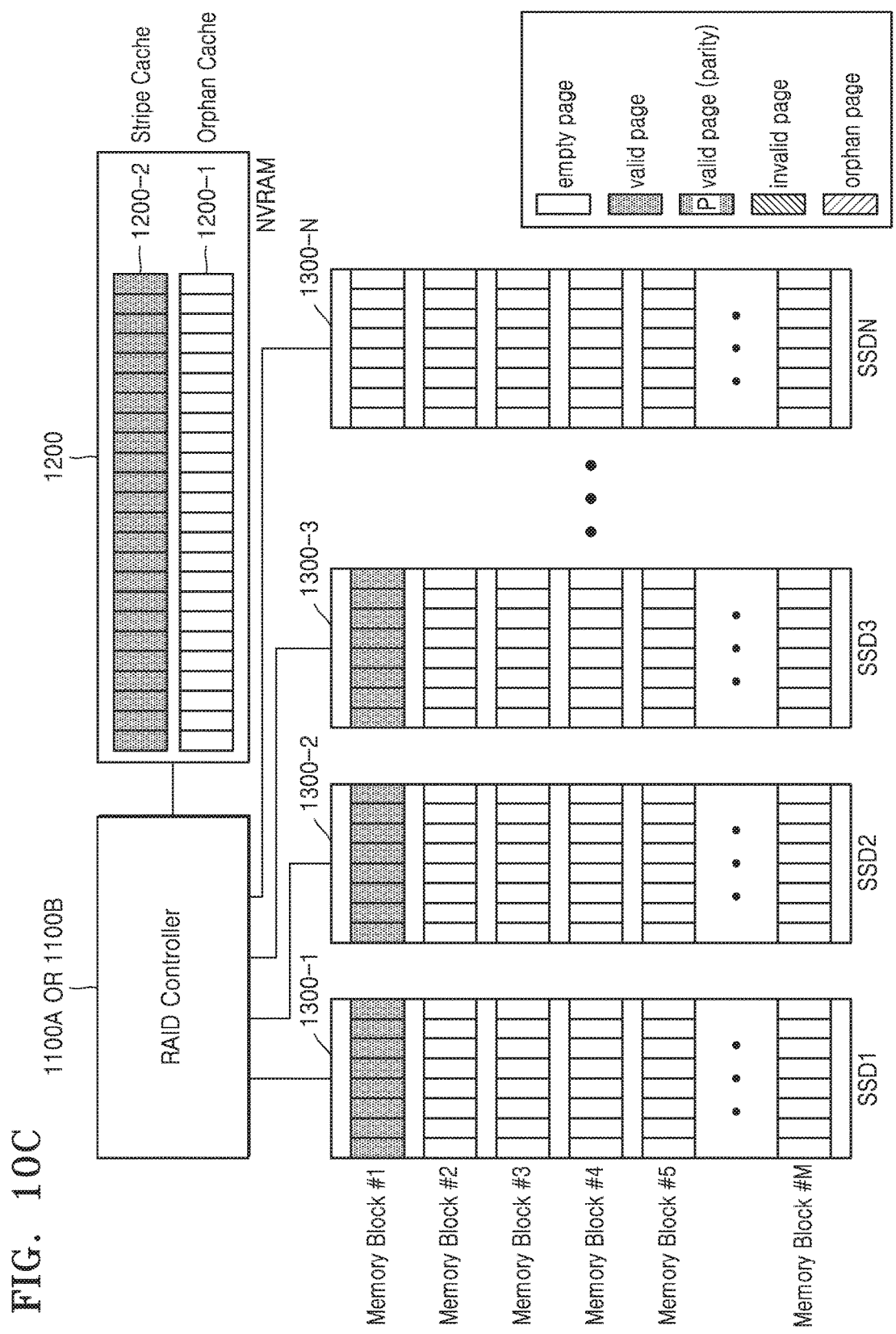

Next, when pieces of data whose combined size is equivalent to the size of one memory block are thirdly collected in the NVRAM 1200, the RAID controller 1100A or 1100B reads the thirdly-collected data from the NVRAM 1200 and writes the read data to a memory block #1 of the third SSD 1300-3, which is empty. Accordingly, as shown in FIG. 10C, data is stored in the NVRAM 1200 and the first through $3^{rd}$ SSDs 1300-1 through 1300-3.

Figure 10D:
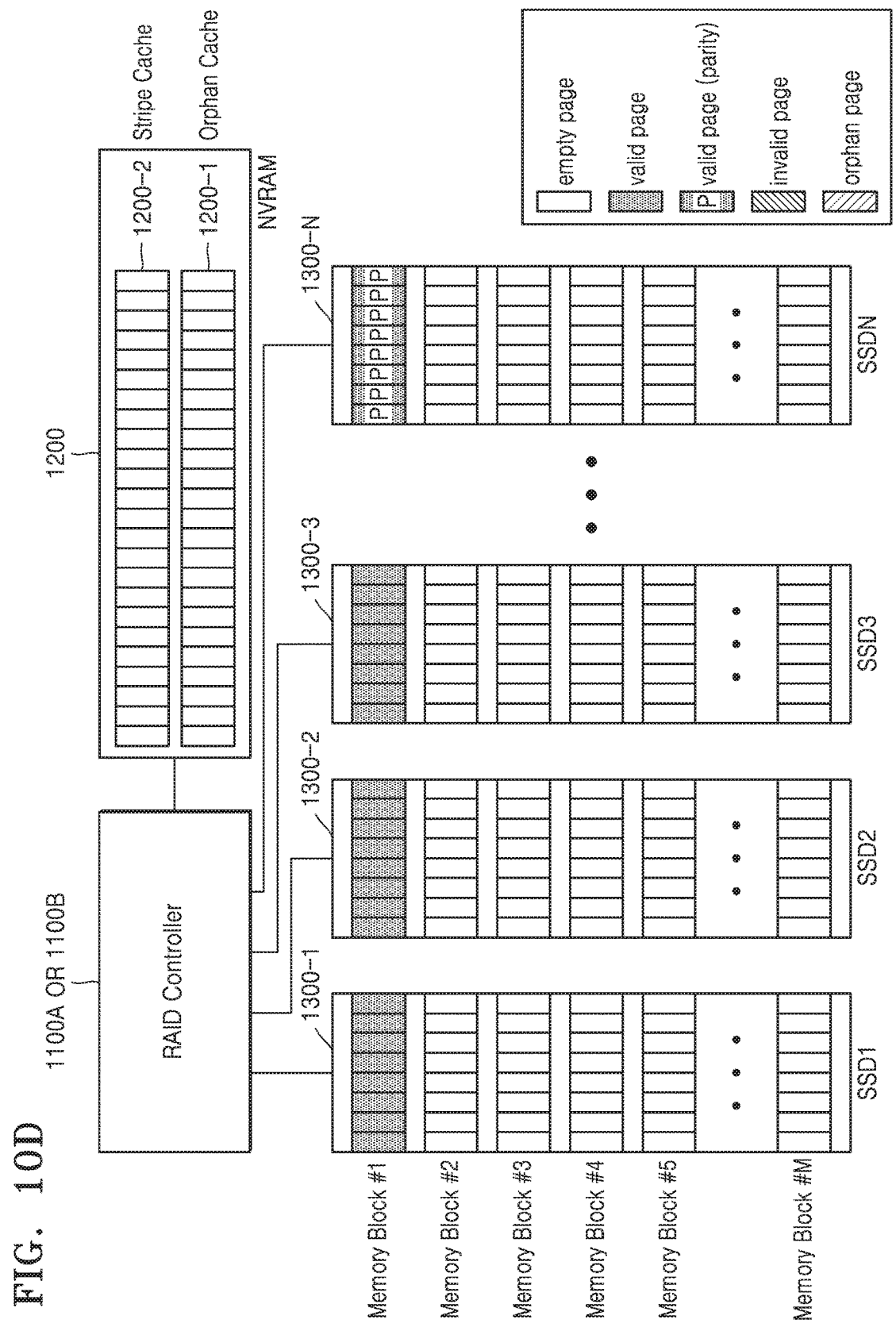
Figure 11A:
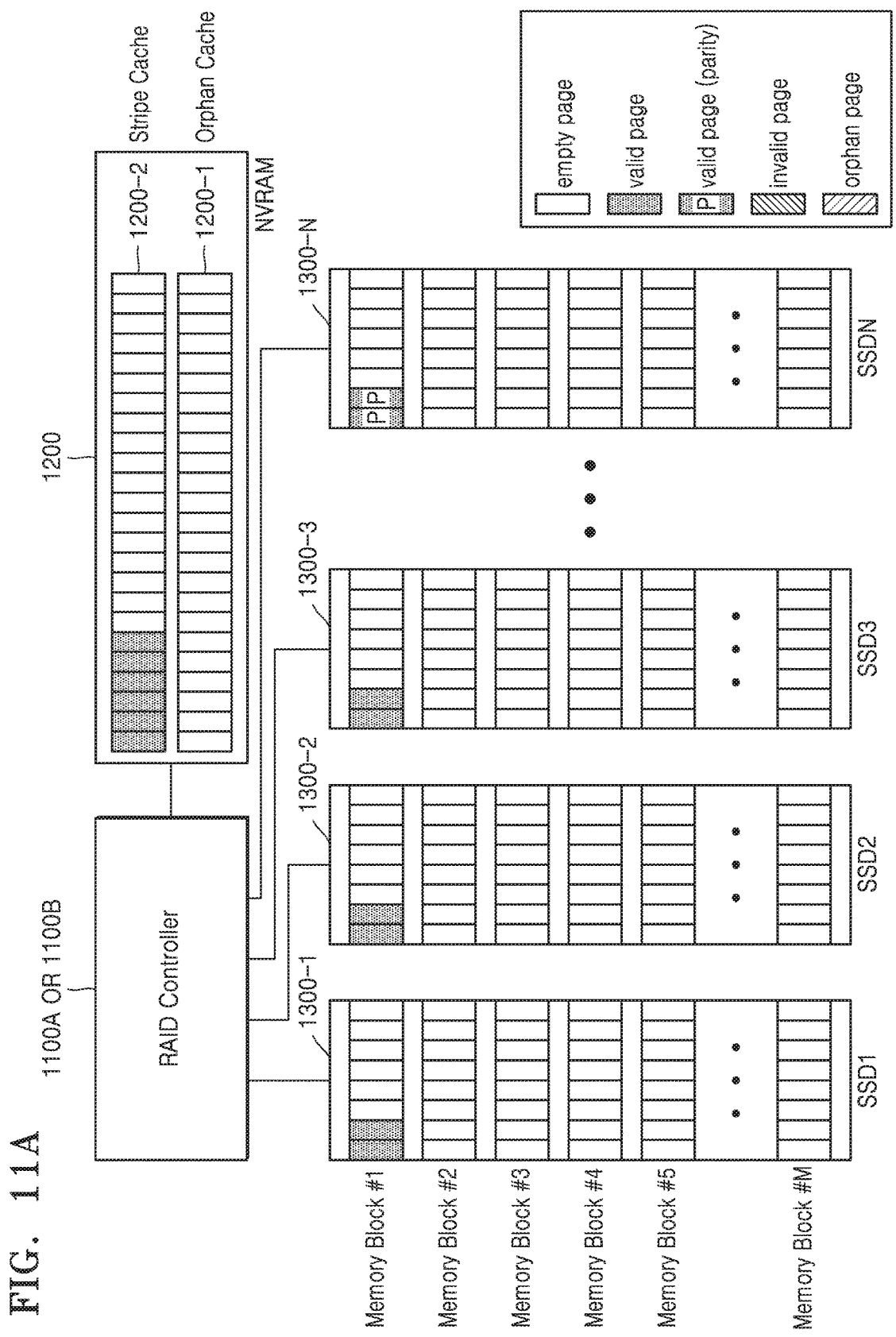
Figure 11B:
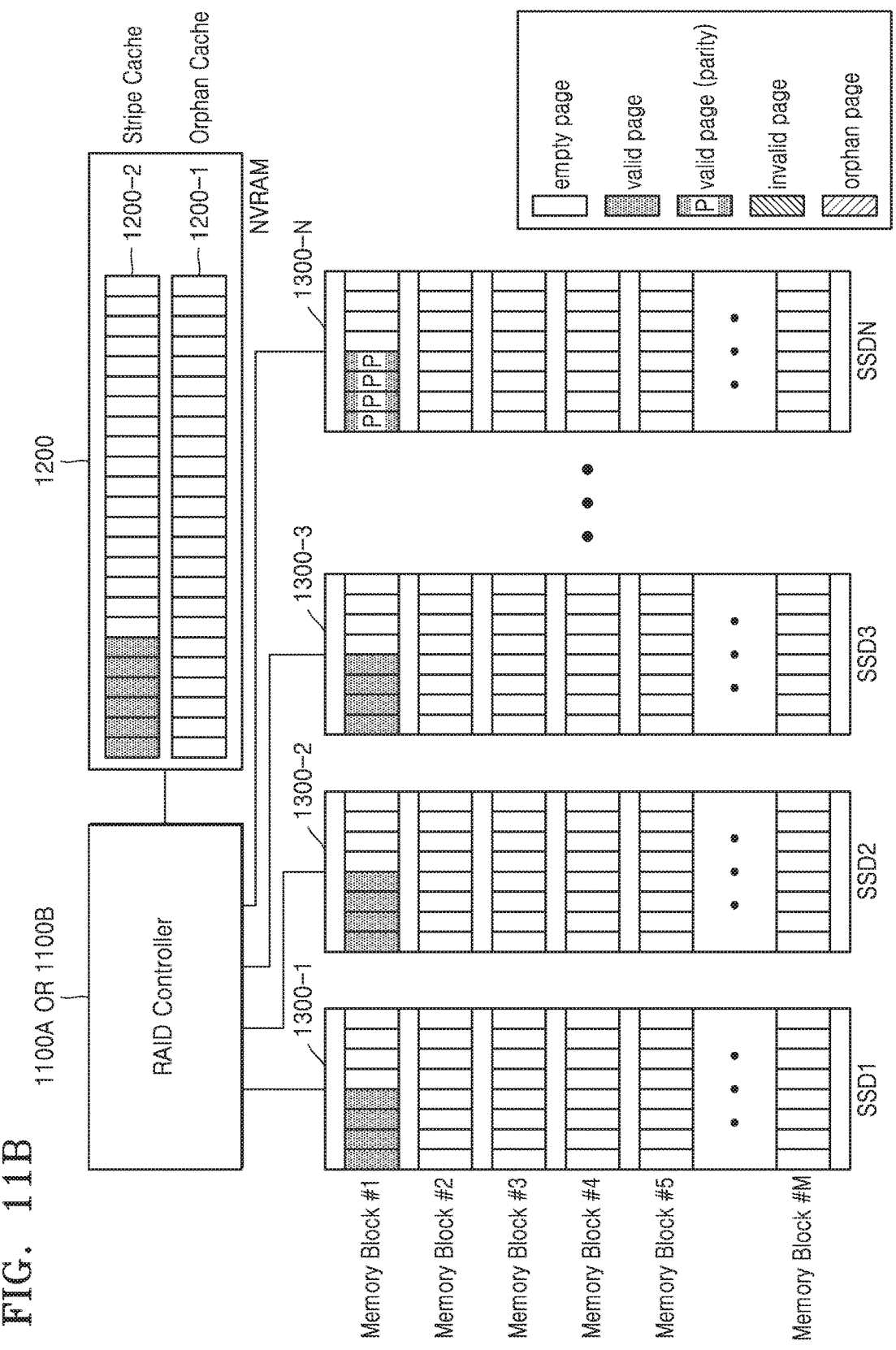
Figure 11D:
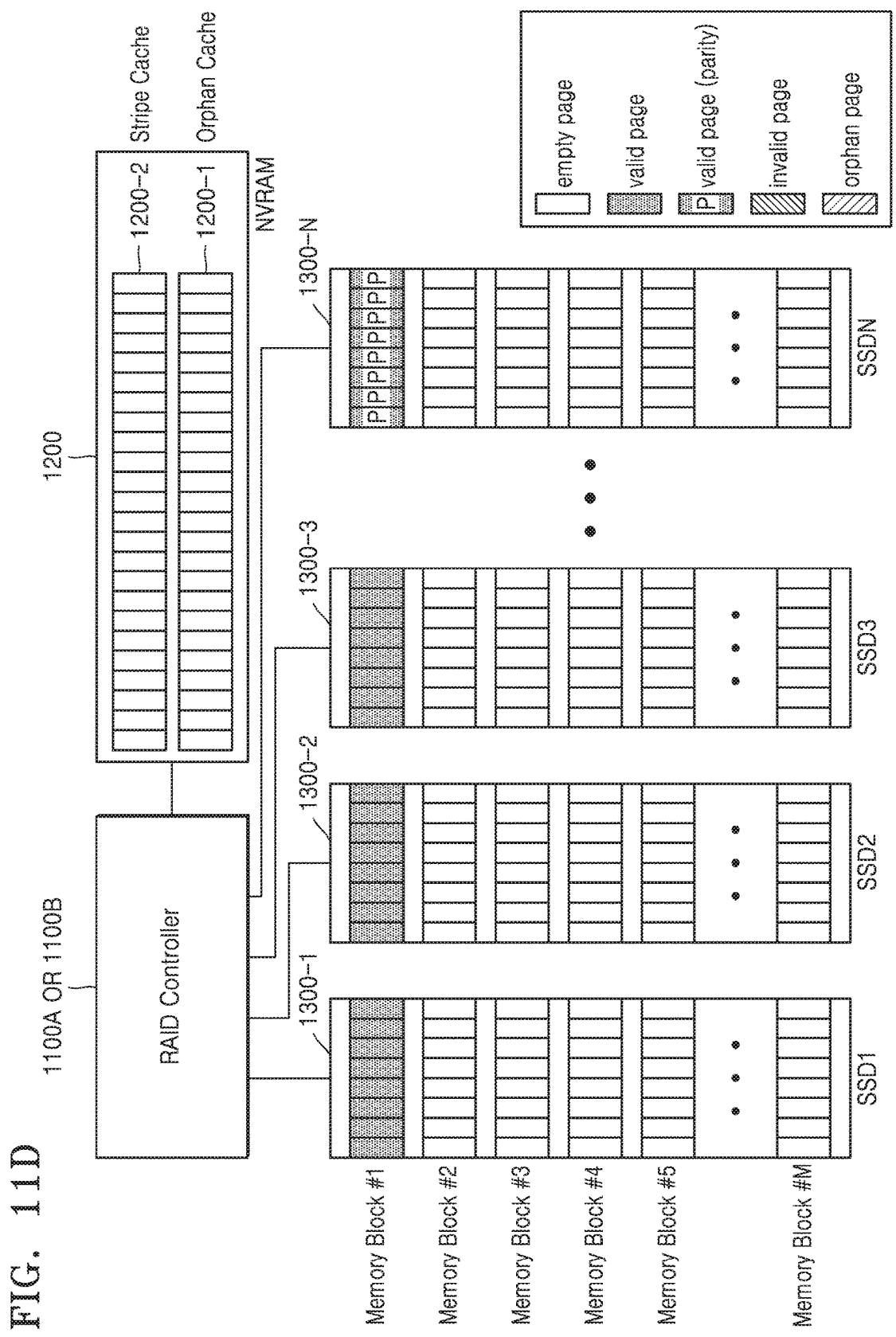

After sequentially writing data to the first through (N−1)th SSDs 1300-1 through 1300-(N−1), constituting one stripe, in the above-described manner, the RAID controller 1100A or 1100B calculates parity information about the data that is stored in the NVRAM 1200 and constitutes one stripe, and writes the calculated parity information to a memory block #1 of the N-th SSD 1300-N. Thereafter, the RAID controller 1100A or 1100B performs a flush operation for emptying the NVRAM 1200. Accordingly, as shown in FIG. 10D, data is stored in the first through N-th SSDs 1300-1 through 1300-N.

As described above, in the method of writing data in units of memory blocks, data may be written to each SSD in units of memory blocks. However, a stripe cache space that is as large as the size of one full stripe needs to be secured and an excessively large number of write I/Os per one time and parity calculation overhead may be generated.

FIGS. 11A-11D are conceptual diagrams illustrating a data storing process in an example of writing data to SDs in units of pages in a storage system according to an exemplary embodiment of the disclosure.

The RAID controller 1100A or 1100B sequentially stores data that is to be written, in the NVRAM 1200. When data having a sufficient size to calculate parity information is collected in the NVRAM 1200, the RAID controller 1100A or 1100B reads the collected data from the NVRAM 1200 and writes the read data to the memory blocks #1 of the first through Nth SSDs 1300-1 through 1300-N in units of pages. For example, the size of data sufficient to calculate parity information may be (N−1) pages obtained by subtracting 1 from N, which is the number of SSDs constituting one stripe.

Then, the RAID controller 1100A or 1100B calculates parity information about the data stored in the NVRAM 1200, and writes the calculated parity information to a first page of the memory block #1 of the N-th SSD 1300-N, which is empty. After writing the data and the parity information to the first through N-th SSDs 1300-1 through 1300-N, the RAID controller 1100A or 1100B may flush the data from the NVRAM 1200.

As another example, when data that is K times (where K is an integer equal to or greater than 2) the data size sufficiently big enough to calculate parity information is collected in the NVRAM 1200, the RAID controller 1100A or 1100B may read the collected data from the NVRAM 1200 and write the read data to the memory blocks #1 of the first through Nth SSDs 1300-1 through 1300-N in units of pages. For example, if the value of K is 2, data corresponding to two pages may be written to each of the memory blocks of the SSDs, which constitute one stripe.

FIGS. 11A-11D show that data of two pages and parity information about the data are sequentially stored in each of the memory blocks #1 of the first through N-th SSDs, which constitute one stripe.

As described above, in the method of writing data in units of pages, since parity information may be calculated in units of pages, the parity calculation load to be performed at one time may be reduced, and there is no need to secure a stripe cache space corresponding to one full stripe. However, a write operation may not be performed on each SSD in units of memory blocks.

FIGS. 12A-12H are conceptual diagrams illustrating a garbage collection operation in a storage system according to an exemplary embodiment of the disclosure.

Figure 12A:
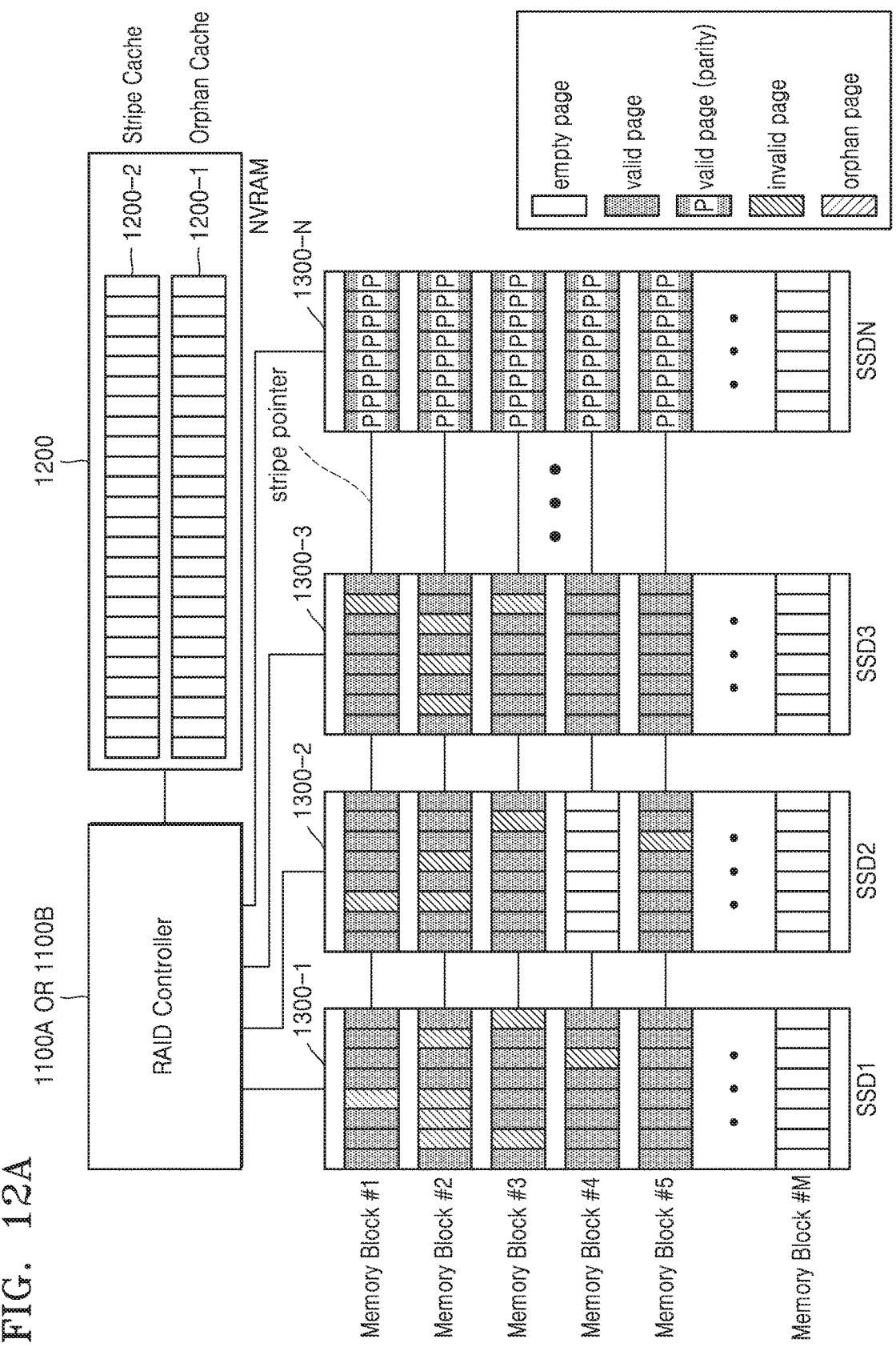
FIGS. 12A-12H are conceptual diagrams illustrating a garbage collection operation in a storage system according to an exemplary embodiment of the disclosure.

FIG. 12A illustrates an example in which data has been stored in the first through N-th SSDs 1300-1 through 1300-N according to a write operation performed in a storage system.

In the storage system, when a new write operation is performed with respect to the same logical address, existing data already stored at the logical address becomes invalid data, and thus a page in which the invalid data is stored is represented as an invalid page. In addition, memory blocks in the first through N-th SSDs 1300-1 through 1300-N, which constitute one stripe, are connected to one another by a stripe pointer. Accordingly, in which stripe a memory block in each SSD is included may be recognized by using the stripe pointer. The stripe pointer may be generated by the above-described stripe mapping table.

When a write operation is performed in the storage system, a garbage collection operation is necessary for securing a new storage space. In the storage system according to the present exemplary embodiment of the disclosure, the garbage collection operation is performed in units of stripes.

When a request for garbage collection is generated in the storage system, the RAID controller 1100A or 1100B selects a victim stripe that is a target of the garbage collection. For example, a stripe having the highest invalid page ratio may be selected as the victim stripe. In other words, a stripe having the lowest valid page ratio may be selected as the victim stripe.

Figure 12B:
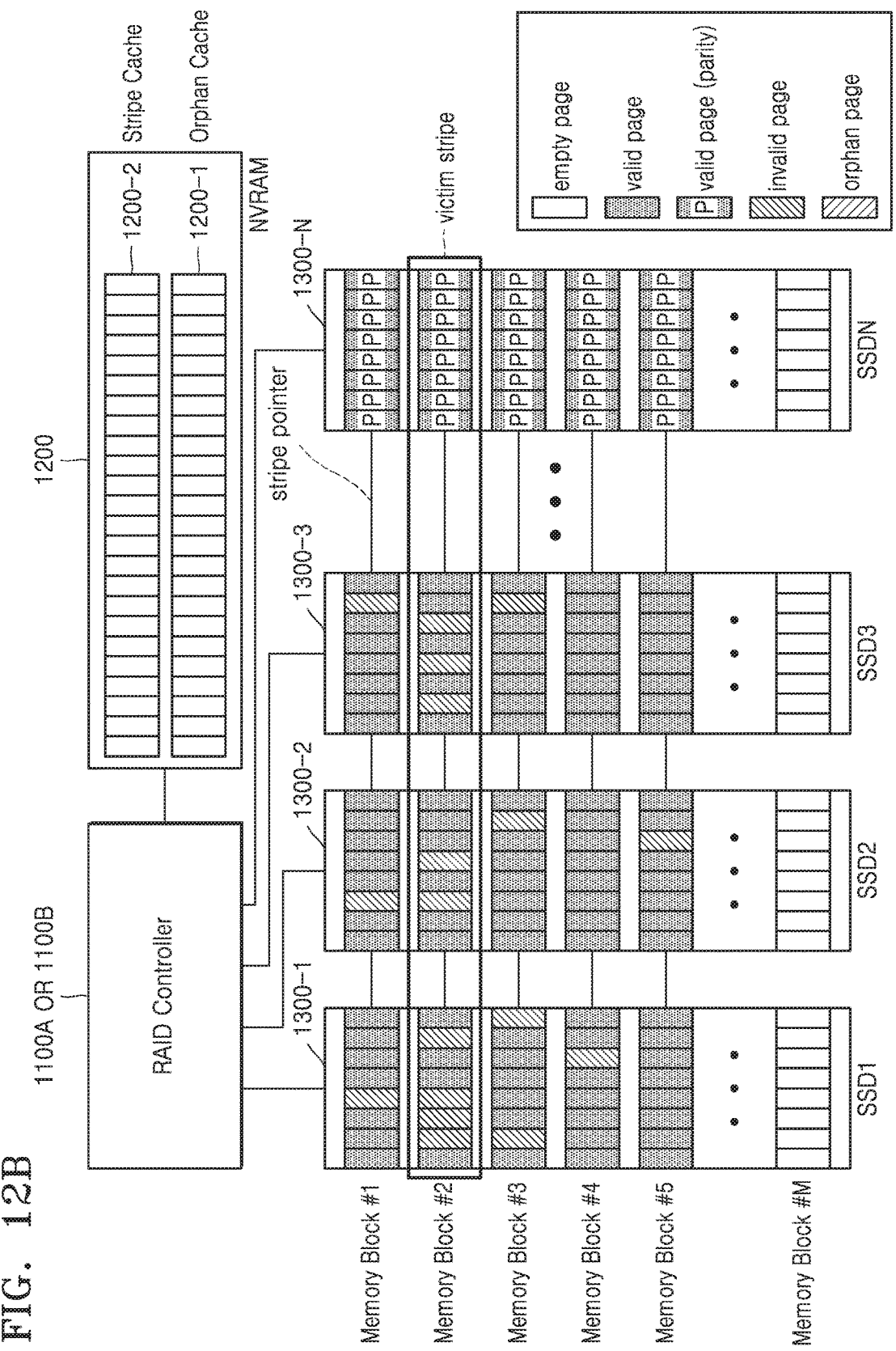

If a request for garbage collection occurs in the storage system when data has been stored in the first through N-th SSDs 1300-1 through 1300-N as shown in FIG. 12A, a stripe that has a highest invalid page ratio is selected as the victim stripe as shown in FIG. 12B. In this instance, the victim stripe is second from the top.

Figure 12C:
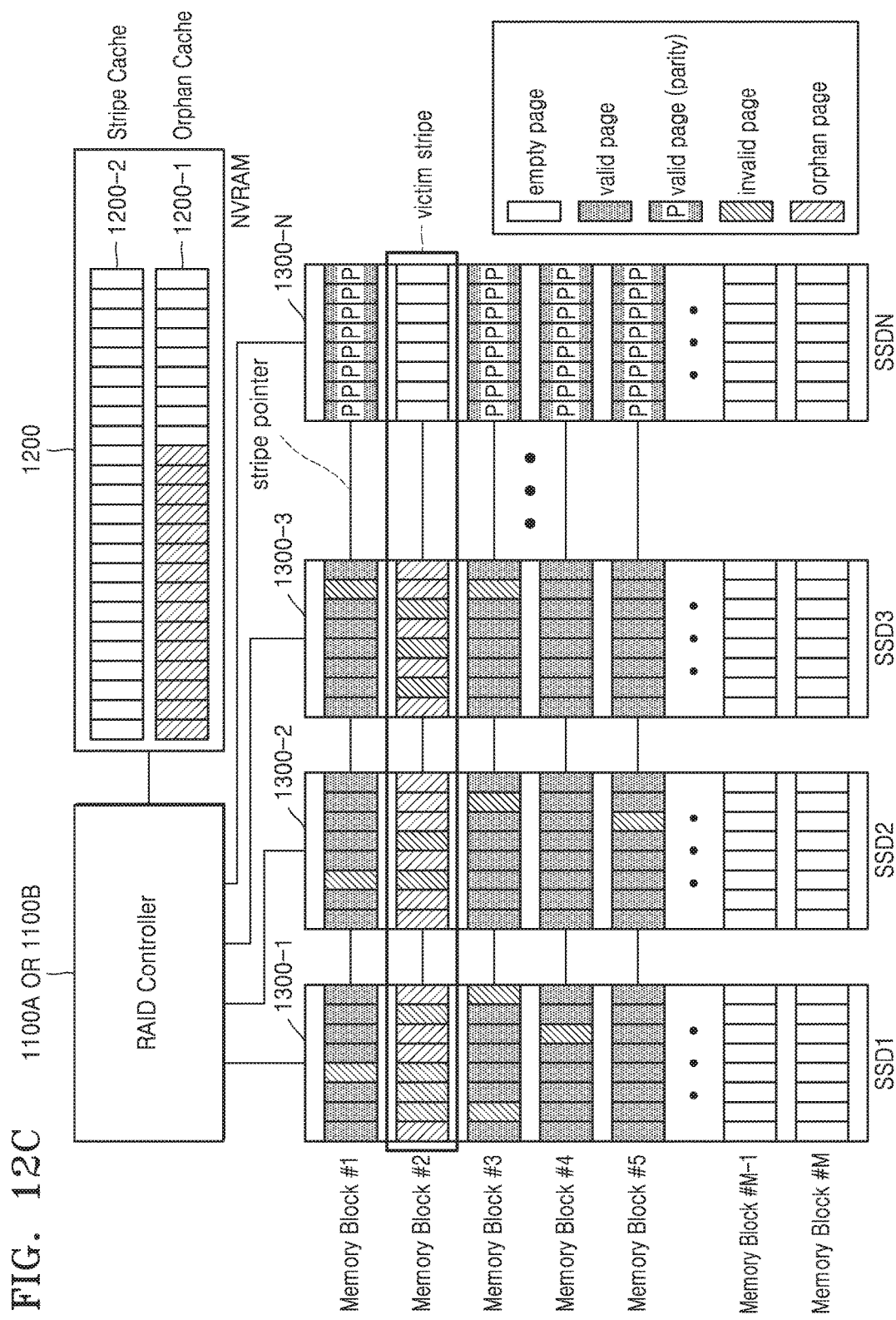

After selecting the victim stripe as shown in FIG. 12B, the RAID controller 1100A or 1100B copies the valid pages included in the victim stripe into the orphan cache 1200-1 of the NVRAM 1200. After finishing the copying process, the RAID controller 1100A or 1100B erases parity information from the victim stripe. A data storage state of the first through N-th SSDs 1300-1 through 1300-N and a data storage state of the NVRAM 1200 after the erasure is completed are as shown in FIG. 12C. Accordingly, the orphan cache 1200-1 stores data of pages that are temporarily not protected by the parity information. A valid page that is temporarily not protected by parity information is referred to as an orphan page, and data stored in the orphan page is referred to as orphan data.

Referring to FIG. 12C, although the parity information included in the victim stripe is deleted, the data of all the valid pages included in the victim stripe is stored in the orphan cache 1200-1, and thus, reliability of the data may be ensured.

If a request to read the valid pages included in the victim stripe occurs during garbage collection, the RAID controller 1100A or 1100B directly reads the orphan pages requested to be read from the orphan cache 1200-1 of the NVRAM 1200. In other words, the RAID controller 1100A or 1100B directly reads the orphan pages from the orphan cache 1200-1 of the NVRAM 1200 without reading the orphan pages from the first through N-th SSDs 1300-1 through 1300-N. Accordingly, in response to the request for reading the valid pages of the victim stripe during garbage collection, data reading may be performed with a low latency by using the NVRAM 1200.

Next, the RAID controller 1100A or 1100B copies the valid pages included in the victim stripe into memory blocks which are to constitute a new stripe. For example, the valid pages of a memory block included in a victim stripe may be copied into another memory block that is included in the SSD storing the valid pages of the former memory block and that is used to constitute a new stripe. As another example, the valid pages included in the victim stripe may be evenly distributed and copied into memory blocks that are to constitute a new stripe.

For example, the above-described memory blocks that are to constitute a new stripe may be allocated as a storage region for copying the valid pages included in the victim stripe for garbage collection. In other words, the RAID controller 1100A or 1100B manages memory blocks such that data according to a normal write operation is not mixed in the memory blocks that are to constitute a new stripe and are allocated to copy the valid pages during garbage collection.

For example, an operation in which the valid pages of a memory block included in the victim stripe are copied into another memory block that is included in the SSD storing the valid pages of the former memory block and that is used to constitute a new stripe will now be described.

Figure 12D:
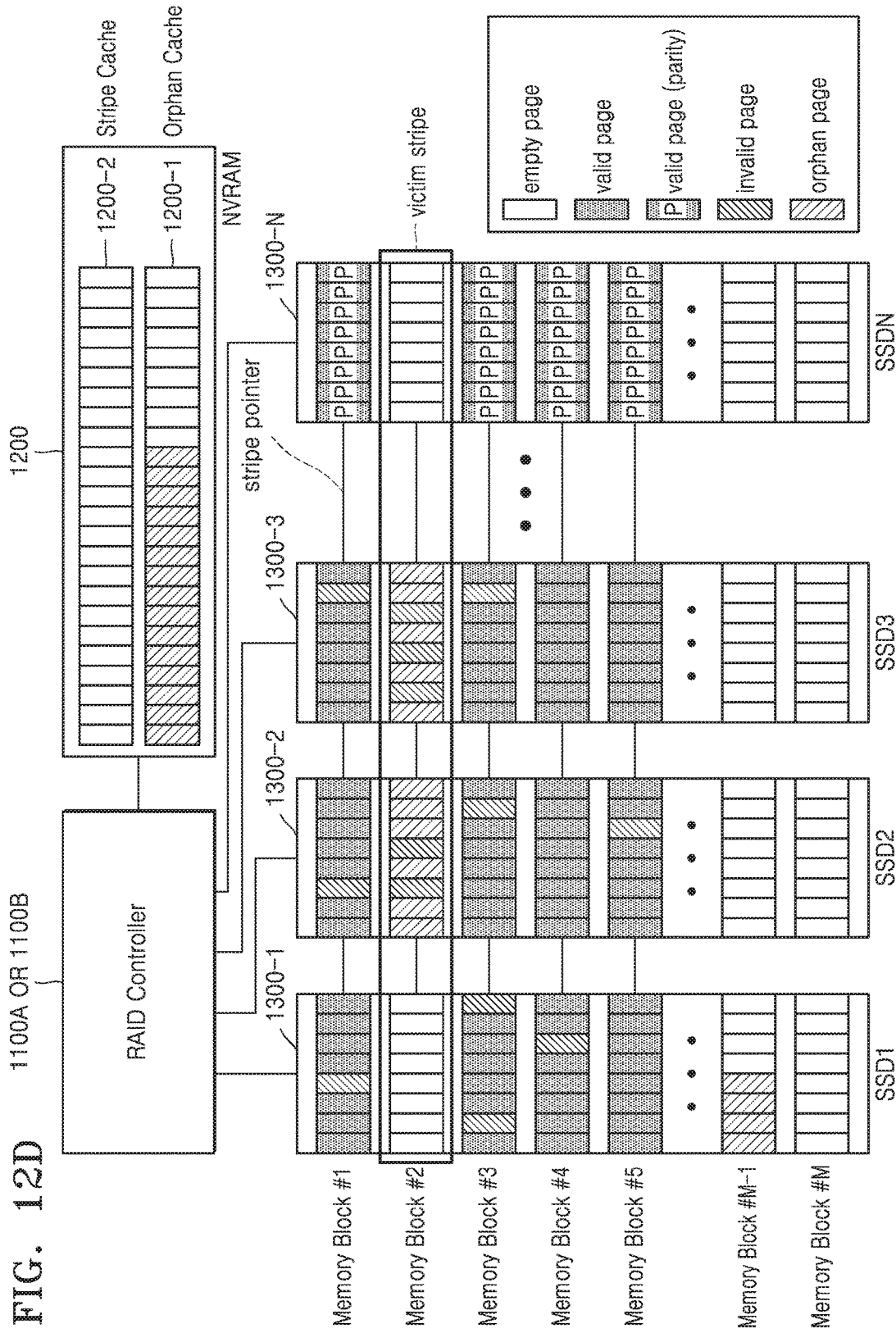

The RAID controller 1100A or 1100B copies orphan pages located in a memory block #2 of the first SSD 1300-1 into a memory block #M−1 of the first SSD 1300-1. After that, the RAID controller 1100A or 1100B performs an erase operation on the memory block #2 of the first SSD 1300-1. A data storage state of the first through N-th SSDs 1300-1 through 1300-N and a data storage state of the NVRAM 1200 after the erase operation is completed are as shown in FIG. 12D.

Figure 12E:
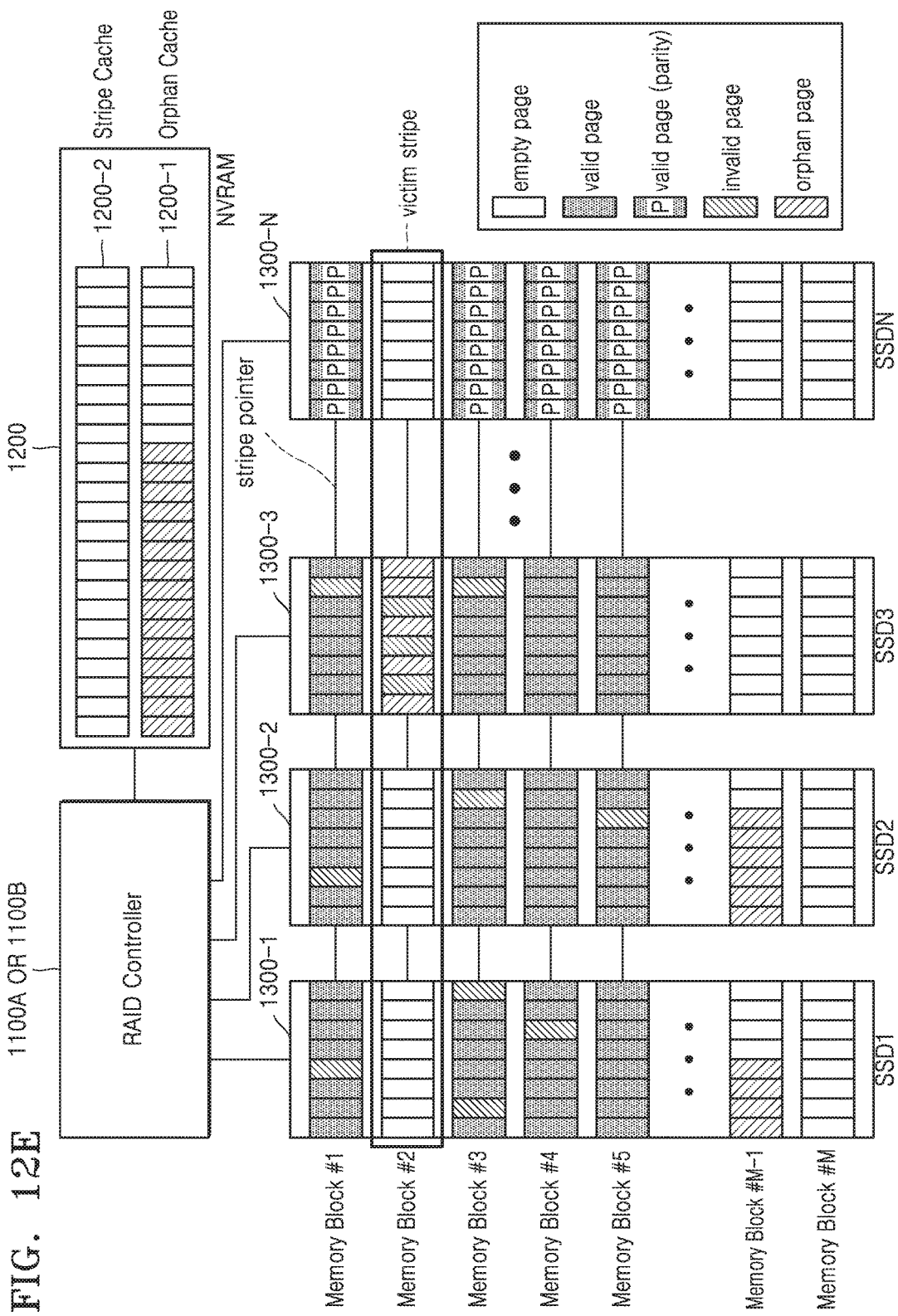

Similarly, the RAID controller 1100A or 1100B copies orphan pages located in a memory block #2 of the second SSD 1300-2 into a memory block #M−1 of the second SSD 1300-2. After that, the RAID controller 1100A or 1100B performs an erase operation on the memory block #2 of the second SSD 1300-2. A data storage state of the first through N-th SSDs 1300-1 through 1300-N and a data storage state of the NVRAM 1200 after the erase operation is completed are as shown in FIG. 12E.

Figure 12F:
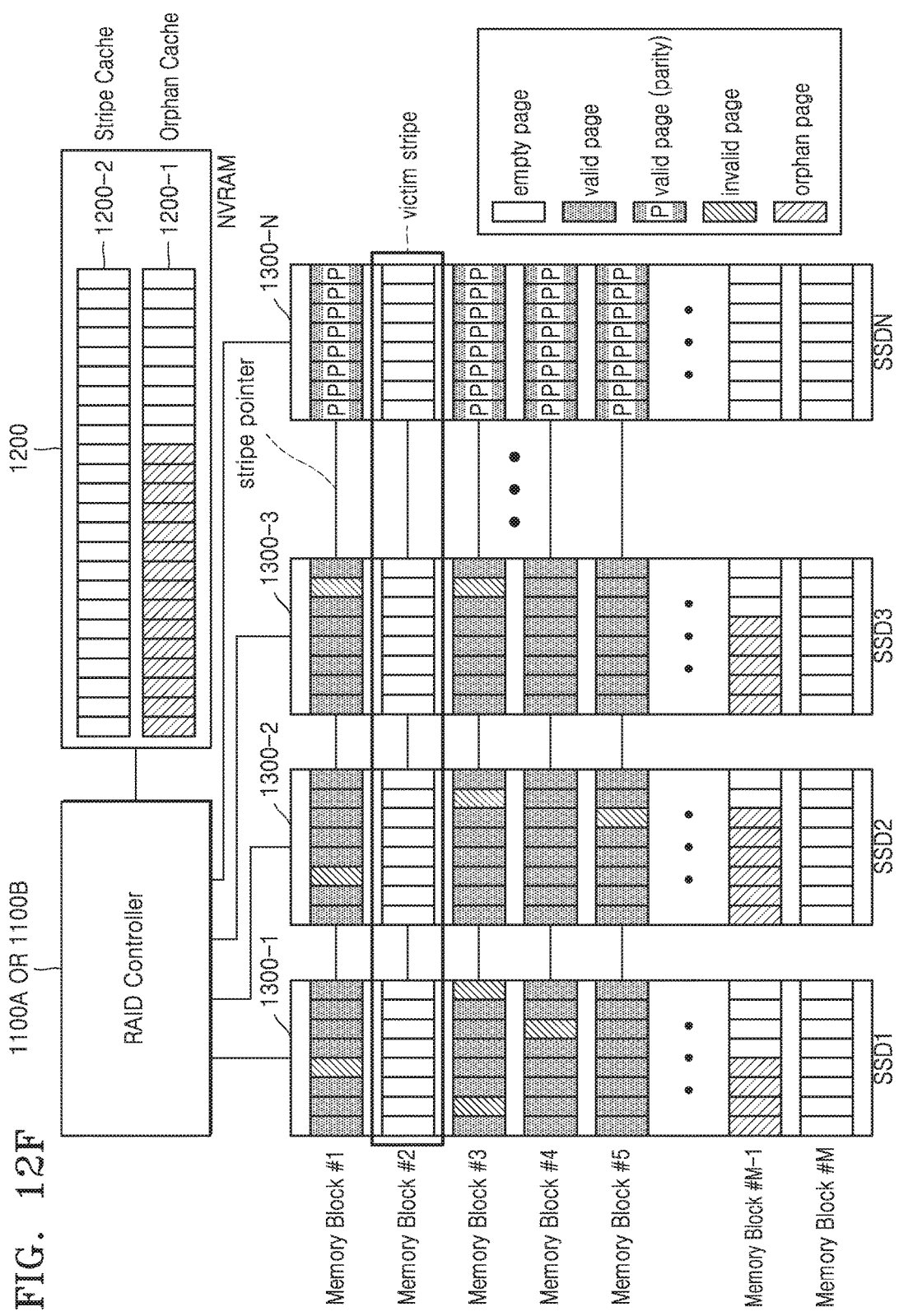

The RAID controller 1100A or 1100B copies orphan pages located in a memory block #2 of the third SSD 1300-3 into a memory block #M−1 of the third SSD 1300-3. After that, the RAID controller 1100A or 1100B performs an erase operation on the memory block #2 of the third SSD 1300-3. A data storage state of the first through N-th SSDs 1300-1 through 1300-N and a data storage state of the NVRAM 1200 after the erase operation is completed are as shown in FIG. 12F.

According to an exemplary embodiment, the RAID controller 1100A or 1100B manages memory blocks into which orphan pages are copied, such that the memory blocks are comprised of only orphan pages obtained by garbage collection. Orphan data is data that survives while invalid data initially stored together with the orphan data is being deleted through garbage collection. In other words, since the orphan data is proven to have a long data lifetime, it is inefficient to store the orphan data together with data according to a normal write operation in one memory block. Storing data having a similar data lifetime in one memory block is efficient to minimize an inter-valid-page copy operation during garbage collection.

Figure 12G:
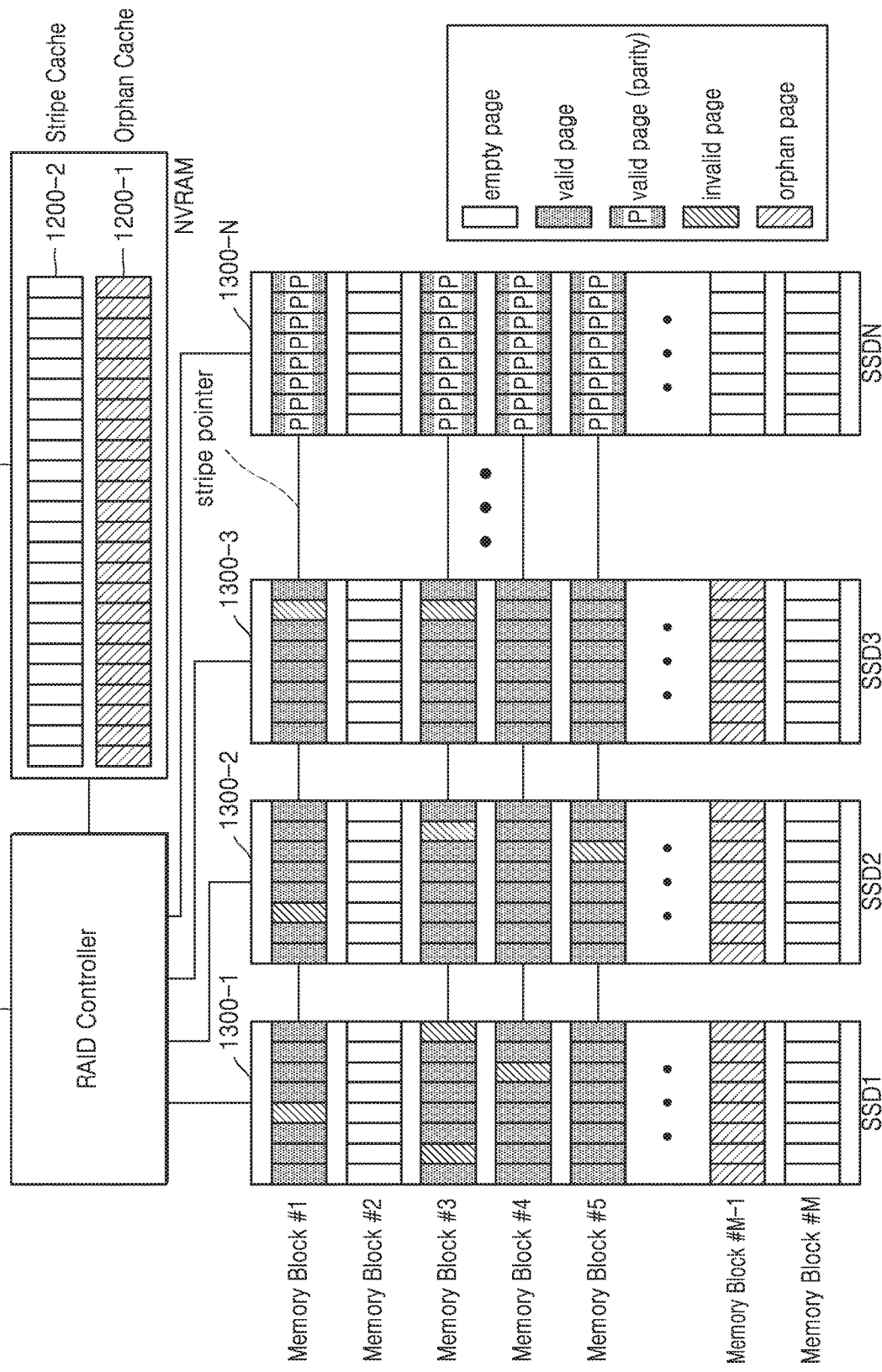

When garbage collection is performed in this manner, the respective memory blocks #M−1 of the first through (N−1)th SSDs 1300-1 through 1300-(N−1) are filled with orphan data. A data storage state of the first through N-th SSDs 1300-1 through 1300-N and a data storage state of the NVRAM 1200 after this garbage collection is performed are as shown in FIG. 12G.

Figure 12H:
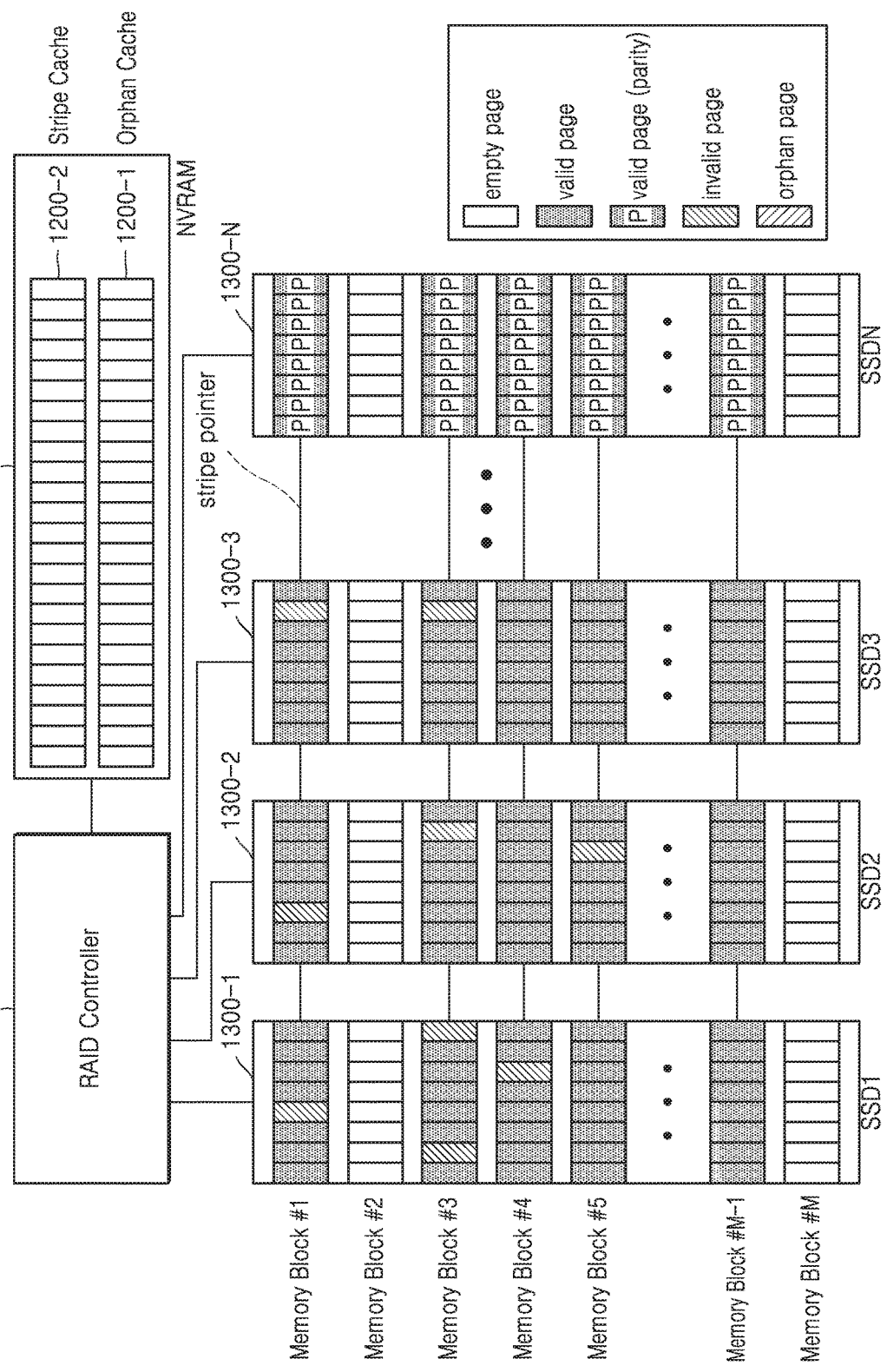

Then, the RAID controller 1100A or 1100B calculates parity information about the orphan data stored in the NVRAM 1200 and then writes the calculated parity information to a memory block #M−1 of the N-th SSDN 1300-N. After writing the parity information, the orphan data stored in the respective memory blocks #M−1 of the first through (N−1)th SSDs 1300-1 through 1300-(N−1) is converted into valid pages that are able to be protected by the parity information stored in the memory block #M−1 of the N-th SSDN 1300-N. The RAID controller 1100A or 1100B generates a new stripe consisting of the memory blocks #M−1 of the first through N-th SSDs 1300-1 through 1300-N, and registers location information of the memory blocks #M−1 constituting the new stripe in the stripe mapping table. After writing the parity information, the RAID controller 1100A or 1100B flushes the orphan data stored in the orphan cache 1200-1 of the NVRAM 1200. A data storage state of the first through N-th SSDs 1300-1 through 1300-N and a data storage state of the NVRAM 1200 after the flush operation is completed are as shown in FIG. 12H.

Figure 13A:
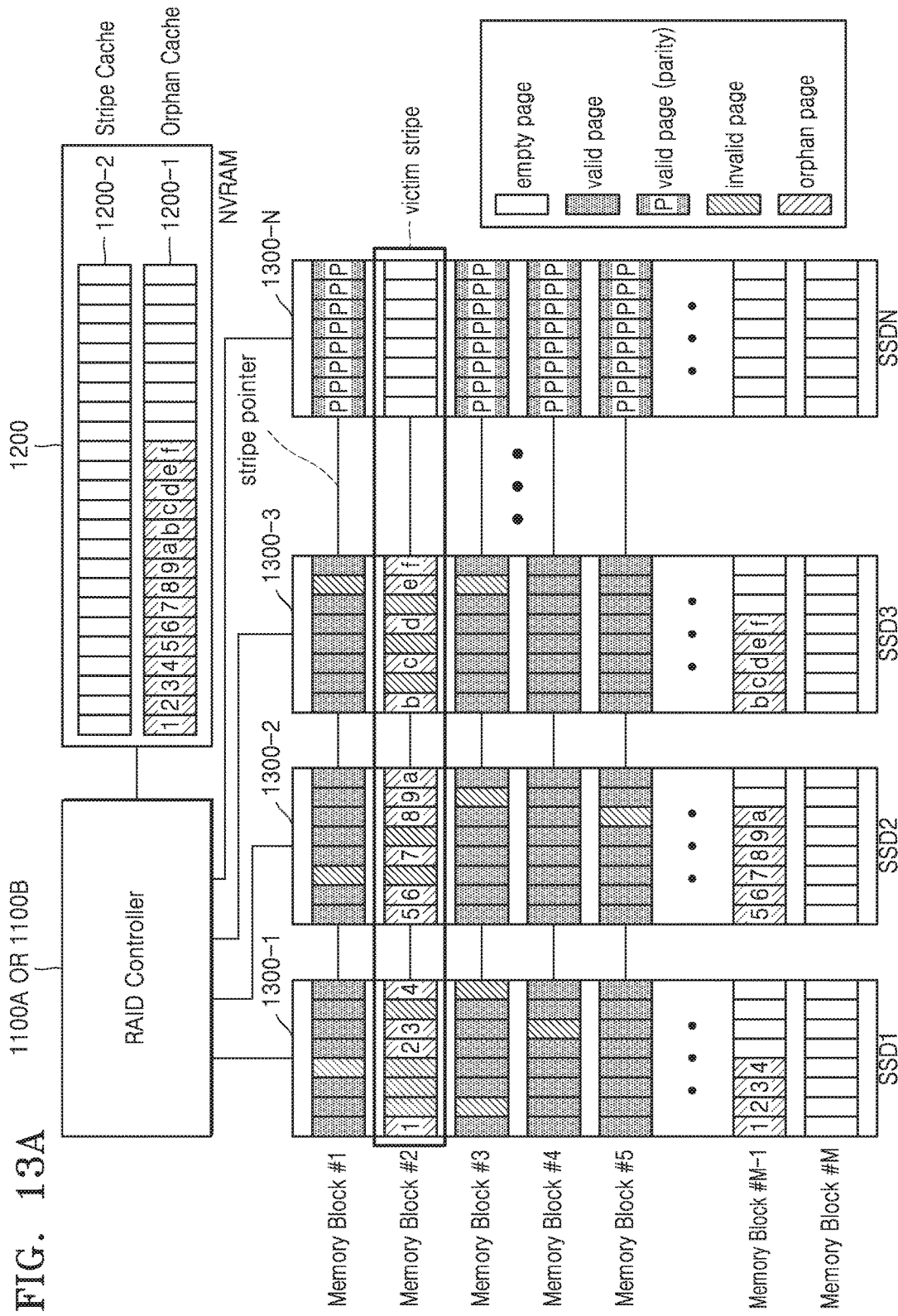
FIGS. 13A and 13B are conceptual diagrams illustrating various examples of copying valid pages included in a victim stripe into memory blocks that are to constitute a new stripe, during a garbage collection operation in the storage system according to an exemplary embodiment of the disclosure.
Figure 13B:
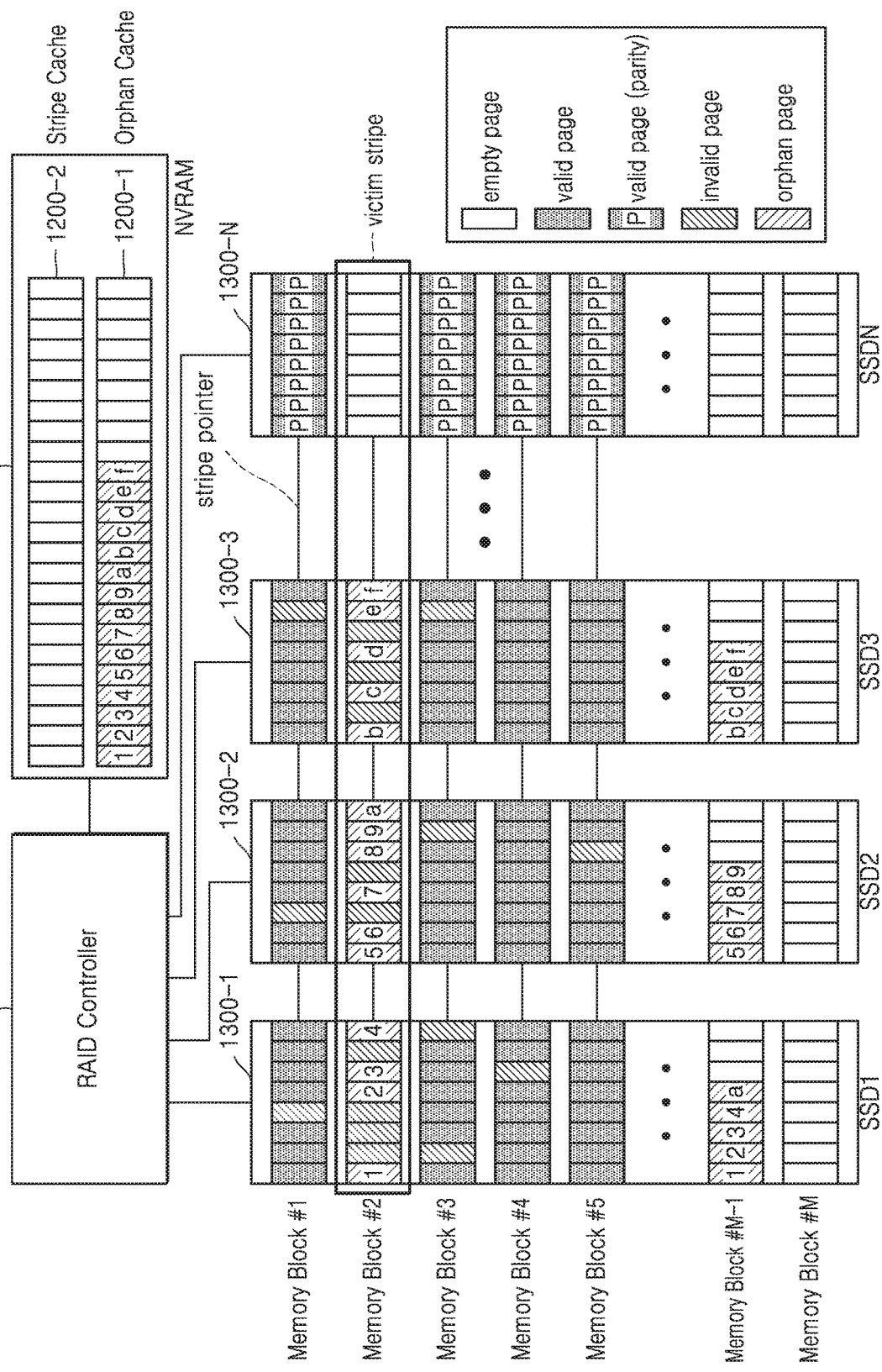

FIGS. 13A and 13B are conceptual diagrams illustrating various examples of copying valid pages included in a victim stripe into memory blocks that are to constitute a new stripe, during a garbage collection operation in the storage system according to the exemplary embodiment of the disclosure.

Referring to FIGS. 13A and 13B, since parity information about the valid pages included in the victim stripe has been deleted, the valid pages included in the victim stripe are orphan pages.

Referring to FIG. 13A, the orphan pages included in the victim stripe are only copied into the same SSD as the SSD in which the orphan pages are located. In other words, orphan pages 1, 2, 3, and 4 included in the memory block #2 of the first SSD 1300-1 are copied into the memory block #M−1 of the first SSD 1300-1, and orphan pages 5, 6, 7, 8, 9, and a included in the memory block #2 of the second SSD 1300-2 are copied into the memory block #M−1 of the second SSD 1300-2, and orphan pages b, c, d, e, and f included in the memory block #2 of the third SSD 1300-3 are copied into the memory block #M−1 of the third SSD 1300-3.

Accordingly, copying of orphan pages is performed within an identical SSD. Accordingly, I/O may be performed only via an internal I/O bus of an SSD and an external I/O bus is not required, and thus, I/O bus traffic may be reduced. However, the numbers of orphan pages in the memory blocks of the victim stripe may be different from each other, and thus, the overall number of times an erase operation is performed may increase.

As another example, the orphan pages may be freely copied regardless of the SSD in which the orphan pages are originally stored.

According to this method, orphan pages stored in the orphan cache 1200-1 are copied into pages of a flash memory constituting each SSD. Accordingly, the number of orphan pages in each of the SSDs is the same as those in other SSDs in all cases, and thus, it is easy to generate parity information from the orphan pages and convert the orphan pages into normal valid pages. In addition, the number of times an erase operation is performed may be reduced. However, since the orphan page copying is performed by using an external I/O bus, the I/O bus traffic increases and the copy latency may increase.

As another example, orphan pages located in each memory block of a victim stripe are basically copied into the same SSD as the SSD corresponding to the memory block, and some of the orphan pages are copied from the NVRAM 1200 into SSDs in order to obtain an orphan page balance.

In detail, the orphan page balance may be obtained via the following process.

First, an average value of the valid pages is calculated by dividing the total number of valid pages included in a victim stripe by the number of memory blocks except for the memory block storing parity information from among a plurality of memory blocks that constitute the victim stripe.

Next, the valid pages included in each of the memory blocks constituting the victim stripe are copied into a memory block that is to constitute a new stripe within the same SSD in the range of less than or equal to the average value.

Next, the other valid pages included in the victim stripe are copied into the memory blocks that are to constitute the new stripe, such that the valid pages may be evenly stored in the respective memory blocks of the SSDs, which are to constitute the new stripe.

These operations will be described below with reference to FIG. 13B.

For example, the total number of valid pages included in the memory blocks #2 of the first through third SSDs 1300-1 through 1300-3 is 15. Therefore, the average value of valid pages per SSD in the victim stripe is 5. Thus, 5 or less valid pages from among the valid pages included in each of the memory blocks constituting the victim stripe are copied into a new memory block within the same SSD.

The memory block #2 of the first SSD 1300-1 has four orphan pages 1, 2, 3, and 4, the number of which is less than or equal to 5, which is the average value of valid pages per SSD in the victim stripe. Accordingly, all of the orphan pages 1, 2, 3, and 4 in the memory block #2 of the first SSD 1300-1 are copied into the memory block #M−1 of the first SSD 1300-1.

Next, the memory block #2 of the second SSD 1300-2 has six orphan pages 5, 6, 7, 8, 9, and a. Accordingly, only five orphan pages from among the six orphan pages 5, 6, 7, 8, 9, and a included in the memory block #2 are copied to another memory block of the same SSD 1300-2. For example, the orphan pages 5, 6, 7, 8, and 9 except for the orphan page a, from among the six orphan pages 5, 6, 7, 8, 9, and a of the memory block #2 in the second SSD 1300-2, are copied to the memory block #M−1 of the second SSD 1300-2.

Next, the memory block #2 of the third SSD 1300-3 has five orphan pages b, c, d, e, and f, the number of which is in the range less than or equal to the average value of valid pages per SSD in the victim stripe, which is 5. Therefore, the orphan pages b, c, d, e, and f located in the memory block #2 of the third SSD 1300-3 are copied to the memory block #M−1 of the third SSD 1300-3.

Next, the orphan page a stored in the orphan cache 1200-1 of the NVRAM 1200 is copied to the memory block #M−1 of the first SSD 1300-1 through an external copying operation.

Figure 14:
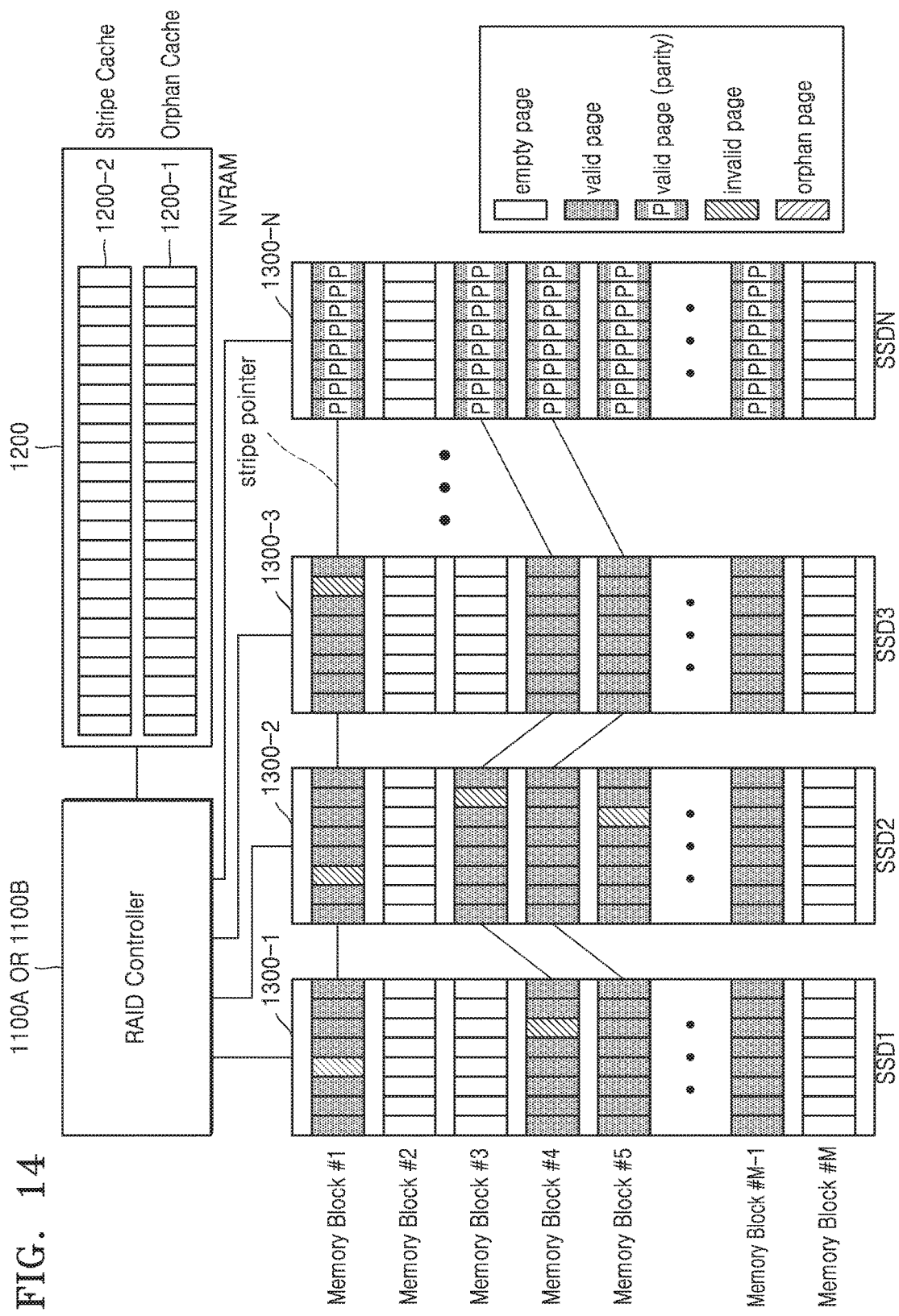
FIG. 14 illustrates an example of stripe constitution after a garbage collection operation is performed in a storage system according to an exemplary embodiment of the disclosure.

FIG. 14 illustrates an example of stripe constitution after a garbage collection operation is performed in a storage system according to an exemplary embodiment of the disclosure.

While a RAID-level garbage collection operation is being performed, the number of times an erase operation is needed by each SSD to secure one free memory block may vary. Accordingly, memory blocks that constitute a stripe may vary. In other words, although memory blocks that have the same index and are respectively included in the SSDs form a stripe at first, the memory blocks constituting a stripe may be changed as illustrated in FIG. 14 while subsequent garbage collection is being conducted.

Referring to FIG. 14, a memory block #5 of the first SSD 1300-1, a memory block #4 of the second SSD 1300-2, a memory block #5 of the third SSD 1300-3, and a memory block #4 of the N-th SSDN 1300-N constitute a stripe. Information about such a dynamic stripe constitution is stored in the stripe mapping table described above with reference to FIGS. 1-4. In other words, stripe pointer information representing constitution of each stripe illustrated in FIG. 14 may be searched for by using the stripe mapping table.

Figure 15:
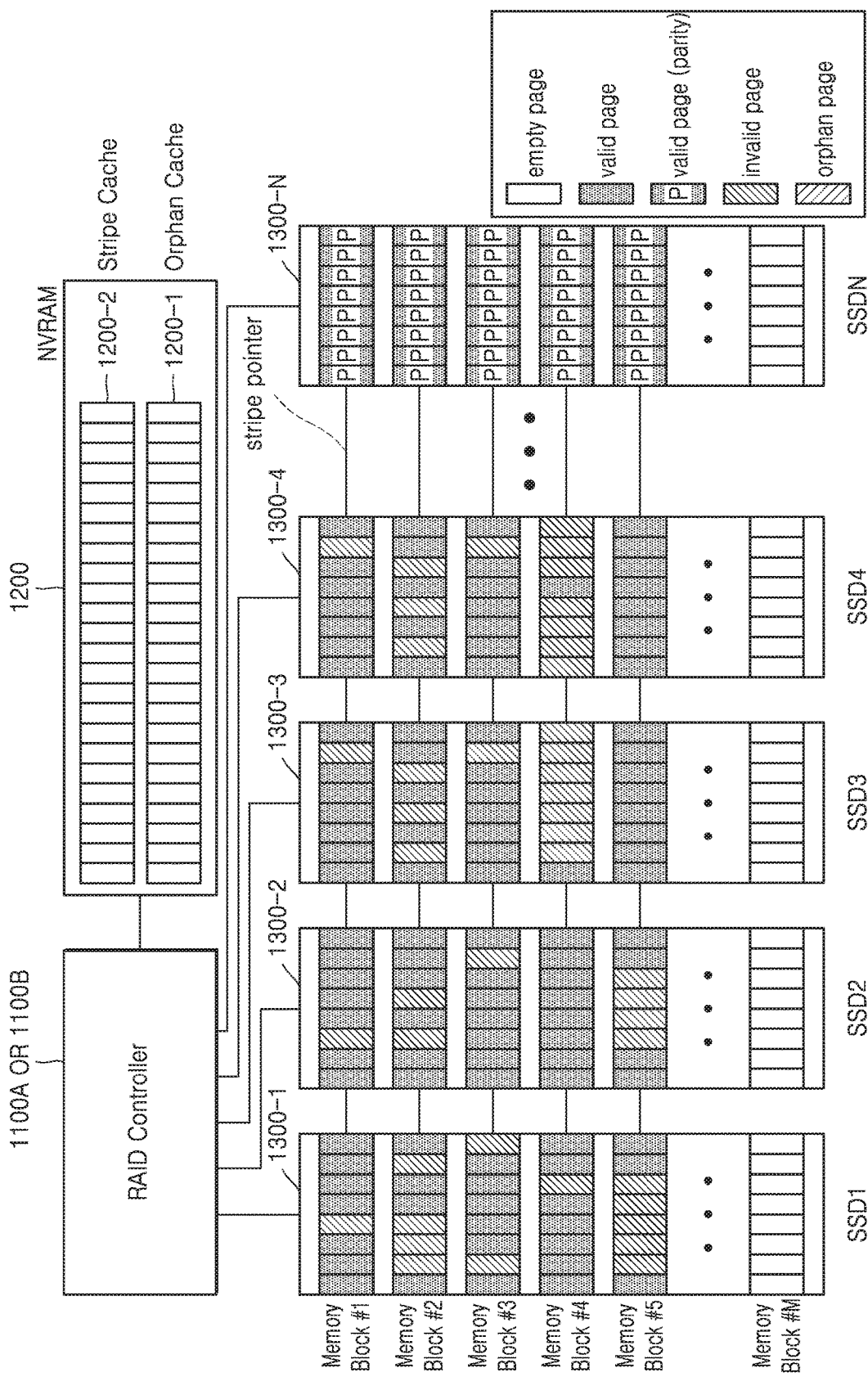
FIG. 15 is a diagram for explaining the necessity of stripe re-constitution in a storage system according to another exemplary embodiment of the disclosure.

FIG. 15 is a diagram for explaining the necessity of stripe re-constitution in a storage system according to another exemplary embodiment of the disclosure.

An SSD-based log-structured RAID storage system may select a stripe having a lowest valid page ratio as a victim stripe for garbage collection. In this case, when an imbalance between the valid page ratios of the memory blocks included in one stripe is large, many internal valid page copying operations may unnecessarily occur during garbage collection. Accordingly, the WAF may increase.

Referring to FIG. 15, if a stripe having the lowest valid page ratio is selected as a victim stripe, a stripe comprised of memory blocks having indices #4 may be selected as the victim stripe. Respective memory blocks of the third and fourth SSDs 1300-3 and 1300-4 in the selected victim stripe have low valid page ratios and thus may be deemed ideal victim blocks, whereas respective memory blocks of the first and second SSDs 1300-1 and 1300-2 in the selected victim stripe have high valid page ratios and thus cause an internal valid page copying operation to be unnecessarily performed.

In other words, in view of each individual memory block, the stripe comprised of the memory blocks having the indices #4 may not be deemed a good victim stripe. However, because of the characteristic of the log-structured RAID storage system having to select victim blocks in units of strips because of parity dependency and perform an erase operation, the stripe comprised of the memory blocks having the indices #4 is selected in consideration of only valid page ratios, and then garbage collection is performed.

In order to address this problem, exemplary embodiments of the disclosure propose the following techniques of performing a stripe reconstituting process for reducing an imbalance between the valid page ratios of the memory blocks included in a stripe.

(1) Memory block sharing technique
(2) Stripe size shrinking technique
(3) Stripe cross-merging without garbage collection
(4) Stripe cross-merging with garbage collection All of the four techniques may be applied independently of victim stripe selection. To apply the four techniques, imbalanced stripe selection needs to be performed. For convenience of explanation, an imbalanced stripe is also referred to as a target stripe.

For example, the imbalanced stripe may be selected as follows.

A stripe in which valid page ratios of at least N (where N is an integer equal to or greater than 1) memory blocks included therein are less than an initially-set first threshold value TH1 and valid page ratios of the remaining memory blocks are greater than an initially-set second threshold value TH2, which is greater than the initially-set first threshold value TH1, is set as an imbalanced stripe (target stripe).

If there exists a plurality of imbalanced stripes selected in the above-described manner, a single imbalanced stripe may be selected from the plurality of selected imbalanced stripes, based on at least one selected from a descending order of values of N, an ascending order of valid page ratios that are less than the first threshold value TH1, and a descending order of valid page ratios that are greater than the second threshold value TH2.

Referring to FIG. 15, in the stripe comprised of the memory blocks having the indices #4, a valid page ratio of the third and fourth SSDs 1300-3 and 1300-4 is 12.5%, and a valid page ratio of the first and second SSDs 1300-1 and 1300-2 is 93.8%. In a stripe comprised of memory blocks having indices #5, a valid page ratio of the first and second SSDs 1300-1 and 1300-2 is 56.3%, and a valid page ratio of the third and fourth SSDs 1300-3 and 1300-4 is 100%.

For example, when the first threshold value TH1 is set to be 50% and the second threshold value TH2 is set to be 90%, the stripe comprised of the memory blocks having the indices #4 is set as an imbalanced stripe.

As another example, when the first threshold value TH1 is set to be 60% and the second threshold value TH2 is set to be 90%, the stripe comprised of the memory blocks having the indices #4 and the stripe comprised of the memory blocks having the indices #5 become imbalanced stripe candidates. In other words, a plurality of imbalanced stripe candidates exist. For example, when a single imbalanced stripe is selected based on the ascending order of valid page ratios that are less than the first threshold value TH1, the stripe comprised of the memory blocks having the indices #4 may be selected as the single imbalanced stripe.

The four techniques for stripe reconstituting according to exemplary embodiments of the disclosure will now be described in detail.

(1) Memory Block Sharing Technique

In the memory block sharing technique, grouping of memory blocks to constitute an imbalanced stripe is changed such that at least one target memory block having a low valid page ratio from among the memory blocks included in the imbalanced stripe is replaced by a memory block having a higher valid page ratio than the at least one target memory block from among the memory blocks included in another stripe.

FIGS. 16A-16D illustrate an example of a stripe reconstituting operation performed in a storage system according to an exemplary embodiment of the disclosure. The memory block sharing technique will now be described with reference to FIGS. 16A-16D.

Figure 16A:
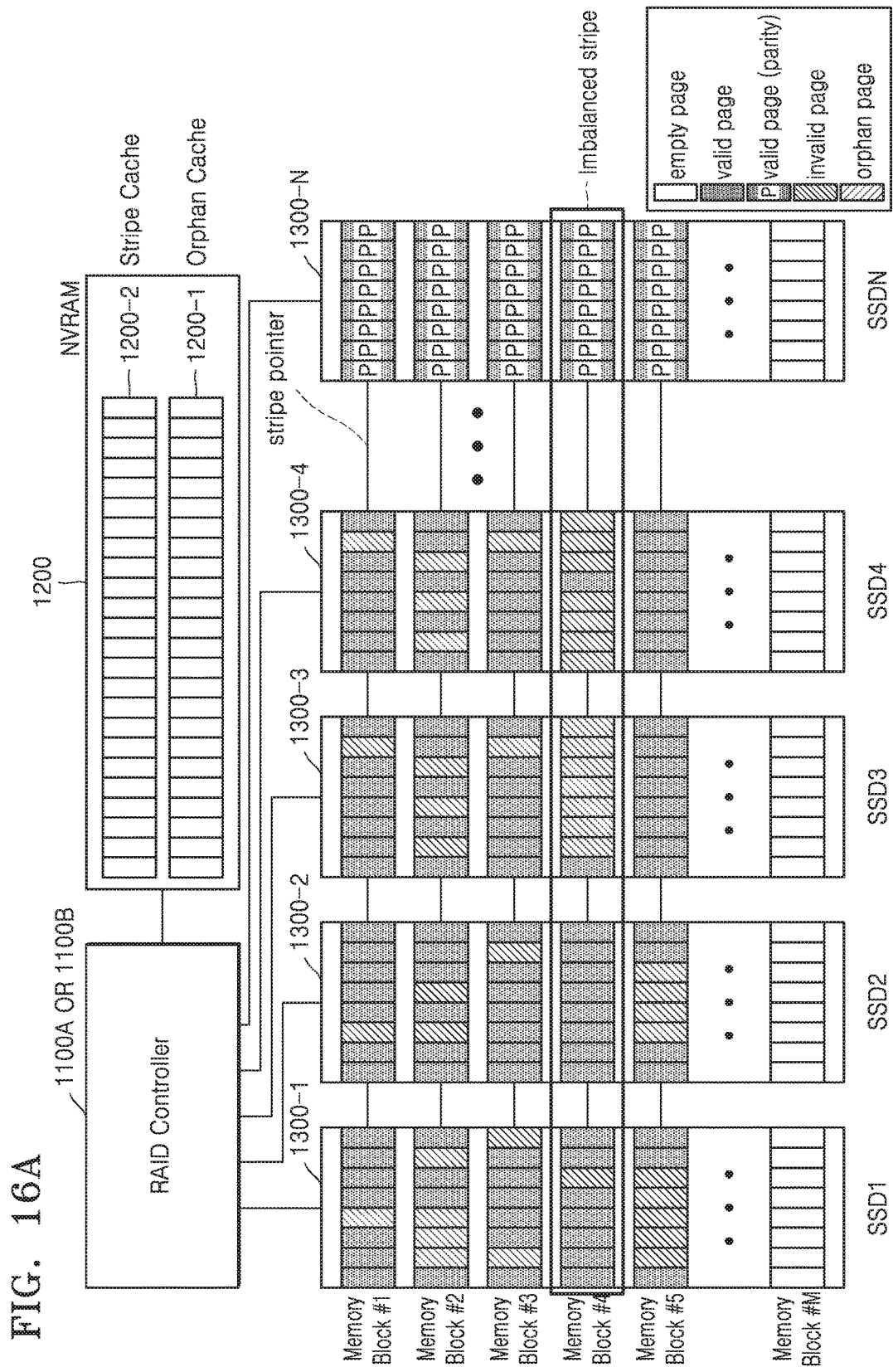

In the storage system, the RAID controller 1100A or 1100B selects an imbalanced stripe from among a plurality of stripes. Referring to FIG. 16A, the stripe comprised of the memory blocks having the indices #4 may be selected as the imbalanced stripe according to the above-described method using the stripe mapping table.

Next, the RAID controller 1100A or 1100B determines as target memory blocks the memory blocks #4 of the third and fourth SSDs 1300-3 and 1300-4 having low valid page ratios from among the memory blocks included in the imbalanced stripe and searches for memory blocks having higher valid page ratios than the target memory blocks from the memory blocks included in another stripe. Referring to FIG. 16A, the memory blocks #5 of the third and fourth SSDs 1300-3 and 1300-4 are determined as memory blocks which are to replace the target memory blocks.

Next, the RAID controller 1100A or 1100B produces a new stripe by replacing the memory blocks #4 of the third and fourth SSDs 1300-3 and 1300-4 included in the imbalanced stripe with the memory blocks #5 of the third and fourth SSDs 1300-3 and 1300-4. The RAID controller 1100A or 1100B writes parity information about the new stripe to a memory block #6 of the N-th SSD 1300-N which is included in the new stripe. The RAID controller 1100A or 1100B copies the valid pages included in the replaced memory blocks #4 of the third and fourth SSDs 1300-3 and 1300-4 into the orphan cache 1200-1 of the NVRAM 1200 and respectively into memory blocks #M of the third and fourth SSDs 1300-3 and 1300-4, which constitute an orphan stripe. Thereafter, the RAID controller 1100A or 1100B erases the memory blocks #4 of the third and fourth SSDs 1300-3 and 1300-4 and the memory block #4 of the N-th SSD 1300-N storing parity information about the imbalanced stripe. A stripe constitution state and a storage state of memory blocks after such a stripe reconstituting operation are illustrated in FIG. 16B.

As shown in FIG. 16B, a new stripe including the memory block #4 of the first SSD 1300-1, the memory block #4 of the second SSD 1300-2, the memory block #5 of the third SSD 1300-3, the memory block #5 of the fourth SSD 1300-4, and the memory block #6 of the N-th SSD 13000-N is produced by changing some of the memory blocks that constitute the imbalanced stripe.

The RAID controller 1100A or 1100B updates the stripe mapping table according to the stripe reconstitution. In other words, the RAID controller 1100A or 1100B adds information about the new stripe to the stripe mapping table and deletes information about the imbalanced stripe from the stripe mapping table.

The RAID controller 1100A or 1100B may perform an XOR calculation on parity information for the imbalanced stripe, data stored in the memory blocks that are replaced, and data stored in the memory blocks that are to replace the memory blocks in order to generate the parity information for the new stripe. In other words, when the XOR calculation is performed on the parity information of the memory block #4 of the N-th SSD 1300-N, the data stored in the memory block #4 of the third SSD 1300-3, and the data stored in the memory block #4 of the fourth SSD 1300-4, an XOR value of the data stored in the memory block #4 of the first SSD 1300-1 and the data stored in the memory block #4 of the second SSD 1300-2 is obtained. When additional XOR calculation is performed on the XOR value, the data stored in the memory block #5 of the third SSD 1300-3, and the data stored in the memory block #5 of the third SSD 1300-4, the parity information about the new stripe may be obtained. More simply, the parity information stored in memory block #6 of the N-th SSD 1300-N is an XOR calculation of memory blocks #4 of the first and second SSDs 1300-1 and 1300-2 and memory blocks #5 of the third and fourth SSDs 1300-3 and 1300-4. If the number of SSDs that constitute a stripe increases, the above-described method of calculating parity information is effective to reduce the number of XOR calculations performed.

Referring to FIG. 16B, one memory block is able to be included in several stripes. In other words, the memory block #5 of the third SSD 1300-3 and the memory block #5 of the fourth SSD 1300-4 are included in two stripes.

For example, the RAID controller 1100A or 1100B may register information about the number of stripes formed by each memory block in the stripe mapping table and manage the registered information. As another example, the number of stripes formed by each memory block may be managed by including a counter for each memory block. In detail, whenever a memory block is included in a stripe, a counter for the memory block increases by '1', and, whenever a stripe is deconstructed, a counter for a memory block included in the stripe decreases by '1'. In this way, the number of stripes formed by each memory block may be recognized. Only memory blocks having counter values of '0' may be allowed to be erased.

Figure 16C:
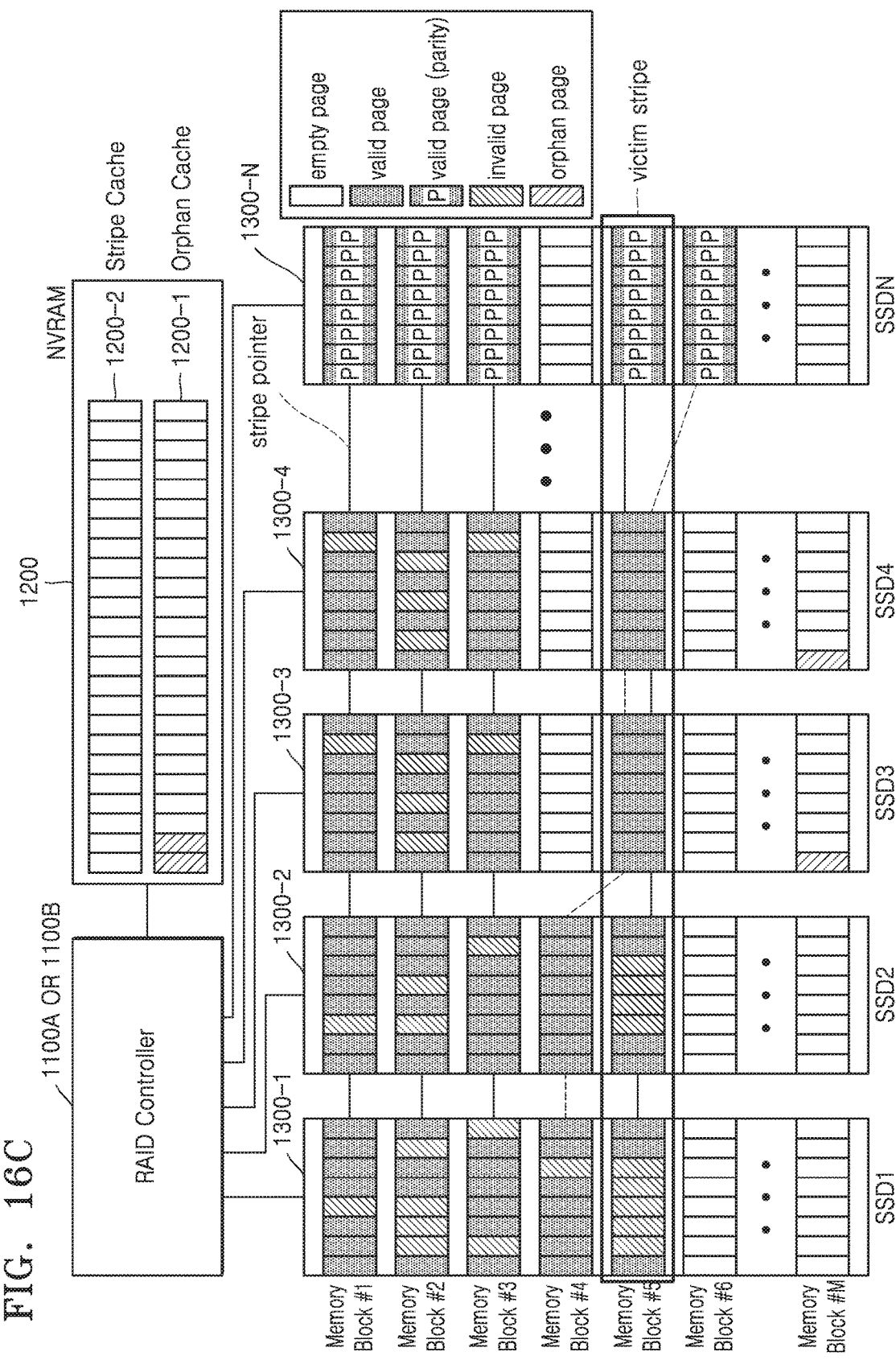

For example, after performing stripe reconstitution as shown in FIG. 16B, when the valid page ratios of the memory blocks remaining in a stripe after the stripe provides a memory block that is to replace a memory block of an imbalanced stripe are sufficiently low, the RAID controller 1100A or 1100B selects the stripe providing the replacement memory block as a victim stripe. In other words, since the valid page ratios of the respective memory blocks #5 of the first and second SSDs 1300-1 and 1300-2 are low, a stripe comprised of memory blocks #5 of the first, second, third, fourth, and N-th SSDs 1300-1, 1300-2, 1300-3, 1300-4, and 1300-N may be selected as a victim stripe, as shown in FIG. 16C.

The RAID controller 1100A or 1100B copies the valid pages included in the memory blocks #5 of the first and second SSDs 1300-1 and 1300-2 into the orphan cache 1200-1 of the NVRAM 1200 and respectively into memory blocks #M of the first and second SSDs 1300-1 and 1300-2, which constitute the orphan stripe. Thereafter, the RAID controller 1100A or 1100B erases the memory blocks #5 of the first and second SSDs 1300-1 and 1300-2 and the memory block #5 of the N-th SSD 1300-N. A stripe constitution state and a storage state of memory blocks after such a garbage collection operation are illustrated in FIG. 16D.

(2) Stripe Size Shrinking Technique

In the stripe size shrinking technique, grouping of memory blocks to constitute a stripe is changed such that at least one target memory block having a low valid page ratio from among the memory blocks included in an imbalanced stripe is excluded from the imbalanced stripe.

Figure 17A:
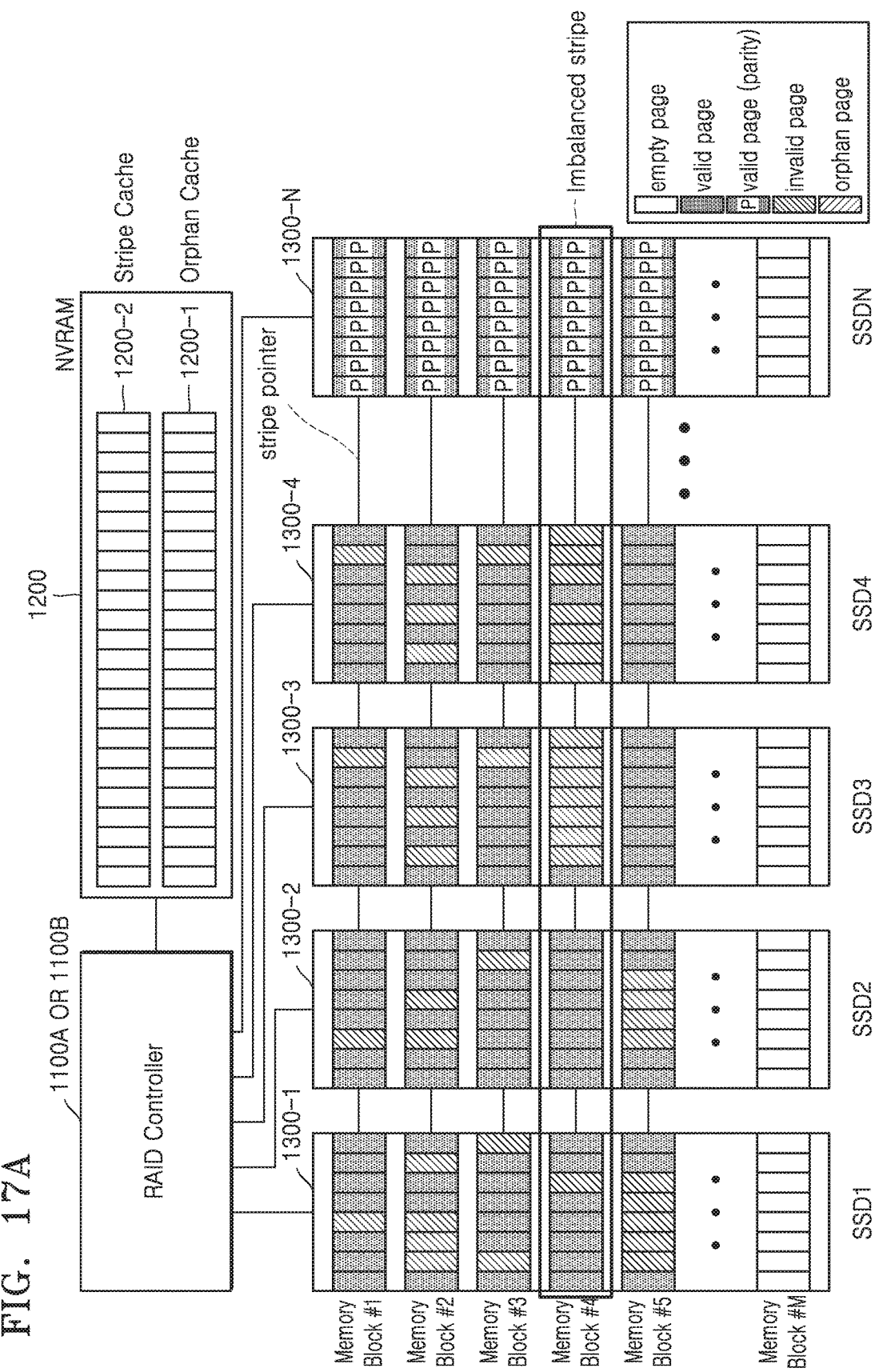
FIGS. 17A and 17B illustrate another example of a stripe reconstituting operation performed in a storage system according to an exemplary embodiment of the disclosure.
Figure 17B:
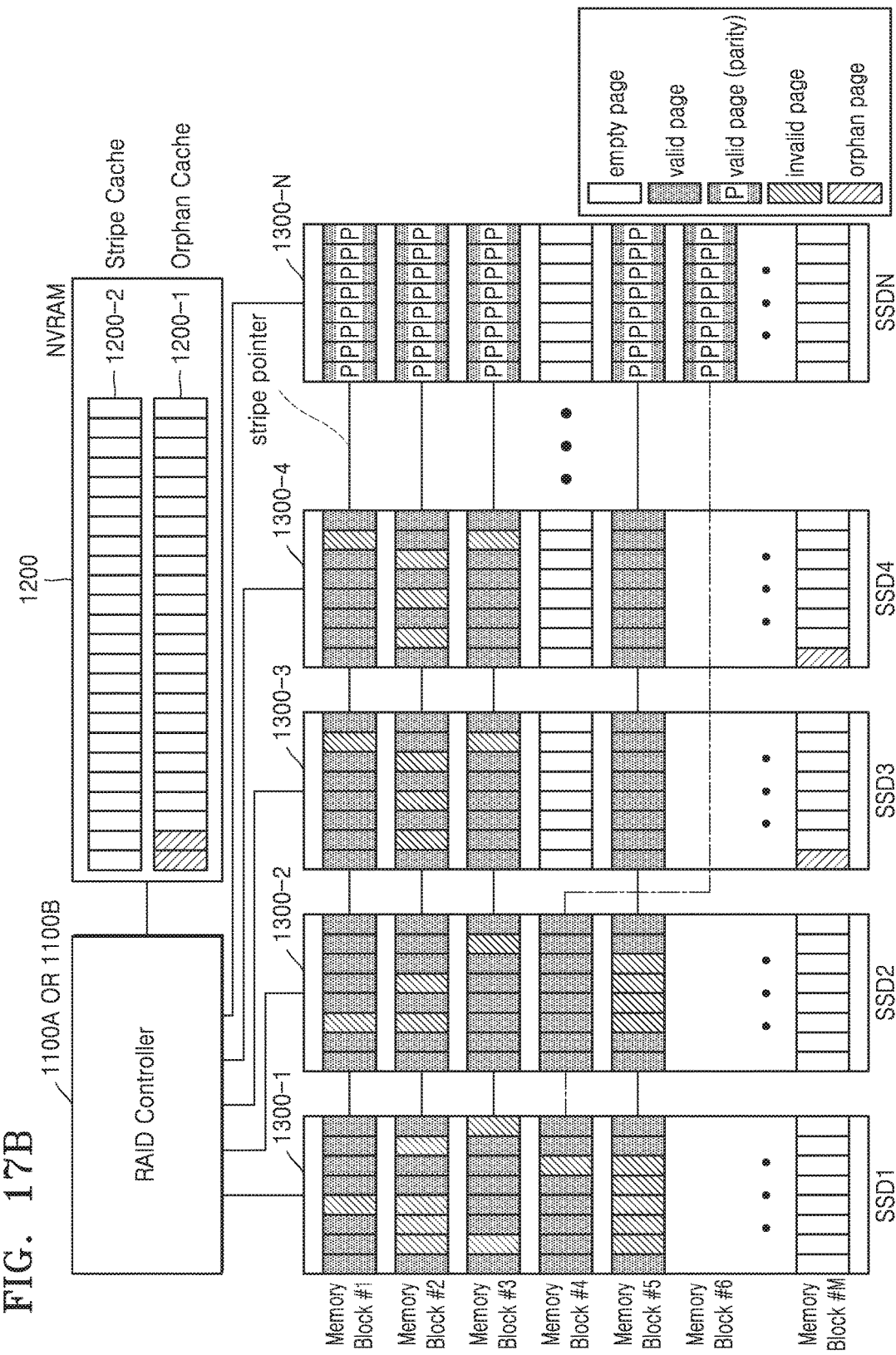

FIGS. 17A and 17B illustrate another example of a stripe reconstituting operation performed in a storage system according to an exemplary embodiment of the disclosure. The stripe size shrinking technique will now be described with reference to FIGS. 17A and 17B.

In the storage system, the RAID controller 1100A or 1100B selects an imbalanced stripe from among a plurality of stripes. Referring to FIG. 17A, the stripe comprised of the memory blocks having the indices #4 may be selected as the imbalanced stripe according to the above-described method using the stripe mapping table.

Next, the RAID controller 1100A or 1100B selects at least one target memory block having a relatively low valid page ratio from the memory blocks included in the imbalanced stripe. For example, in the imbalanced stripe comprised of the memory blocks #4, the memory block #4 of the third SSD 1300-3 and the memory block #4 of the fourth SSD 1300-4 have lower valid page ratios than the memory block #4 of the first SSD 1300-1 and the memory block #4 of the second SSD 1300-2. Accordingly, the RAID controller 1100A or 1100B selects the memory blocks #4 of the third and fourth SSDs 1300-3 and 1300-4 as target memory blocks.

Then, the RAID controller 1100A or 1100B produces a new stripe by excluding the memory blocks #4 of the third and fourth SSDs 1300-3 and 1300-4, which are target memory blocks, from the balanced stripe. The RAID controller 1100A or 1100B calculates parity information about the new stripe comprised of the memory blocks #4 of the first and second SSDs 1300-1 and 1300-2, and writes the calculated parity information to the memory block #6 of the N-th SSD 1300-N. Thereafter, the RAID controller 1100A or 1100B copies the valid pages included in the target memory blocks excluded from the imbalanced stripe into the orphan cache 1200-1 of the NVRAM 1200 and memory blocks which constitute an orphan stripe. In other words, the RAID controller 1100A or 1100B copies the valid pages included in the memory blocks #4 of the third and fourth SSDs 1300-3 and 1300-4 into the orphan cache 1200-1 of the NVRAM 1200 and respectively into memory blocks #M of the third and fourth SSDs 1300-3 and 1300-4, which constitute an orphan stripe. Thereafter, the RAID controller 1100A or 1100B erases the memory blocks #4 of the third and fourth SSDs 1300-3 and 1300-4 and the memory block #4 of the N-th SSD 1300-N storing parity information about the imbalanced stripe. A stripe constitution state and a storage state of memory blocks after such a stripe reconstituting operation are illustrated in FIG. 17B.

As shown in FIG. 17B, a new stripe including the memory block #4 of the first SSD 1300-1, the memory block #4 of the second SSD 1300-2, and the memory block #6 of the N-th SSD 13000-N is produced by excluding some of the memory blocks that constitute the imbalanced stripe.

The RAID controller 1100A or 1100B updates the stripe mapping table according to the stripe reconstitution. In other words, the RAID controller 1100A or 1100B adds information about the new stripe to the stripe mapping table and deletes information about the imbalanced stripe from the stripe mapping table.

(3) Stripe Cross-Merging without Garbage Collection

In stripe cross-merging without garbage collection, grouping of memory blocks to constitute two imbalanced stripes is changed such that a new stripe comprised of memory blocks having high valid page ratios and another new stripe comprised of memory blocks having low valid page ratios are produced via exchange of memory blocks between the two imbalanced stripes.

Figure 18A:
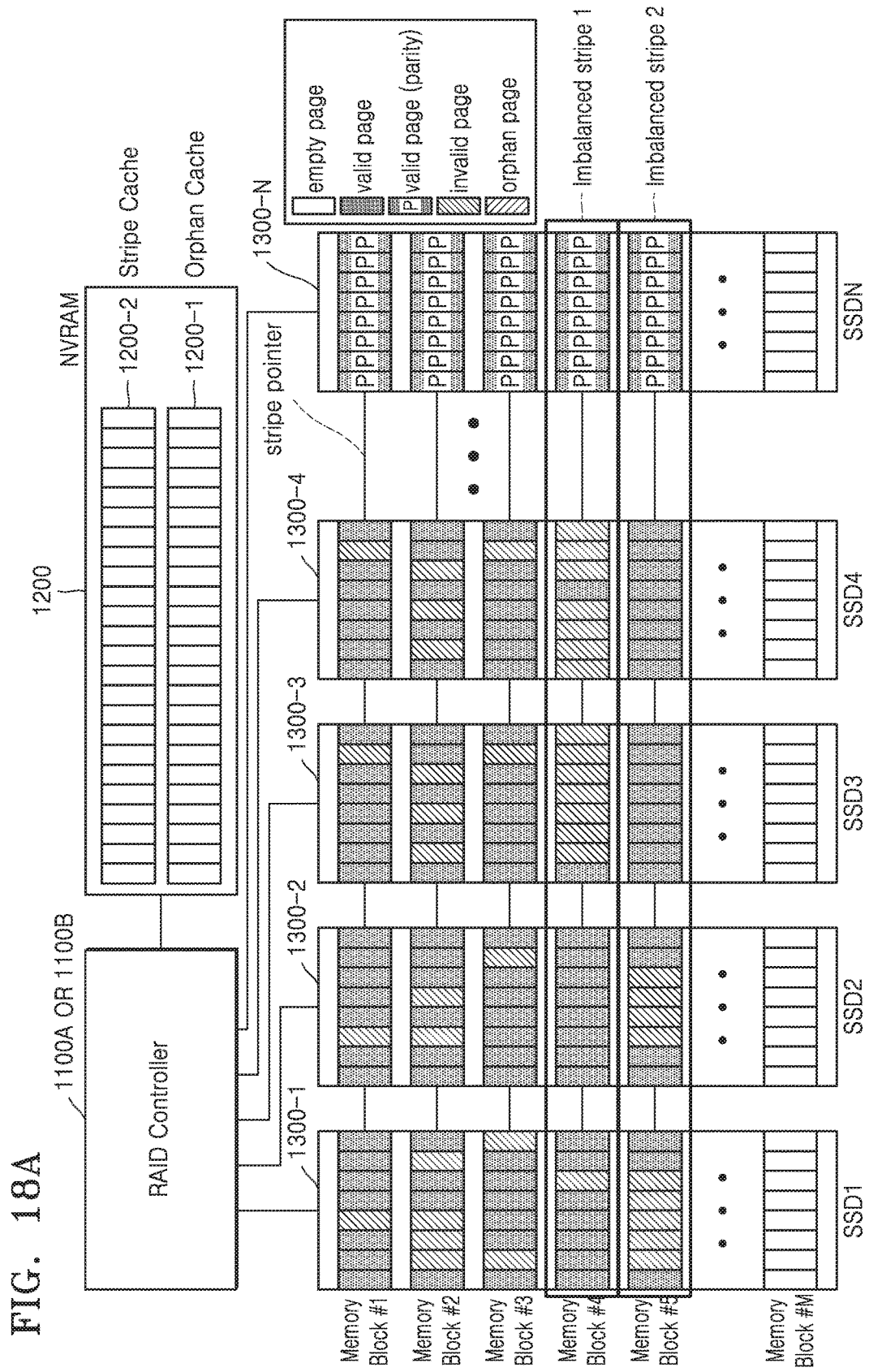

FIGS. 18A and 18B illustrate another example of a stripe reconstituting operation performed in a storage system according to an exemplary embodiment of the disclosure. The stripe cross-merging technique without garbage collection will now be described with reference to FIGS. 18A and 18B.

In the storage system, the RAID controller 1100A or 1100B selects an imbalanced stripe from among a plurality of stripes. Referring to FIG. 18A, the stripe comprised of the memory blocks having the indices #4 may be selected as a first imbalanced stripe according to the above-described method using the stripe mapping table.

Next, the RAID controller 1100A or 1100B searches for a second imbalanced stripe in which memory blocks having relatively low valid page ratios do not overlap memory blocks having relatively low valid page ratios from among the memory blocks included in the first imbalanced stripe. Referring to FIG. 18A, memory blocks having relatively low valid page ratios included in the first imbalanced stripe comprised of the memory blocks #4 are the memory block #4 of the third SSD 1300-3 and the memory block #4 of the fourth SSD 1300-4. Memory blocks having relatively low valid page ratios included in a stripe comprised of the memory blocks #5 are the memory block #5 of the first SSD 1300-1 and the memory block #5 of the second SSD 1300-2. In other words, the memory blocks having relatively low valid page ratios included in the first imbalanced stripe comprised of the memory blocks #4 are included in the third and fourth SSDs 1300-3 and 1300-4, and the memory blocks having relatively low valid page ratios included in the stripe comprised of the memory blocks #5 are included in the first and second SSDs 1300-1 and 1300-2. In other words, the memory blocks having relatively low valid page ratios in the first imbalanced stripe do not overlap with those in the stripe comprised of the memory blocks #5. Accordingly, the RAID controller 1100A or 1100B may select the stripe comprised of the memory blocks #5 as the second imbalanced stripe.

Next, the RAID controller 1100A or 1100B produce a new stripe comprised of memory blocks having high valid page ratios and another new stripe comprised of memory blocks having low valid page ratios by exchanging memory blocks between the first and second imbalanced stripes. For example, as shown in FIG. 18B, the two new stripes may be produced by exchanging the memory blocks of the third and fourth SSDs 1300-3 and 1300-4 between the first and second imbalanced stripes. In other words, a new stripe comprised of a memory block #4 of the first SSD 1300-1 having a high valid page ratio, a memory block #4 of the second SSD 1300-2 having a high valid page ratio, a memory block #5 of the third SSD 1300-3 having a high valid page ratio, and a memory block #5 of the fourth SSD 1300-4 having a high valid page ratio may be produced, and another new stripe comprised of a memory block #5 of the first SSD 1300-1 having a low valid page ratio, a memory block #5 of the second SSD 1300-2 having a low valid page ratio, a memory block #4 of the third SSD 1300-3 having a low valid page ratio, and a memory block #4 of the fourth SSD 1300-4 having a low valid page ratio may be produced. The RAID controller 1100A or 1100B calculates parity information about each of the two new stripes and writes the two pieces of calculated parity information to respective memory blocks included in the two new stripes. For example, the respective pieces of parity information about the two new stripes are written to memory blocks #6 and #7 of the N-th SSD 1300-N. Thereafter, the RAID controller 1100A or 1100B erases memory blocks of the first and second imbalanced stripes that store respective pieces of parity information about the first and second imbalanced stripes. For example, the RAID controller 1100A or 1100B erases the memory block #4 of the N-th SSD 1300-N, which has stored the parity information about the first imbalanced stripe, and the memory block #5 of the N-th SSD 1300-N, which has stored the parity information about the second imbalanced stripe.

Accordingly, as shown in FIG. 18B, a new stripe including the memory block #4 of the first SSD 1300-1, the memory block #4 of the second SSD 1300-2, the memory block #5 of the third SSD 1300-3, the memory block #5 of the fourth SSD 1300-4, and the memory block #7 of the N-th SSD 13000-N, and another new stripe including the memory block #5 of the first SSD 1300-1, the memory block #5 of the second SSD 1300-2, the memory block #4 of the third SSD 1300-3, the memory block #4 of the fourth SSD 1300-4, and the memory block #6 of the N-th SSD 13000-N are produced by exchanging some memory blocks between the first and second imbalanced stripes.

The RAID controller 1100A or 1100B updates the stripe mapping table according to the stripe reconstitution. In other words, the RAID controller 1100A or 1100B adds information about the two new stripes to the stripe mapping table and deletes information about the two imbalanced stripes from the stripe mapping table.

(4) Stripe Cross-Merging with Garbage Collection

In stripe cross-merging with garbage collection, a new stripe comprised of memory blocks having high valid page ratios is produced by exchanging memory blocks between two imbalanced stripes, and garbage collection is performed.

Figure 19A:
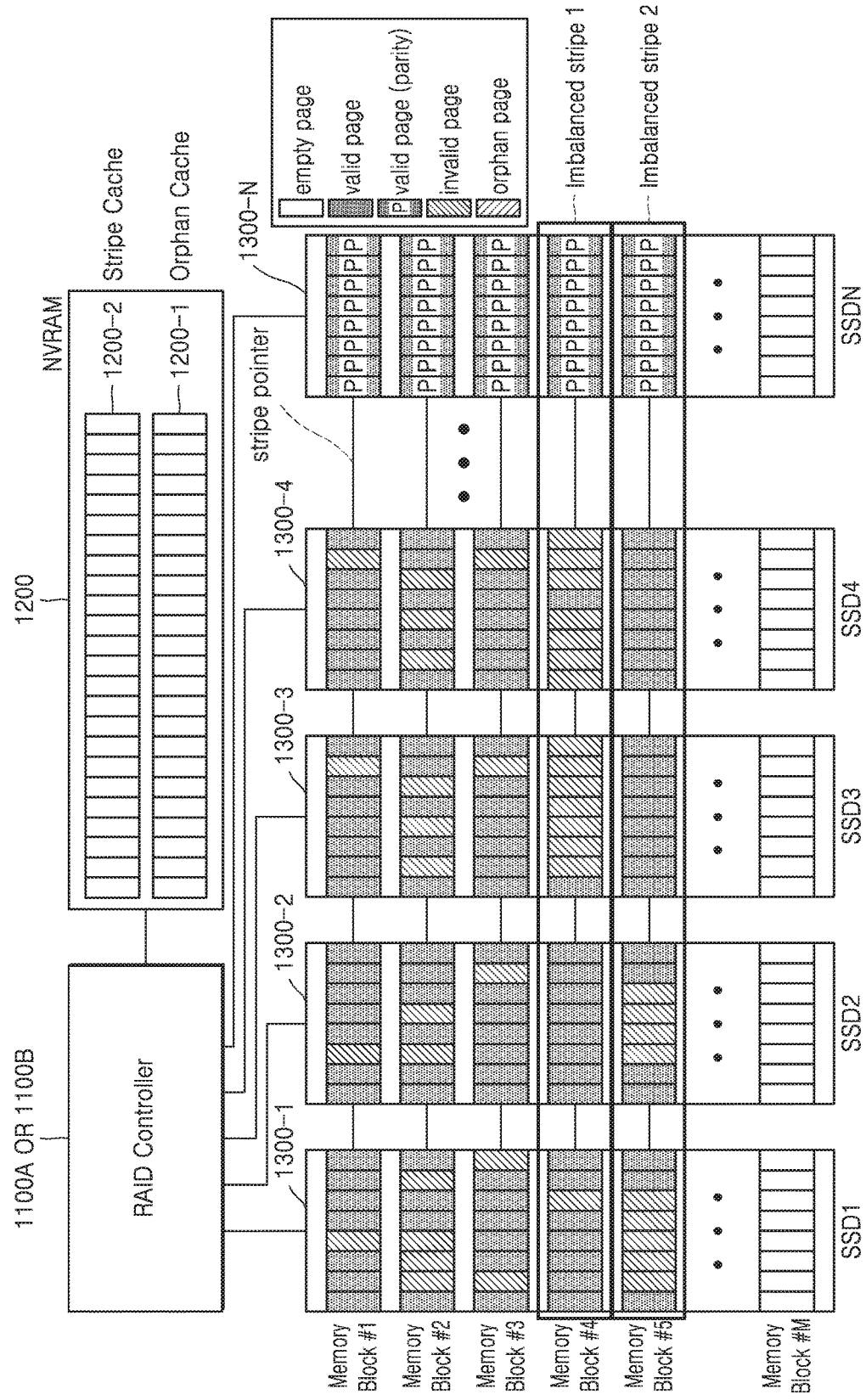
FIGS. 19A and 19B illustrate another example of a stripe reconstituting operation performed in a storage system according to an exemplary embodiment of the disclosure.
Figure 19B:
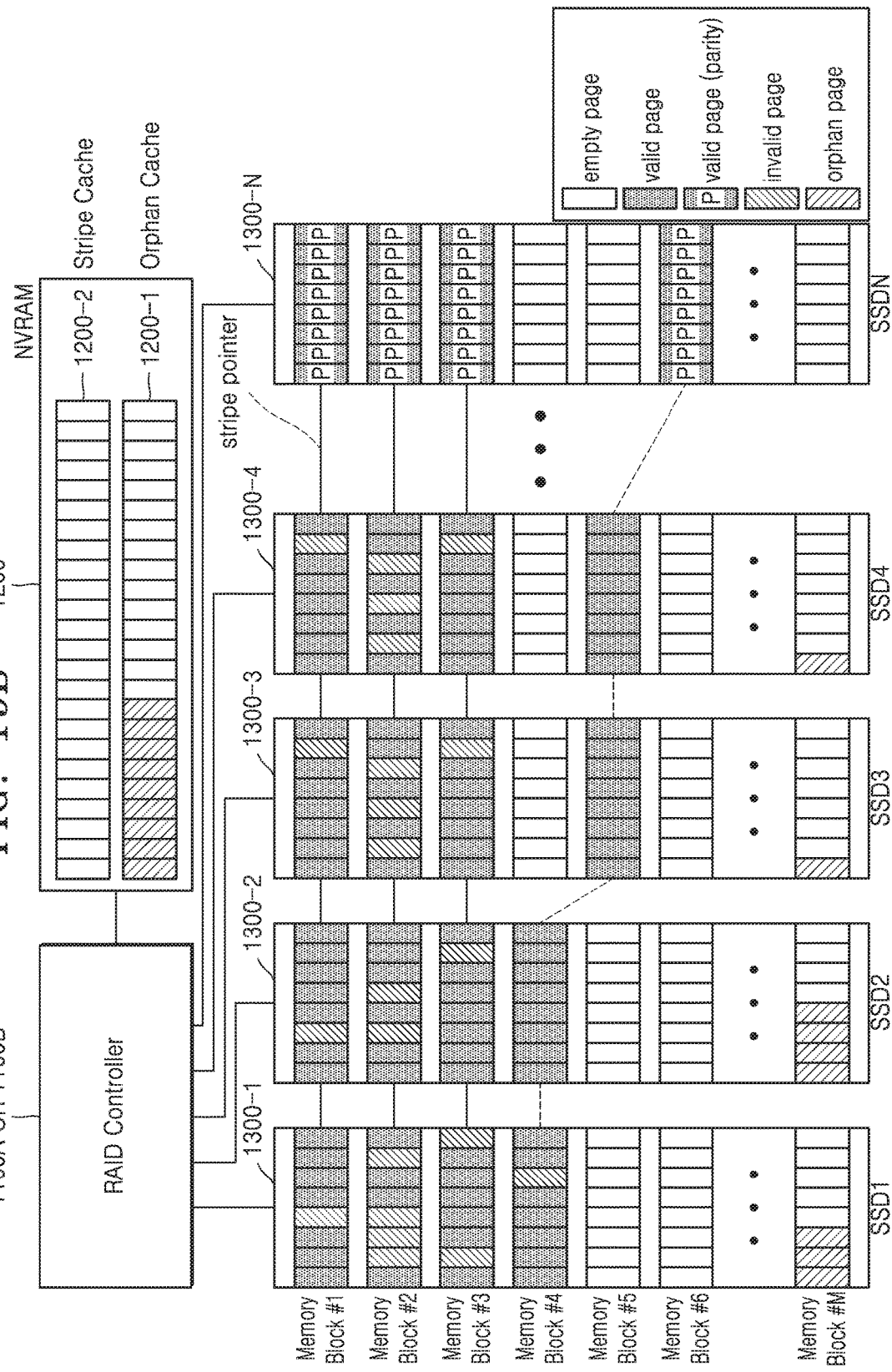

FIGS. 19A and 19B illustrate another example of a stripe reconstituting operation performed in a storage system according to an exemplary embodiment of the disclosure. The stripe cross-merging technique with garbage collection will now be described with reference to FIGS. 19A and 19B.

In the storage system, the RAID controller 1100A or 1100B selects an imbalanced stripe from among a plurality of stripes. Referring to FIG. 19A, the stripe comprised of the memory blocks having the indices #4 may be selected as a first imbalanced stripe according to the above-described method using the stripe mapping table.

Next, the RAID controller 1100A or 1100B searches for a second imbalanced stripe in which memory blocks having relatively high valid page ratios do not overlap memory blocks having relatively high valid page ratios from among the memory blocks included in the first imbalanced stripe. Referring to FIG. 18A, memory blocks having relatively high valid page ratios included in the first imbalanced stripe comprised of the memory blocks #4 are the memory block #4 of the first SSD 1300-1 and the memory block #4 of the second SSD 1300-2. Memory blocks having relatively high valid page ratios included in a stripe comprised of the memory blocks #5 are the memory block #5 of the third SSD 1300-3 and the memory block #5 of the fourth SSD 1300-4. In other words, the memory blocks having relatively high valid page ratios included in the first imbalanced stripe comprised of the memory blocks #4 are included in the first and second SSDs 1300-1 and 1300-2, and the memory blocks having relatively high valid page ratios included in the stripe comprised of the memory blocks #5 are included in the third and fourth SSDs 1300-3 and 1300-4. In other words, the memory blocks having relatively high valid page ratios in the first imbalanced stripe do not overlap with those in the stripe comprised of the memory blocks #5. Accordingly, the RAID controller 1100A or 1100B may select the stripe comprised of the memory blocks #5 as the second imbalanced stripe.

Next, the RAID controller 1100A or 1100B produces a new stripe comprised of memory blocks having high valid page ratios by exchanging memory blocks between the first and second imbalanced stripes. For example, as shown in FIG. 19B, one new stripe having a high valid page ratio may be produced by exchanging the memory blocks of the third and fourth SSDs 1300-3 and 1300-4 between the first and second imbalanced stripes. In other words, a new stripe comprised of a memory block #4 of the first SSD 1300-1 having a high valid page ratio, a memory block #4 of the second SSD 1300-2 having a high valid page ratio, a memory block #5 of the third SSD 1300-3 having a high valid page ratio, and a memory block #5 of the fourth SSD 1300-4 having a high valid page ratio may be produced. The RAID controller 1100A or 1100B calculates parity information about the new stripe and writes the calculated parity information to a memory block included in the new stripe. For example, the parity information about the new stripe is written to the memory block #6 of the N-th SSD 1300-N.

Thereafter, the RAID controller 1100A or 1100B copies the valid pages included in the memory blocks not included in the new stripe from among the memory blocks included in the first and second imbalanced stripes into the orphan cache 1200-1 of the NVRAM 1200 and the memory blocks which constitute an orphan stripe. In other words, the RAID controller 1100A or 1100B copies the valid pages included in the memory block #5 of the first SSD 1300-1, the memory block #5 of the second SSD 1300-2, the memory block #4 of the third SSD 1300-3, and the memory block #4 of the fourth SSD 1300-4 into the orphan cache 1200-1 of the NVRAM 1200 and respectively into memory blocks #M of the first through fourth SSDs 1300-1 through 1300-4, which constitute an orphan stripe.

Next, the RAID controller 1100A or 1100B erases the memory blocks which respectively have stored respective pieces of parity information about the first and second imbalanced stripes, and the memory blocks not included in the new stripe from among the memory blocks included in the first and second imbalanced stripes. In other words, the RAID controller 1100A or 1100B erases the memory block #5 of the first SSD 1300-1, the memory block #5 of the second SSD 1300-2, the memory block #4 of the third SSD 1300-3, the memory block #4 of the first SSD 1300-1, and the memory blocks #4 and #5 of the N-th SSD 1300-N.

The RAID controller 1100A or 1100B updates the stripe mapping table according to the stripe reconstitution. In other words, the RAID controller 1100A or 1100B adds information about the single new stripe to the stripe mapping table and deletes information about the two imbalanced stripes from the stripe mapping table.

Figure 20:
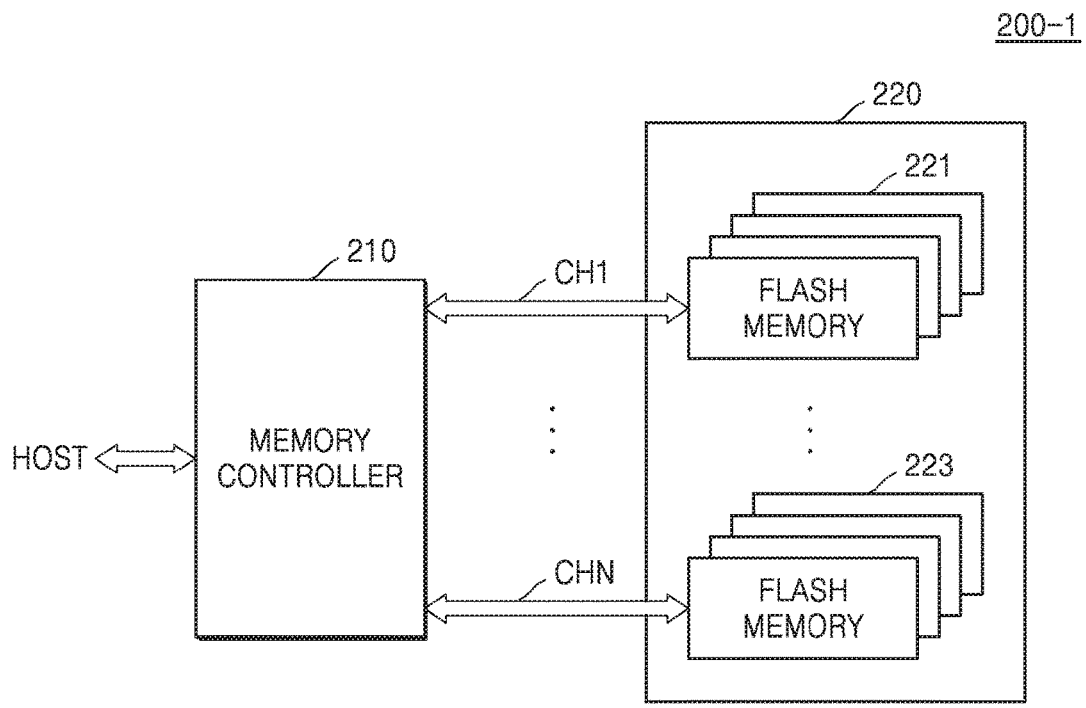
FIG. 20 is a block diagram of a SSD forming a storage system according to an exemplary embodiment of the disclosure.

FIG. 20 is a block diagram of an SSD 200-1 forming a storage system according to an exemplary embodiment of the disclosure.

Referring to FIG. 20, the SSD 200-1 may include a memory controller 210 and a memory device 220.

The memory controller 210 may control the memory device 220 according to a command received from a host. In detail, the memory controller 210 may provide an address, a command, and a control signal to the memory device 220 via a plurality of channels CH1 through CHN to control a program (or write) operation, a read operation, and an erase operation with respect to the memory device 220.

The memory device 220 may include at least one flash memory chip, namely, flash memory chips 221 and 223. As another example, the memory device 220 may not only be comprised of flash memory chips but also of PRAM chips, FRAM chips, MRAM chips, or the like.

In FIG. 20, the SSD 200-1 includes N channels (where N is a natural number), and each channel includes four flash memory chips. The number of flash memory chips included in each of the channels may be variously set.

Figure 21:
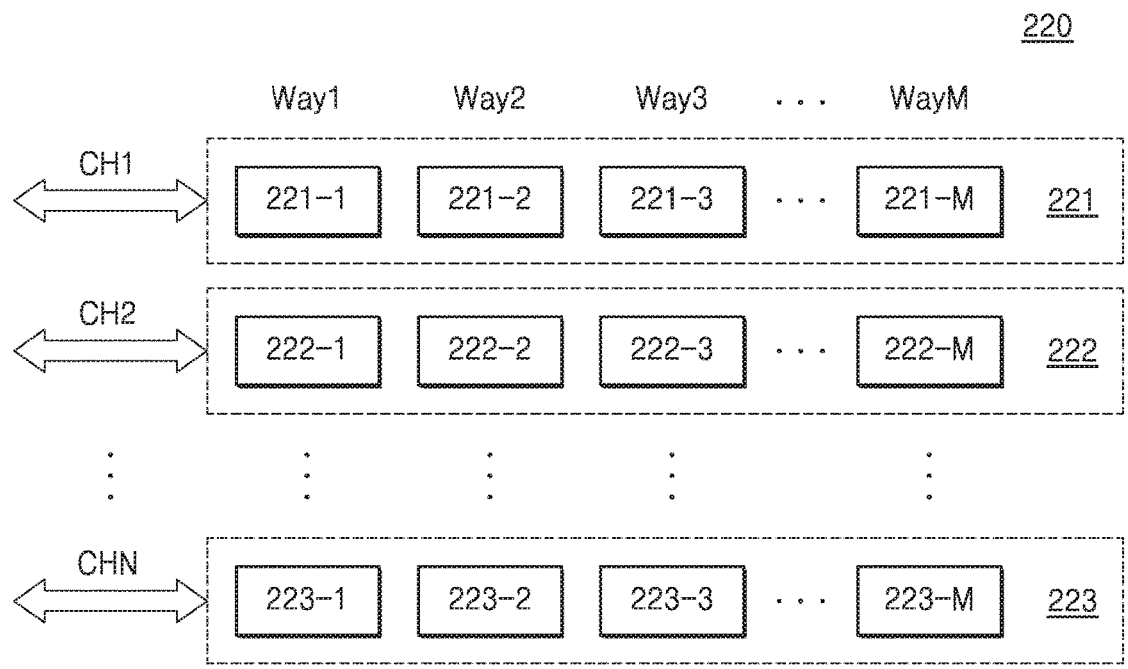
FIG. 21 exemplarily shows channels and ways in the SSD of FIG. 20.

FIG. 21 exemplarily shows channels and ways in the SSD 220 of FIG. 20.

A plurality of flash memory chips 221, 222, through to 223 may be electrically connected to the channels CH1 to CHN, respectively. The channels CH1 to CHN may be independent buses, through which commands, addresses, and data may be transmitted to or received from the flash memory chips 221, 222, through to 223, respectively. The flash memory chips connected to different channels may operate independently from each other. Each of the plurality of flash memory chips 221, 222, through to 223 respectively connected to the channels CH1 to CHN may form a plurality of ways Way1 to WayM. M flash memory chips may be respectively connected to the M ways formed in each channel.

For example, flash memory chips 221-1 to 221-M may form M ways way1 to wayM in the first channel CH1. The flash memory chips 221-1 to 221-M may be respectively connected to the M ways Way1 to WayM in the first channel CH1. The above relations between the flash memory chips, the channels, and the ways may be applied to flash memory chips 222 and flash memory chips 223.

A way is a unit for identifying the flash memory chips sharing an identical channel with each other. Each of the flash memory chips may be identified according to a channel number and a way number. A channel and a way of a flash memory chip, which is to perform a request transmitted from the host, may be determined by a logical address transmitted from the host.

Figure 22:
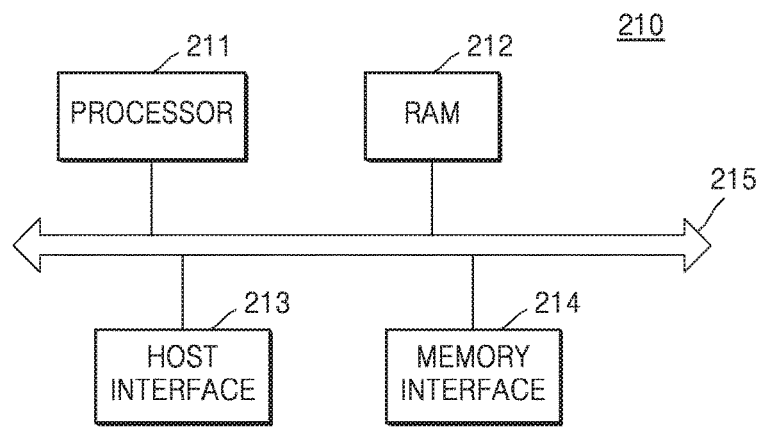
FIG. 22 is a block diagram illustrating a detailed structure of a memory controller included in the SSD illustrated in FIG. 20.

FIG. 22 is a block diagram illustrating a detailed structure of the memory controller 210 illustrated in FIG. 21.

As shown in FIG. 22, the memory controller 210 includes a processor 211, a RAM 212, a host interface 213, a memory interface 214, and a bus 215.

The components of the memory controller 210 are electrically connected to each other via the bus 215.

The processor 211 may control an overall operation of the SSD 200-1 by using program codes and pieces of data that are stored in the RAM 212. When the SSD 200-1 is initialized, the processor 211 reads from the memory device 220 a program code and data which are necessary for controlling operations performed by the SSD 200-1, and loads the read program code and data into the RAM 212.

The processor 211 may perform a control operation corresponding to the command received from the host, by using the program codes and the pieces of data that are stored in the RAM 212. In detail, the processor 211 may execute a write command or a read command received from the host. The processor 211 may control the SSD 200-1 to perform a page copying operation or a memory block erase operation according to a garbage collection operation based on the command received from the host.

The host interface 213 includes a protocol for exchanging data with a host that is connected to the memory controller 210, and interfaces the memory controller 210 with the host. The host interface 213 may be implemented by using, but is not limited to, an Advanced Technology Attachment (ATA) interface, a Serial Advanced Technology Attachment (SATA) interface, a Parallel Advanced Technology Attachment (PATA) interface, a Universal Serial Bus (USB) or Serial Attached Small Computer System (SAS) interface, a Small Computer System Interface (SCSI), an embedded Multi Media Card (eMMC) interface, or a Universal Flash Storage (UFS) interface. The host interface 213 may receive a command, an address, and data from the host under the control of the processor 211 or may transmit data to the host.

The memory interface 214 is electrically connected to the memory device 220. The memory interface 214 may transmit a command, an address, and data to the memory device 220 under the control of the processor 211 or may receive data from the memory device 220. The memory interface 214 may be configured to support NAND flash memory or NOR flash memory. The memory interface 214 may be configured to perform software and hardware interleaving operations via a plurality of channels.

Figure 23:
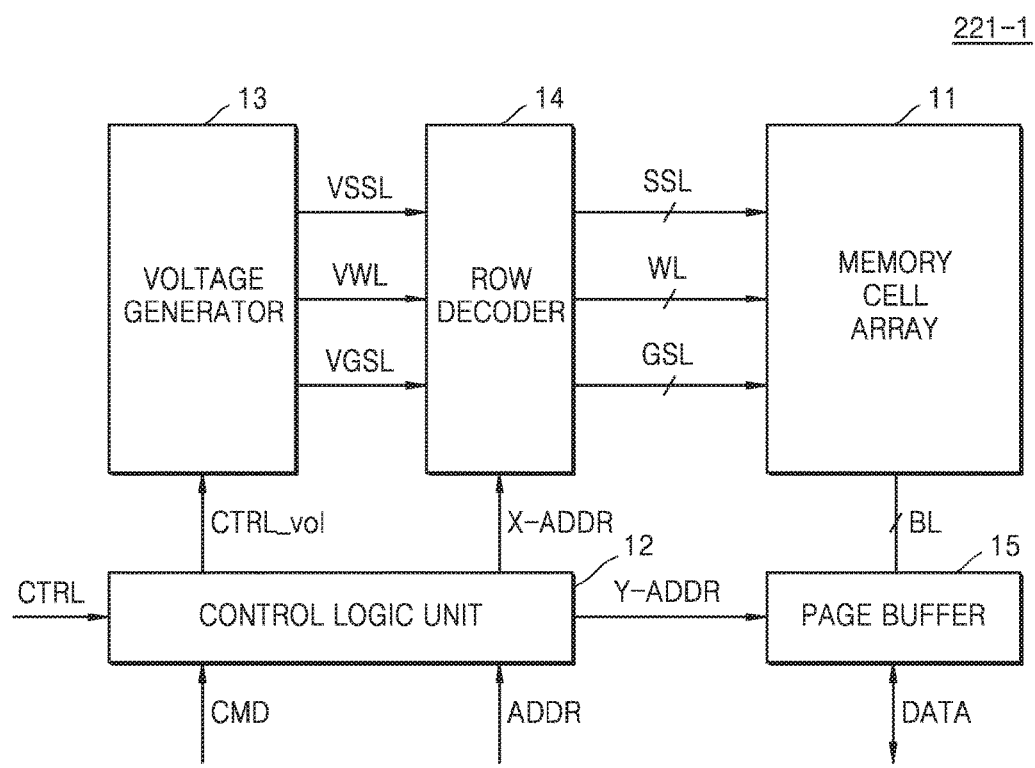
FIG. 23 is a block diagram illustrating a detailed structure of a flash memory chip included in a memory device included in the SSD of FIG. 21.

FIG. 23 is a block diagram illustrating a detailed structure of the flash memory chip 221-1 included in the memory device 220 of FIG. 21.

Referring to FIG. 23, the flash memory chip 221-1 may include a memory cell array 11, a control logic unit 12, a voltage generator 13, a row decoder 14, and a page buffer 15.

The components included in the flash memory chip 221-1 will now be described in detail.

The memory cell array 11 may be connected to at least one string selection line SSL, a plurality of word lines WL, and at least one ground selection line GSL, and may also be connected to a plurality of bit lines BL. The memory cell array 11 may include a plurality of memory cells MC that are disposed at intersections of the plurality of bit lines BL and the plurality of word lines WL.

When an erasure voltage is applied to the memory cell array 11, the plurality of memory cells MC enter an erasure state. When a programming voltage is applied to the memory cell array 11, the plurality of memory cells MC enter a program state. At this time, each memory cell MC may have one selected from an erasure state and first through n-th program states P1 through Pn that are distinguished from each other according to a threshold voltage.

In the first through n-th program states P1 through Pn, n may be a natural number equal to or greater than 2. For example, when each memory cell MC is a 2-bit level cell, n may be 3. In another example, when each memory cell MC is a 3-bit level cell, n may be 7. In another example, when each memory cell MC is a 4-bit level cell, n may be 15. As such, the plurality of memory cells MC may include multi-level cells. However, exemplary embodiments of the disclosure are not limited thereto, and the plurality of memory cells MC may include single-level cells.

The control logic unit 12 may receive a command signal CMD, an address signal ADDR, and a control signal CTRL from the memory controller 210 to output various control signals for writing the data DATA to the memory cell array 11 or for reading the data from the memory cell array 11. In this way, the control logic unit 12 may control overall operations of the flash memory chip 221-1.

The various control signals output by the control logic unit 12 may be provided to the voltage generator 13, the row decoder 14, and the page buffer 15. In detail, the control logic unit 12 may provide a voltage control signal CTRL_vol to the voltage generator 13, may provide a row address signal X_ADDR to the row decoder 14, and may provide a column address signal Y_ADDR to the page buffer 15.

The voltage generator 13 may receive the voltage control signal CTRL_vol to generate various voltages for executing a program operation, a read operation and an erasure operation with respect to the memory cell array 11. In detail, the voltage generator 13 may generate a first drive voltage VWL for driving the plurality of word lines WL, a second drive voltage VSSL for driving the at least one string selection line SSL, and a third drive voltage VGSL for driving the at least one ground selection line GSL.

The first drive voltage VWL may be a program (or write) voltage, a read voltage, an erasure voltage, a pass voltage, or a program verification voltage. The second drive voltage VSSL may be a string selection voltage, namely, an on voltage or an off voltage. The third drive voltage VGSL may be a ground selection voltage, namely, an on voltage or an off voltage.

According to the present exemplary embodiment, the voltage generator 13 may receive the voltage control signal CTRL_vol to generate a program start voltage as a program voltage, when a program loop starts, namely, when the number of program loops performed is 1. As the number of program loops performed increases, the voltage generator 13 may generate a voltage that increases from the program start voltage by a step voltage in stages, as the program voltage.

The row decoder 14 may be connected to the memory cell array 11 through the plurality of word lines WL and may activate some of the plurality of word lines WL in response to the row address signal X_ADDR received from the control logic unit 12. In detail, during a read operation, the row decoder 14 may apply a read voltage to a word line selected from the plurality of word lines WL and apply a pass voltage to the remaining unselected word lines.

During a program operation, the row decoder 14 may apply a program voltage to the selected word line and apply the pass voltage to the unselected word lines. According to the present exemplary embodiment, the row decoder 14 may apply a program voltage to the selected word line and an additionally selected word line, in at least one selected from a plurality of program loops.

The page buffer 15 may be connected to the memory cell array 11 via the plurality of bit lines BL. In detail, during a read operation, the page buffer 15 may operate as a sense amplifier so as to output data DATA stored in the memory cell array 11. During a program operation, the page buffer 15 may operate as a write driver so as to input the data DATA desired to be stored in the memory cell array 11.

Figure 24:
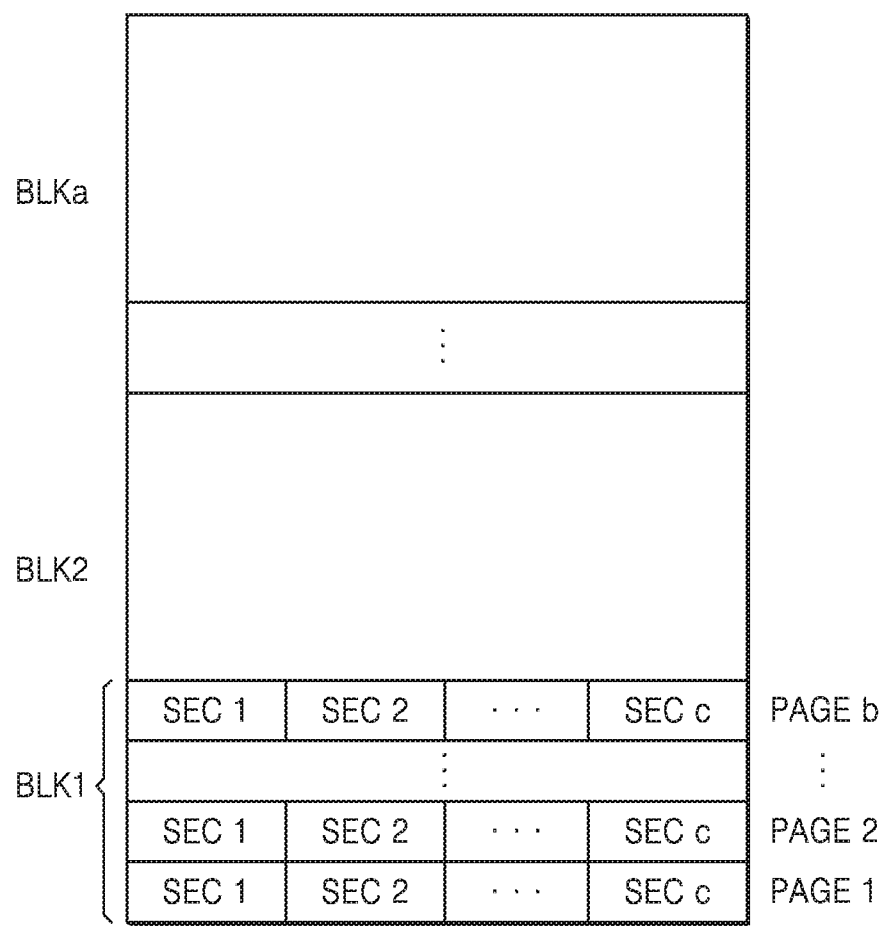
FIG. 24 illustrates a memory cell array included in the flash memory chip illustrated in FIG. 23.

FIG. 24 illustrates the memory cell array 11 of FIG. 23.

Referring to FIG. 24, the memory cell array 11 may be a flash memory cell array. In this case, the memory cell array 11 may include a plurality of memory blocks BLK1, BLK2, . . . , and BLKa (where "a" denotes a positive integer which is equal to or greater than two) and each of the memory blocks BLK1, . . . , and BLKa may include a plurality of pages PAGE1, PAGE2, . . . , and PAGEb (where "b" denotes a positive integer which is equal to or greater than two). In addition, each of the pages PAGE1, . . . , and PAGEb may include a plurality of sectors SEC1, SEC2, . . . , and SECc (where "c" denotes a positive integer which is equal to or greater than two). Although only the pages PAGE1 through PAGEb and the sectors SEC1 through SECc of the memory block BLK1 are illustrated for convenience of explanation in FIG. 24, the other memory blocks BLK2 through BLKa may have the same structures as that of the memory block BLK1.

Figure 25:
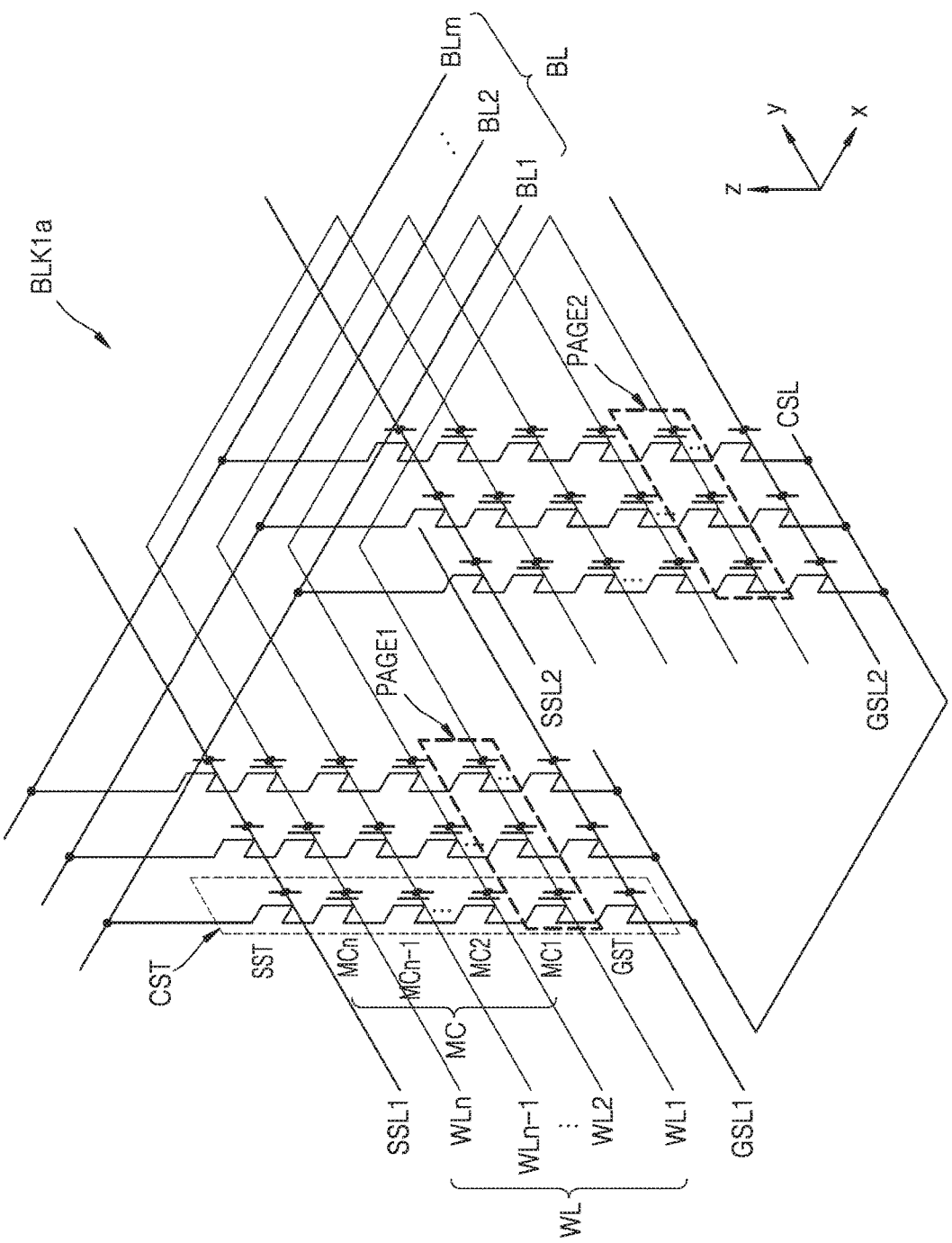
FIG. 25 is an equivalent circuit diagram of a first memory block included in the memory cell array of FIG. 23.

FIG. 25 is an equivalent circuit diagram illustrating a first memory block BLK1a, which is an example of the memory block BLK1 included in the memory cell array 11 of FIG. 24.

Referring to FIG. 25, the first memory block BLK1a may be a NAND flash memory having a vertical structure. In FIG. 25, a first direction is referred to as an x direction, a second direction is referred to as a y direction, and a third direction is referred to as a z direction. However, exemplary embodiments of the disclosure are not limited thereto, and the first through third directions may vary.

The first memory block BLK1a may include a plurality of cell strings CST, a plurality of word lines WL, a plurality of bit lines BL, a plurality of ground selection lines GSL1 and GSL2, a plurality of string selection lines SSL1 and SSL2, and a common source line CSL. The number of cell strings CST, the number of word lines WL, the number of bit lines BL, the number of ground selection lines GSL1 and GSL2, and the number of string selection lines SSL1 and SSL2 may vary according to exemplary embodiments.

Each of the cell strings CST may include a string selection transistor SST, a plurality of memory cells MC, and a ground selection transistor GST that are serially connected to each other between a bit line BL corresponding to the cell string CST and the common source line CSL. However, exemplary embodiments of the disclosure are not limited thereto. According to another exemplary embodiment, each cell string CST may further include at least one dummy cell. According to another exemplary embodiment, each cell string CST may include at least two string selection transistors SST or at least two ground selection transistors GST.

Each cell string CST may extend in the third direction (z direction). In detail, each cell string CST may extend on a substrate in a vertical direction (z direction). Accordingly, the first memory block BLK1a including the cell strings CST may be referred to as a vertical-direction NAND flash memory. As such, by extending each cell string CST in the vertical direction (z direction) on a substrate, the integration density of the memory cell array 11 may increase.

The plurality of word lines WL (e.g., WL1, WL2, . . . , WLn−1, WLn) may each extend in the first direction x and the second direction y, and each word line WL may be connected to memory cells MC corresponding thereto. Accordingly, a plurality of memory cells MC arranged adjacent to each other on the same plane in the first direction x and the second direction y may be connected to each other by an identical word line WL. In detail, each word line WL may be connected to gates of memory cells MC to control the memory cells MC. In this case, the plurality of memory cells MC (e.g., MC1, MC2, . . . , MCn−1, MCn) may store data and may be programmed, read, or erased under the control of the connected word line WL.

The plurality of bit lines BL (e.g., BL1, BL2, . . . , BLm) may extend in the first direction x and may be connected to the string selection transistors SST. Accordingly, a plurality of string selection transistors SST arranged adjacent to each other in the first direction x may be connected to each other by an identical bit line BL. In detail, each bit line BL may be connected to drains of the plurality of string selection transistors SST.

The plurality of string selection lines SSL1 and SSL2 may each extend in the second direction y and may be connected to the string selection transistors SST. Accordingly, a plurality of string selection transistors SST arranged adjacent to each other in the second direction y may be connected to each other by an identical string selection line SSL1 or SSL2. In detail, each string selection line SSL1 or SSL2 may be connected to gates of the plurality of string selection transistors SST to control the plurality of string selection transistors SST.

The plurality of ground selection lines GSL1 and GSL2 may each extend in the second direction y and may be connected to the ground selection transistors GST. Accordingly, a plurality of ground selection transistors GST arranged adjacent to each other in the second direction y may be connected to each other by an identical ground selection line GSL1 or GSL2. In detail, each ground selection line GSL1 or GSL2 may be connected to gates of the plurality of ground selection transistors GST to control the plurality of ground selection transistors GST.

The ground selection transistors GST respectively included in the cell strings CST may be connected to each other by the common source line CSL. In detail, the common source line CSL may be connected to sources of the ground selection transistors GST.

A plurality of memory cells MC connected to an identical word line WL and to an identical string selection line SSL1 or SSL2 and arranged adjacent to each other in the second direction y may be referred to as a page PAGE. For example, a plurality of memory cells MC that are connected to a first word line WL1 and to a first string selection line SSL1 and are arranged adjacent to each other in the second direction y may be referred to as a first page PAGE1. A plurality of memory cells MC that are connected to the first word line WL1 and to a second string selection line SSL2 and are arranged adjacent to each other in the second direction y may be referred to as a second page PAGE2.

To perform a program operation with respect to a memory cell MC, 0V may be applied to a bit line BL, an on voltage may be applied to a string selection line SSL, and an off voltage may be applied to a ground selection line GSL. The on voltage may be equal to or greater than the threshold voltage so that a string selection transistor SST is turned on, and the off voltage may be smaller than the threshold voltage so that the ground selection transistor GST is turned off. A program voltage may be applied to a memory cell selected from the memory cells MC, and a pass voltage may be applied to the remaining unselected memory cells. In response to the program voltage, electric charges may be injected into the memory cells MC due to F-N tunneling. The pass voltage may be greater than the threshold voltage of the memory cells MC.

To perform an erasure operation with respect to the memory cells MC, an erasure voltage may be applied to the body of the memory cells MC, and 0V may be applied to the word lines WL. Accordingly, data stored in the memory cells MC may be temporarily erased.

Figure 26:
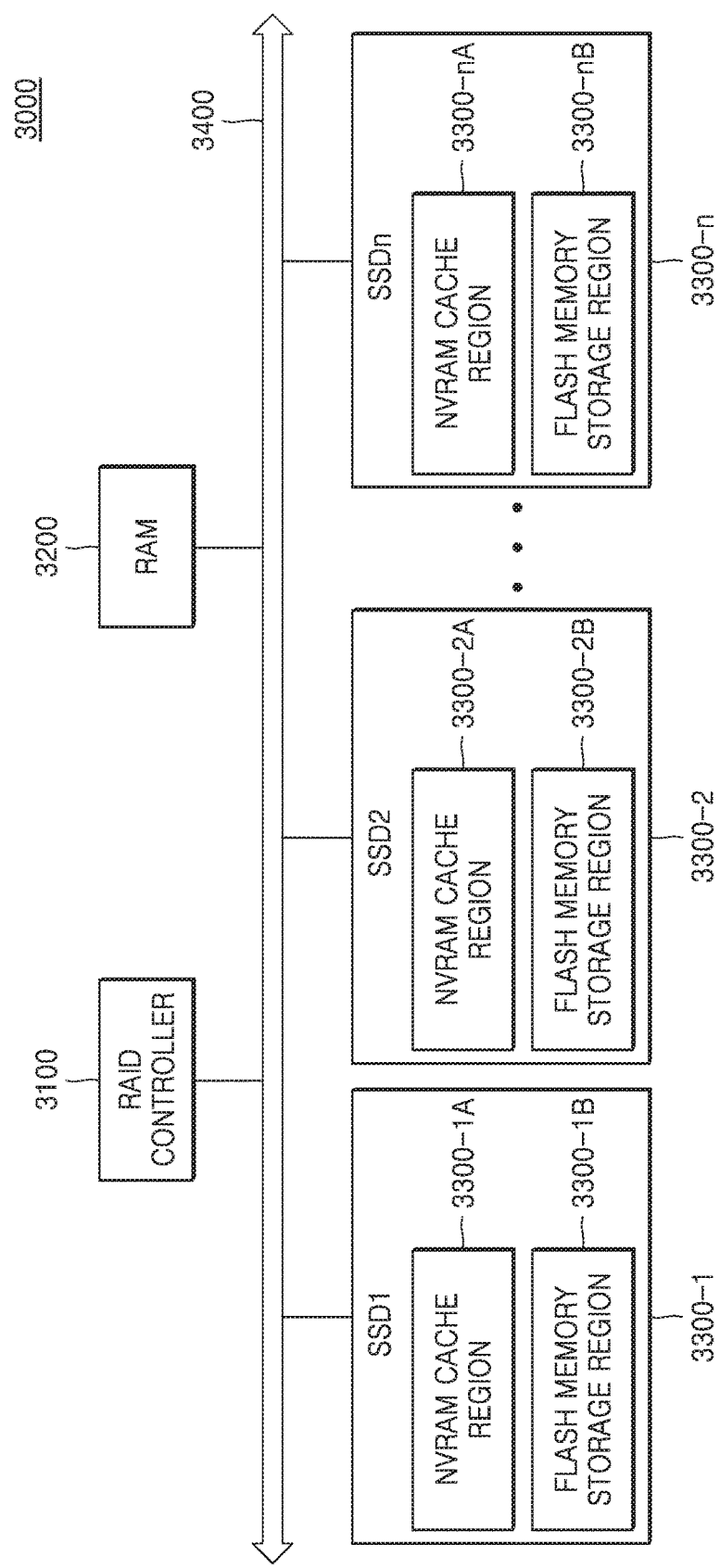
FIG. 26 is a block diagram of a storage system according to another exemplary embodiment of the disclosure.

FIG. 26 is a block diagram of a storage system 3000 according to another exemplary embodiment of the disclosure.

Referring to FIG. 26, the storage system 3000 includes a RAID controller 3100, a VRAM 3200, a plurality of SSDs, namely, first through n-th SSDs 3300-1 through 3300-n, and a bus 3400. The components of the memory controller 3000 are electrically connected to each other via the bus 3400.

The first through n-th SSDs 3300-1 through 3300-n respectively include NVRAM cache regions 3300-1A to 3300-nA, and flash memory storage regions 3300-1B to 3300-nB.

The NVRAM cache regions 3300-1A to 3300-nA may be implemented by using PRAMs, FeRAMs, or MRAMs. As another example, the NVRAM cache regions 3300-1A to 3300-nA may be implemented according to a method of applying power to DRAM or SRAM, which is volatile memory, by using a battery or a capacitor. According to this method, even when system power is removed, data stored in the DRAM or SRAM may be retained.

The flash memory storage regions 3300-1B to 3300-nB are storage regions of the flash memory devices forming the first through n-th SSDs 3300-1 to 3300-n, respectively.

A cache region for performing a stripe writing operation and a cache region to which an orphan page generated during garbage collection may be allocated to each of the NVRAM cache regions 3300-1A to 3300 nA.

For example, the valid pages in memory blocks of the flash memory storage regions 3300-1B to 3300-nB of the first to n-th SSDs 3300-1 to 3300-n that constitute a victim stripe selected during garbage collection may be stored in the NVRAM cache regions 3300-1A to 3300-nA.

For example, the RAID controller 3100 performs a write operation in units of stripes by using the NVRAM cache regions 3300-1A to 3300-nA.

The RAID controller 3100 copies the valid pages written to the flash memory storage regions 3300-1B to 3300-nB of the first to n-th SSDs 3300-1 to 3300-n included in the victim stripe to the NVRAM cache regions of SSDs that are different from the first to n-th SSDs 3300-1 to 3300-n to which the valid pages have been written.

The RAM 3200 is a volatile memory, and may be DRAM or SRAM. The RAM 3200 may store information or program codes necessary for operating the storage system 3000.

Accordingly, the RAM 3200 may store the mapping table information. The mapping table information may include an address mapping table which converts a logical address to a physical address, and a stripe mapping table which represents information about stripe grouping. The stripe mapping table may include valid page ratio information of each stripe. The mapping table information may include an orphan mapping table indicating storage location information of the orphan data stored in the NVRAM cache regions 3300-1A to 3300-nA.

For example, the RAID controller 3100 may read the mapping table information from the NVRAM cache regions 3300-1A through 3300-nA or the flash memory storage regions 3300-1B to 3300-nB and may load the mapping table information to the RAM 3200. The RAID controller 3100 may perform address conversion during a read operation or a write operation in the storage system 3000 by using the mapping table information loaded to the RAM 3200.

The RAID controller 3100 controls the first through n-th SSDs 3300-1 through 3300-n, based on a log-structured RAID environment. In detail, when the data written to the flash memory storage regions 3300-1B to 3300-nB is updated, the RAID controller 3100 performs a write operation such that a plurality of memory blocks to which data is written in the log format and a memory block storing parity information about the data stored in the plurality of memory blocks constitute one stripe.

The RAID controller 3100 registers pieces of location information of memory blocks of the flash memory storage regions 3300-1B to 3300-nB of the first through n-th SDs 3300-1 through 3300-n, which constitute a stripe, in the stripe mapping table.

The RAID controller 3100 may perform address conversion or stripe grouping by using the mapping table information stored in the RAM 3200. The RAID controller 3100 selects a victim stripe for garbage collection by using the mapping table information. For example, the RAID controller 3100 may search for, as the victim stripe, a stripe having a lowest valid page ratio from among a plurality of stripes by using the stripe mapping table.

The RAID controller 3100 copies the valid pages in memory blocks of the flash memory storage regions 3300-1B to 3300-nB of the first to n-th SSDs 3300-1 to 3300-n that constitute a victim stripe selected during garbage collection, into the NVRAM cache regions 3300-1A to 3300-nA. The RAID controller 3100 controls garbage collection by using the NVRAM cache regions 3300-1A to 3300-nA.

The RAID controller 3100 erases memory blocks of the flash memory storage regions 3300-1B to 3300-nB that are included in the victim stripe and store parity information, copies the valid pages included in the victim stripe into memory blocks of the flash memory storage regions 3300-1B to 3300-nB that are used to constitute a new stripe, and erases memory blocks of the victim stripe that have stored the valid pages copied into the memory blocks that are used to constitute the new stripe.

The RAID controller 3100 calculates parity information about pieces of data copied into the NVRAM cache regions 3300-1A to 3300-nA and copies the calculated parity information into memory blocks of the NVRAM cache regions 3300-1A to 3300-nA that are used to constitute the new stripe.

The RAID controller 3100 registers stripe grouping information regarding a constitution of a new stripe with the memory blocks into which the valid pages included in the victim stripe have been copied and the memory block into which the parity information has been copied, in the stripe mapping table. The RAID controller 3100 deletes stripe grouping information about the victim stripe from the stripe mapping table. Accordingly, the memory blocks included in the victim stripe become free blocks. The free block denotes an empty memory block in which data is not stored.

After erasing the memory block that is included in the victim stripe and in which the parity information has been stored, during a garbage collection operation of the storage system 3100, the valid pages written to the memory blocks included in the victim stripe may not be protected by the parity information. In other words, even if some of the flash memory storage regions 3300-1B to 3300-$n$B of the first through n-th SSDs 3300-1 through 3300-$n$ have defects, the valid pages written to the memory blocks of the SSDs having defects may be restored by the data stored in the NVRAM cache regions 3300-1A to 3300-$n$A.

When a request to read the pages included in the victim stripe occurs during the garbage collection operation, the RAID controller 3100 reads data about the pages requested to be read from the NVRAM cache regions 3300-1A to 3300-$n$A. The RAID controller 3100 may determine the NVRAM cache region that stores the data requested to be read, from among the first to n-th SSDs 3300-1 to 3300-$n$, by using the mapping table information.

For example, when a request to read the pages included in the victim stripe is transmitted from an external host (not shown) to the storage system 3000 during garbage collection, the RAID controller 3100 may determine the NVRAM cache region that stores data corresponding to the pages requested to be read, from among the first to n-th SSDs 3300-1 to 3300-$n$. For example, if it is determined that the page requested for reading is stored in the NVRAM cache region 3300-2A of the second SSD 3300-2, the RAID controller 3100 may read the data from the NVRAM cache region 3300-2A of the second SSD 3300-2 and transmit the data to the host.

The RAID controller 3100 performs a stripe reconstitution process for reducing an imbalance between valid page ratios of the memory blocks included in a stripe. For example, the RAID controller 3100 may perform a stripe reconstitution process by using the memory block sharing technique, the stripe size shrinking technique, the stripe cross-merging technique without garbage collection, or the stripe cross-merging technique with garbage collection. The RAID controller 3100 may perform a stripe reconstituting method and a garbage collection operation illustrated in the flowcharts of FIGS. 36-48.

Figure 27:
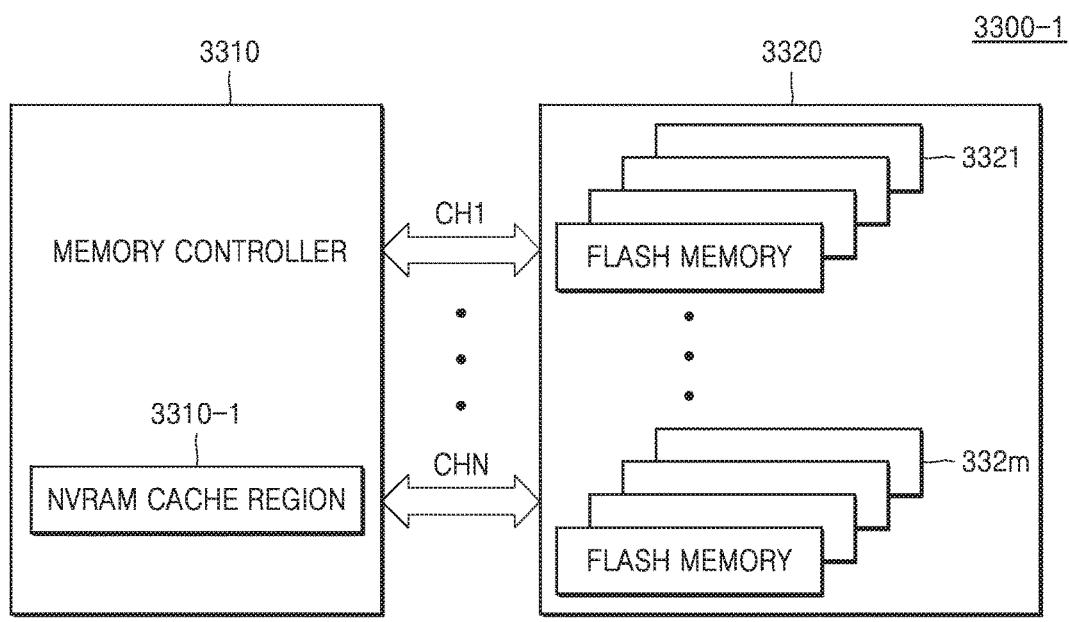
FIG. 27 is a block diagram illustrating a detailed structure of an SSD illustrated in FIG. 26.

FIG. 27 is a block diagram illustrating a detailed structure of the SSD 3300-1 illustrated in FIG. 26.

Referring to FIG. 27, the SSD 3300-1 may include a memory controller 3310 and a memory device 3320.

The memory controller 3310 includes an NVRAM cache region 3310-1. The NVRAM cache region 3310-1 may be implemented by using PRAM, FeRAM, or MRAM. An another example, the NVRAM cache region 3310-1 may be implemented according to a method of applying power to DRAM or SRAM, which is volatile memory, by using a battery or a capacitor.

The memory controller 3310 may control the memory device 3320 according to a command received from a host. In detail, the memory controller 3310 may provide an address, a command, and a control signal to the memory device 220 via a plurality of channels CH1 through CHN to control a program (or write) operation, a read operation, and an erase operation with respect to the memory device 3320.

The memory device 3320 may include at least one flash memory chip, namely, flash memory chips 3321 through 322$m$. As another example, the memory device 3320 may not only be comprised of flash memory chips but also of PRAM chips, FRAM chips, MRAM chips, or the like. A storage region of the flash memory chips 3321 to 332$m$ in the memory device 3320 is a flash memory storage region.

The memory controller 3310 manages the NVRAM cache region 3310-1, based on the command received from the RAID controller 3100 of the storage system 3000. For example, the memory controller 3310 may write or read data of the orphan page generated during garbage collection to or from the NVRAM cache region 3310-1, based on the command received from the RAID controller 3100.

Figure 28:
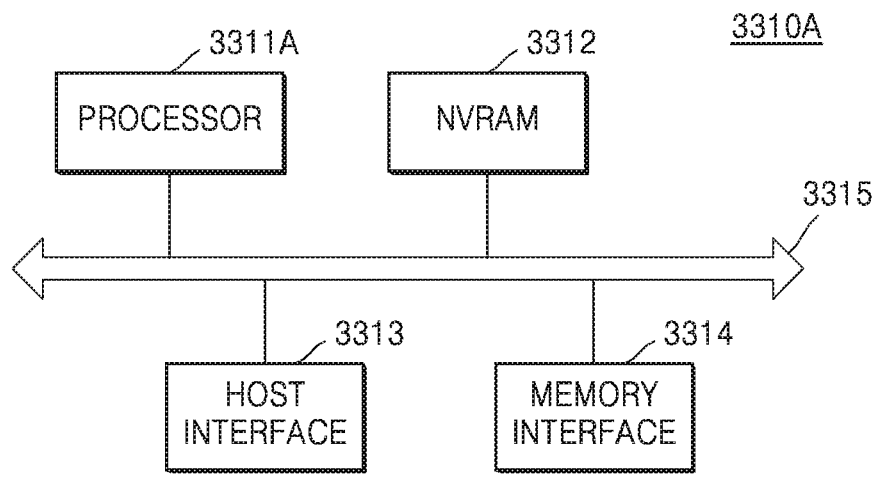
FIG. 28 is a block diagram illustrating an exemplary embodiment of a memory controller illustrated in FIG. 27.

FIG. 28 is a block diagram illustrating a memory controller 3310A, which is an exemplary embodiment of the memory controller 3310 illustrated in FIG. 27.

As shown in FIG. 28, the memory controller 3310A includes a processor 3311A, an NVRAM 3312, a host interface 3313, a memory interface 3314, and a bus 3315. The components of the memory controller 3310A are electrically connected to each other via the bus 3315.

The NVRAM 3312 may include a cache that stores data that is temporarily not protected by parity information during a garbage collection operation. The NVRAM 3312 may store mapping table information that is used in the storage system 3000. The mapping table information includes an address mapping table which converts a logical address to a physical address and a stripe mapping table which represents information about stripe grouping. The information about stripe grouping may include information representing memory blocks that constitute each stripe. The stripe mapping table may include valid page ratio information of each stripe.

The processor 3311A may control an overall operation of the SSD 3300-1 by using program codes and pieces of data that are stored in the NVRAM 3312. When the SSD 3300-1 is initialized, the processor 3311A reads from the memory device 3320 a program code and data which are necessary for controlling operations performed by the SSD 3300-1, and loads the read program code and data into the NVRAM 3312.

The processor 3311A may perform a control operation corresponding to the command received from the host, by using the program codes and the pieces of data that are stored in the NVRAM 3312. In detail, the processor 3311A may execute a write command or a read command received from the host. The processor 3311A may control the SSD 3300-1 to perform a page copying operation or a memory block erase operation according to a garbage collection operation based on the command received from the host.

The host interface 3313 includes a protocol for exchanging data with a host that is connected to the memory controller 3310A, and interfaces the memory controller 3310A with the host. The host interface 3313 may be implemented by using, but is not limited to, an Advanced Technology Attachment (ATA) interface, a Serial Advanced Technology Attachment (SATA) interface, a Parallel Advanced Technology Attachment (PATA) interface, a Universal Serial Bus (USB) or Serial Attached Small Computer System (SAS) interface, a Small Computer System Interface (SCSI), an embedded Multi Media Card (eMMC) interface, or a Universal Flash Storage (UFS) interface. The host interface 3313 may receive a command, an address, and data from the host under the control of the processor 3311A or may transmit data to the host.

The memory interface 3314 is electrically connected to the memory device 3320. The memory interface 3314 may transmit a command, an address, and data to the memory device 3320 under the control of the processor 3311A or may receive data from the memory device 3320. The memory interface 3314 may be configured to support NAND flash memory or NOR flash memory. The memory interface 3314 may be configured to perform software and hardware interleaving operations via a plurality of channels.

Figure 29:
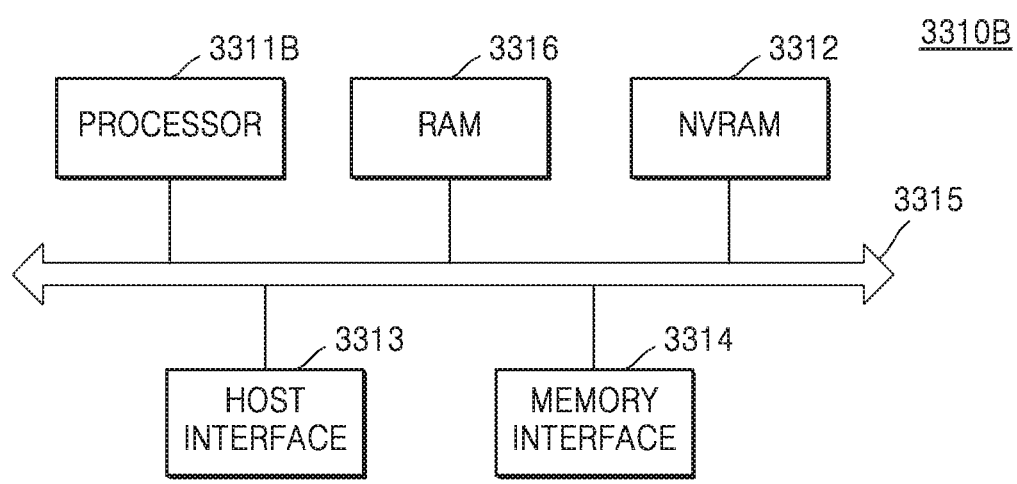
FIG. 29 is a block diagram illustrating another exemplary embodiment of the memory controller illustrated in FIG. 27.

FIG. 29 is a block diagram illustrating a memory controller 3310B, which is another exemplary embodiment of the memory controller 3310 illustrated in FIG. 27.

As shown in FIG. 29, the memory controller 3310B includes a processor 3311B, an NVRAM 3312, a host interface 3313, a memory interface 3314, a bus 3315, and a RAM 3316. The components of the memory controller 3310B are electrically connected to each other via the bus 3315.

The memory controller 3310B of FIG. 23 additionally includes the RAM 3316, unlike the memory controller 3310A of FIG. 28. The host interface 3313 and the memory interface 3314 have been described above with reference to FIG. 28, and thus, detailed descriptions thereof will be omitted here.

The RAM 3316 is a volatile memory, and may be DRAM or SRAM. The RAM 3316 may store information or program codes necessary for operating the storage system 3000.

For example, the RAM 3316 may store mapping table information. The mapping table information may include an address mapping table which converts a logical address to a physical address, and a stripe mapping table which represents information about stripe grouping. The stripe mapping table may include valid page ratio information of each constituted stripe.

The NVRAM 3312 may include a cache that stores data that is temporarily not protected by parity information during a garbage collection operation.

For example, the processor 3311B may read the mapping table information from the NVRAM 3312 and may load the mapping table information to the RAM 3316. For example, the processor 3311B may read the mapping table information from the memory device 3320 and may load the mapping table information to the RAM 3316.

The processor 3311B may control an overall operation of the SSD 3310-1 by using program codes and pieces of data that are stored in the RAM 3316. When the SSD 3300-1 is initialized, the processor 3311A reads from the memory device 3320 or the NVRAM 3312 a program code and data which are necessary for controlling operations performed by the SSD 3300-1, and loads the read program code and data into the RAM 3316.

The processor 3311B may perform a control operation corresponding to the command received from the host, by using the program codes and the pieces of data that are stored in the RAM 3316. In detail, the processor 3311B may execute a write command or a read command received from the host. The processor 3311B may control the SSD 3300-1 to perform a page copying operation or a memory block erase operation according to a garbage collection operation based on the command received from the host.

FIGS. 30A-30E are conceptual diagrams illustrating a stripe write operation in the storage system 3000 of FIG. 26.

FIGS. 30A-30E show an example of forming the storage system 3000 by using five SSDs.

Figure 30A:
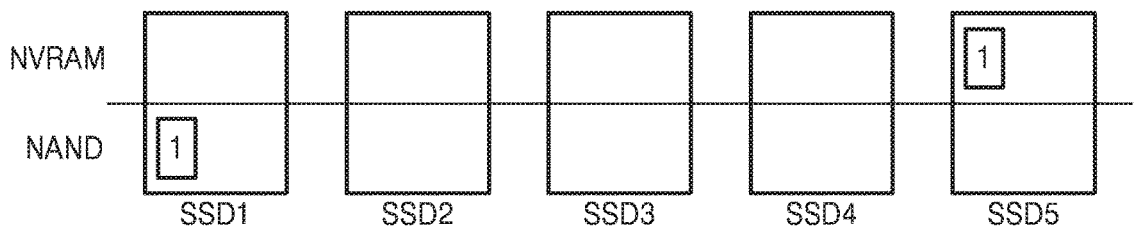
FIGS. 30A-30E are conceptual diagrams illustrating a stripe write operation in the storage system of FIG. 26.

When a write request occurs, the processor 3311A or 3311B writes data initially collected having a size corresponding to one memory block to both a flash memory storage region NAND and an NVRAM cache region of first through fifth SSDs SSD1 to SSD5. For example, the flash memory storage region NAND and the NVRAM cache region are determined to belong to different SSDs. Referring to FIG. 30A, data D1 initially collected having a size corresponding to one memory block is written to both a flash memory storage region NAND of the first SSD SSD1 and an NVRAM cache region of the fifth SSD SSD5.

Figure 30B:
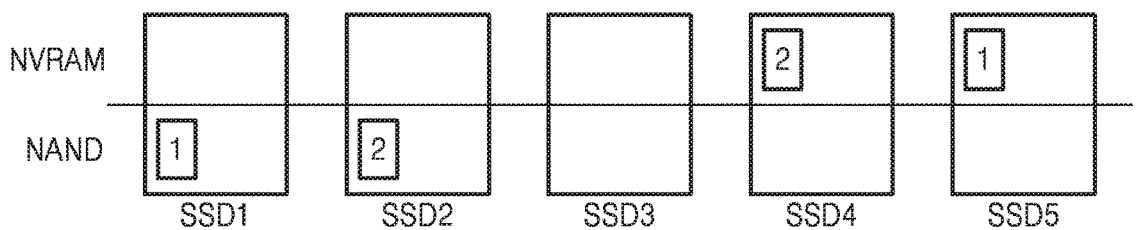
Figure 30C:
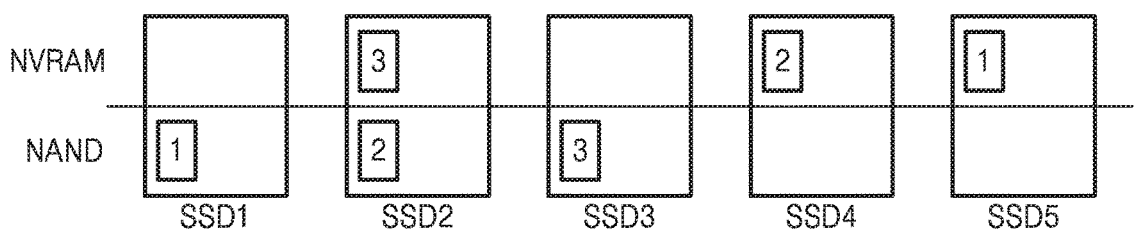

Referring to FIG. 30B, data D2 secondly collected having a size corresponding to one memory block is written to both a flash memory storage region NAND of the second SSD SSD2 and an NVRAM cache region of the fourth SSD SSD4.

Referring to FIG. 30B, data D3 thirdly collected having a size corresponding to one memory block is written to both a flash memory storage region NAND of the third SSD SSD3 and an NVRAM cache region of the second SSD SSD2.

Figure 30D:
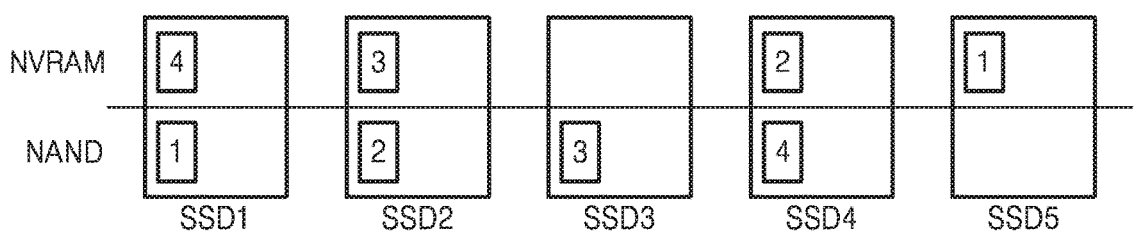

Referring to FIG. 30D, data D4 fourthly collected having a size corresponding to one memory block is written to both a flash memory storage region NAND of the fourth SSD SSD4 and an NVRAM cache region of the first SSD SSD1.

Figure 30E:
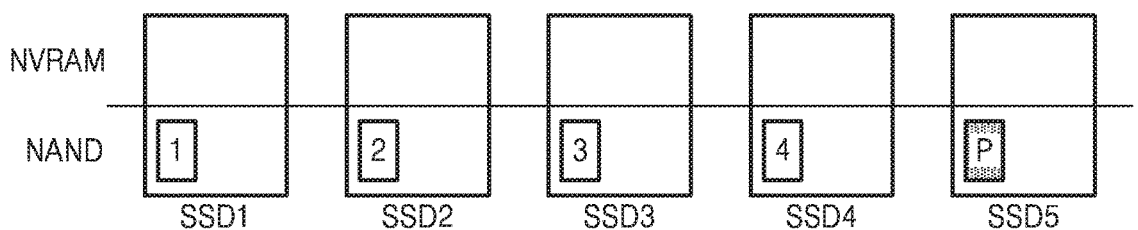

Next, the processor 3311A or 3311B calculates parity information of the data D1 to D4 stored in the NVRAM cache regions of the first to fifth SSDs SSD1 to SSD5, and then, writes the parity information in the flash memory storage region NAND of the fifth SSD SSD5. After that, the processor 3311A or 3311B flushes the data stored in the NVRAM cache regions. A data storage state obtained after this process is shown in FIG. 30E.

Figure 31:
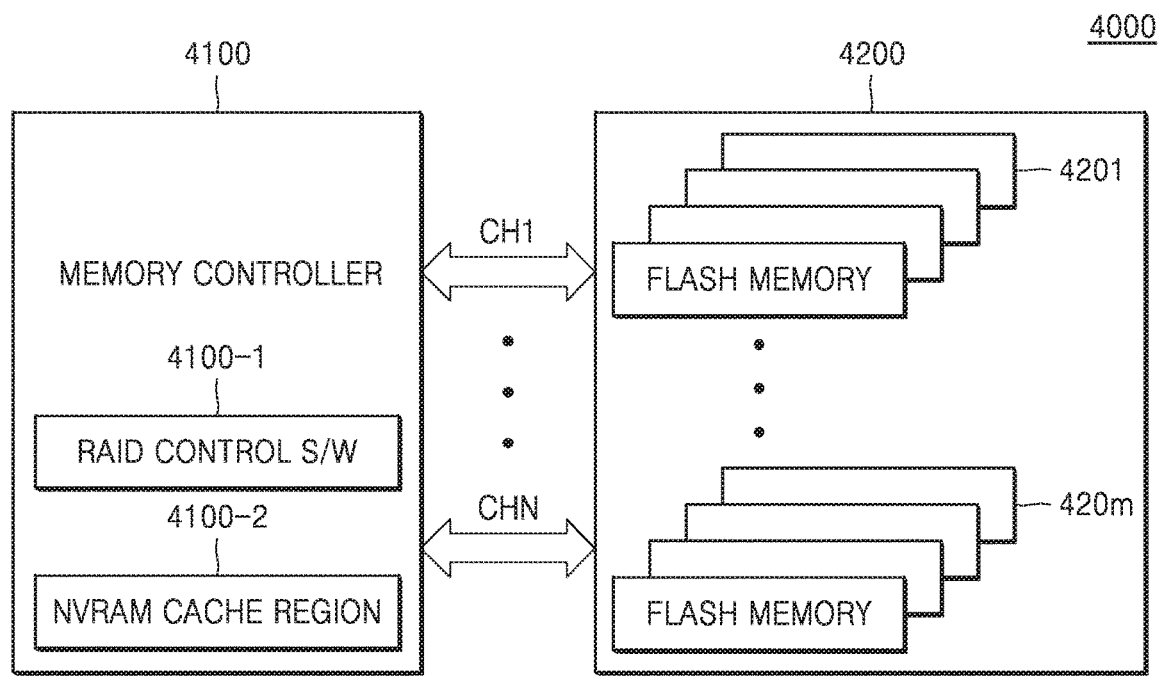
FIG. 31 is a block diagram of a storage system according to another exemplary embodiment of the disclosure.

FIG. 31 is a block diagram of a storage system 4000 according to another exemplary embodiment of the disclosure.

Referring to FIG. 31, the storage system 4000 may include a memory controller 4100 and a memory device 4200. Referring to FIG. 31, the storage system 4000 includes a single SSD.

The memory device 4200 may include at least one flash memory chip, namely, flash memory chips 4201 through 420m. As another example, the memory device 4200 may not only be comprised of flash memory chips but also of PRAM chips, FRAM chips, MRAM chips, or the like.

The memory controller 4100 stores RAID control SW 4100-1, and an NVRAM cache 4100-2 is allocated to the memory controller 4100.

The NVRAM cache region 4100-2 may be implemented by using PRAM, FeRAM, or MRAM. An another example, the NVRAM cache region 4100-2 may be implemented according to a method of applying power to DRAM or SRAM, which is volatile memory, by using a battery or a capacitor.

The memory controller 4100 controls the storage system 4000 to perform a stripe write operation in units of channels or ways based on a log-structured RAID environment, by using the RAID control software 4100-1.

The memory controller 4100 may provide an address, a command, and a control signal to the memory device 4200 via a plurality of channels CH1 through CHN to control a program (or write) operation, a read operation, and an erase operation with respect to the memory device 4200.

The memory controller 4100 copies, into the NVRAM cache region 4100-2, valid pages of the memory device 4200 that are included in a victim stripe for garbage collection, and controls a garbage collection operation by using the data copied into the NVRAM cache region 4100-2.

The memory controller 4100 erases a memory block of the victim stripe that stores parity information, copies the valid pages included in the victim stripe into memory blocks that are used to constitute a new stripe, and erases memory blocks of the victim stripe that have stored the valid pages copied into the memory blocks that are used to constitute the new stripe.

The memory controller 4100 calculates parity information about pieces of orphan data copied into the NVRAM cache region 4100-2 and copies the calculated parity information into a memory block that is used to constitute a new stripe.

The memory controller 4100 registers stripe grouping information regarding a constitution of a new stripe with the memory blocks into which the valid pages included in the victim stripe have been copied and the memory block into which the parity information has been copied, in the stripe mapping table. The memory controller 4100 deletes stripe grouping information about the victim stripe from the stripe mapping table. Accordingly, the memory blocks included in the victim stripe become free blocks.

When a request to read the pages included in the victim stripe occurs during the garbage collection operation, the memory controller 4100 reads data corresponding to the pages requested for reading from the NVRAM cache region 4100-2.

The memory controller 4100 performs a stripe reconstitution process for reducing an imbalance between valid page ratios of the memory blocks included in a stripe. For example, the memory controller 4100 may perform a stripe reconstitution process by using the memory block sharing technique, the stripe size shrinking technique, the stripe cross-merging technique without garbage collection, or the stripe cross-merging technique with garbage collection. The memory controller 4100 may perform a stripe reconstituting method and a garbage collection operation as illustrated in the flowcharts of FIGS. 36-48.

Figure 32:
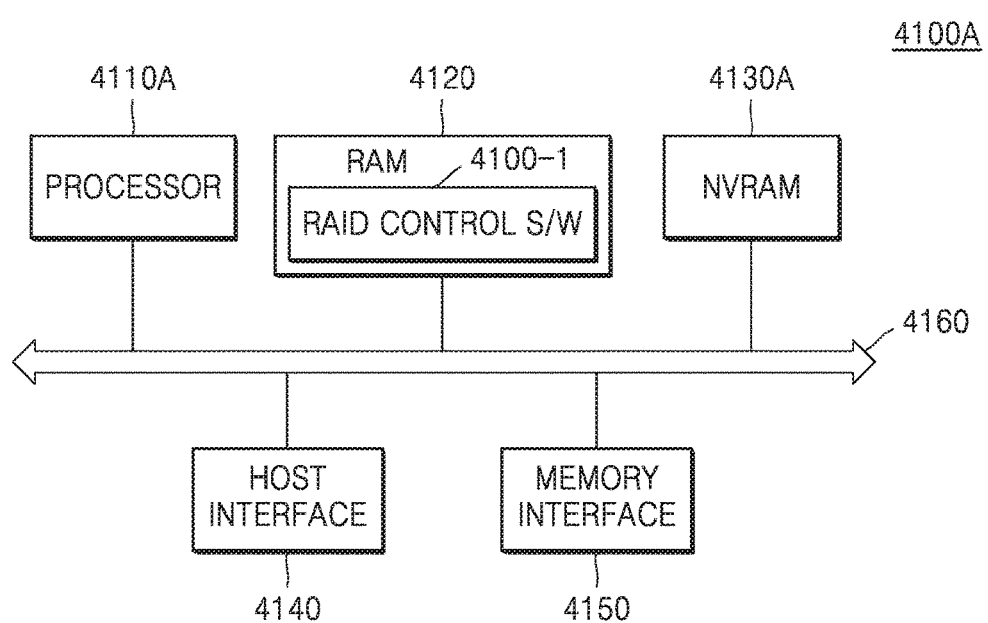
FIG. 32 is a block diagram illustrating an embodiment of a memory controller illustrated in FIG. 31.

FIG. 32 is a block diagram illustrating a memory controller 4100A, which is an exemplary embodiment of the memory controller 4100 illustrated in FIG. 31.

As shown in FIG. 32, the memory controller 4100A includes a processor 4110A, a RAM 4120, an NVRAM 4130A, a host interface 4140, a memory interface 4150, and a bus 4160. The components of the memory controller 4100A are electrically connected to each other via the bus 4160.

The host interface 4140 and the memory interface 4150 are substantially the same as the host interface 3313 and the memory interface 3314 shown in FIG. 28, and thus, detailed descriptions thereof will be omitted here.

The RAM 4120 is a volatile memory, and may be DRAM or SRAM. The RAM 4120 may store RAID control software 4100-1 and system data that are necessary for operating the storage system 4000.

For example, the RAM 4120 may store mapping table information. The mapping table information may include an address mapping table which converts a logical address to a physical address, and a stripe mapping table which represents information about stripe grouping. The stripe mapping table may include valid page ratio information of each constituted stripe.

The NVRAM 4130A may include a cache that stores data that is temporarily not protected by parity information during a garbage collection operation.

The processor 4110A may control an overall operation of the storage system 4000 by using program codes and pieces of data that are stored in the RAM 4120. When the storage system 4000 is initialized, the processor 4110A reads from the memory device 4200 or the NVRAM 4130A a program code and data which are necessary for controlling operations performed by the storage system 4000, and loads the read program code and data into the RAM 4120.

The processor 4110A may perform a control operation corresponding to the command received from the host, by using the program codes and the pieces of data that are stored in the RAM 4120. In detail, the processor 4110A may execute a write command or a read command received from the host. The processor 4110A may control the storage system 4000 to perform a page copying operation according to a garbage collection operation based on the command received from the host.

The processor 4110A drives the RAID control software 4100-1 of the RAM 4120 to perform a stripe reconstitution process for reducing an imbalance between valid page ratios of the memory blocks included in a stripe. For example, the processor 4110A may perform a stripe reconstitution process by using the memory block sharing technique, the stripe size shrinking technique, the stripe cross-merging technique without garbage collection, or the stripe cross-merging technique with garbage collection. The processor 4110A may perform a stripe reconstituting method and a garbage collection operation illustrated in the flowcharts of FIGS. 36-48.

Figure 33:
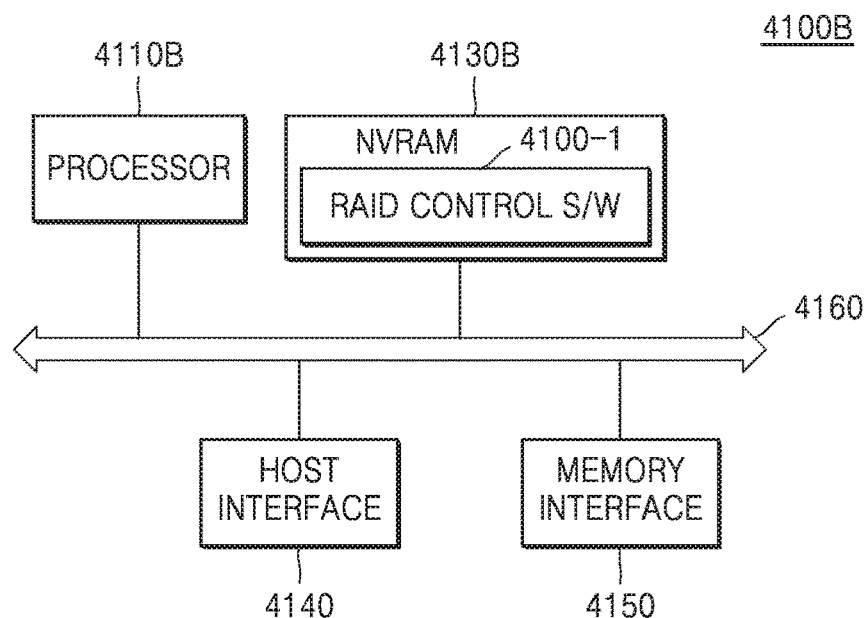
FIG. 33 is a block diagram illustrating another exemplary embodiment of the memory controller illustrated in FIG. 31.

FIG. 33 is a block diagram illustrating a memory controller 4100B, which is another exemplary embodiment of the memory controller 4100 illustrated in FIG. 31.

As shown in FIG. 33, the memory controller 4100B includes a processor 4110B, an NVRAM 4130B, a host interface 4140, a memory interface 4150, and a bus 4160. The components of the memory controller 4100B are electrically connected to each other via the bus 4160.

The NVRAM 4130B may store RAID control software 4100-1 and system data that are necessary for operating the storage system 4000.

The NVRAM 4130B may include a cache that stores data that is temporarily not protected by parity information during a garbage collection operation. The NVRAM 4130B may store mapping table information that is used in the storage system 4000. The mapping table information includes an address mapping table which converts a logical address to a physical address, and a stripe mapping table which represents information about stripe grouping. The information about stripe grouping may include information representing memory blocks that constitute each stripe. The stripe mapping table may include valid page ratio information of each stripe.

The processor 4110B may control an overall operation of the storage system 4000 by using program codes and pieces of data that are stored in the NVRAM 4130B. When the storage system 4000 is initialized, the processor 4110B reads from the memory device 4200 a program code and data which are necessary for controlling operations performed by the storage system 4000, and loads the read program code and data into the NVRAM 4130B.

The processor 4110B may perform a control operation corresponding to the command received from the host, by using the program codes and the pieces of data that are stored in the NVRAM 4130B. In detail, the processor 4110B may execute a write command or a read command received from the host. The processor 4110B may control the storage system 4000 to perform a page copying operation according to a garbage collection operation based on the command received from the host.

The processor 4110B drives the RAID control software 4100-1 of the NVRAM 4130B to perform a stripe reconstitution process for reducing an imbalance between valid page ratios of the memory blocks included in a stripe. For example, the processor 4110B may perform a stripe reconstitution process by using the memory block sharing technique, the stripe size shrinking technique, the stripe cross-merging technique without garbage collection, or the stripe cross-merging technique with garbage collection. The processor 4110B may perform a stripe reconstituting method and a garbage collection operation illustrated in the flowcharts of FIGS. 36-48.

Figure 34:
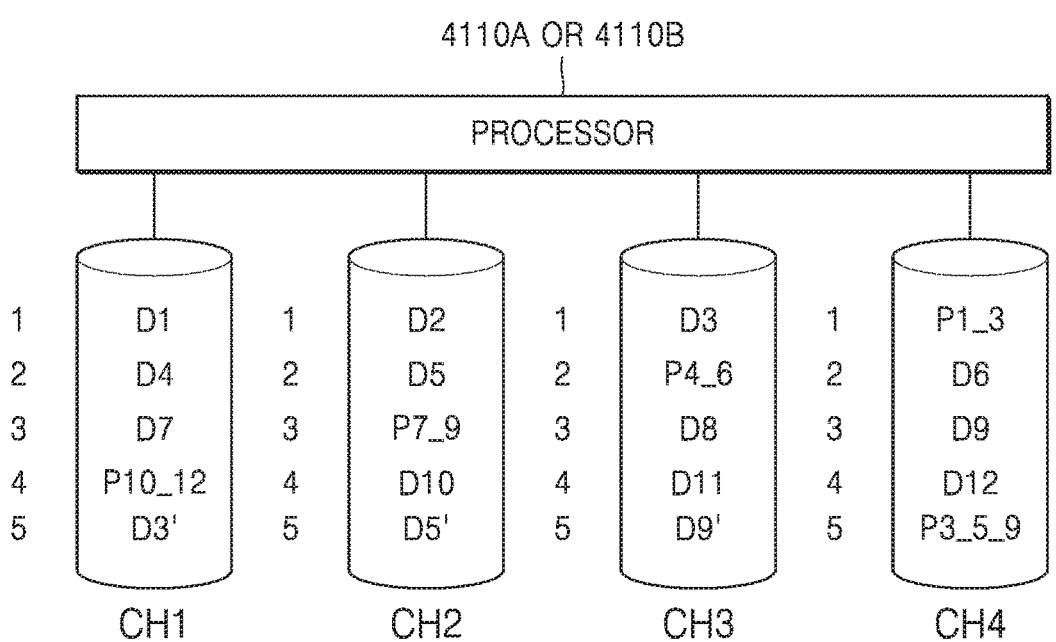
FIG. 34 shows an example of stripe constitution in the storage system of FIG. 31.

FIG. 34 shows an example of stripe constitution in the storage system 4000 of FIG. 31. FIG. 34 shows an example in which the processor 4110A or 4110B forms a stripe by using memory blocks of flash memory chips included in first through fourth channels CH1 through CH4. In other words, respective memory blocks of the flash memory chips respectively included in the first through fourth channels CH1 through CH4 form one stripe.

Figure 35:
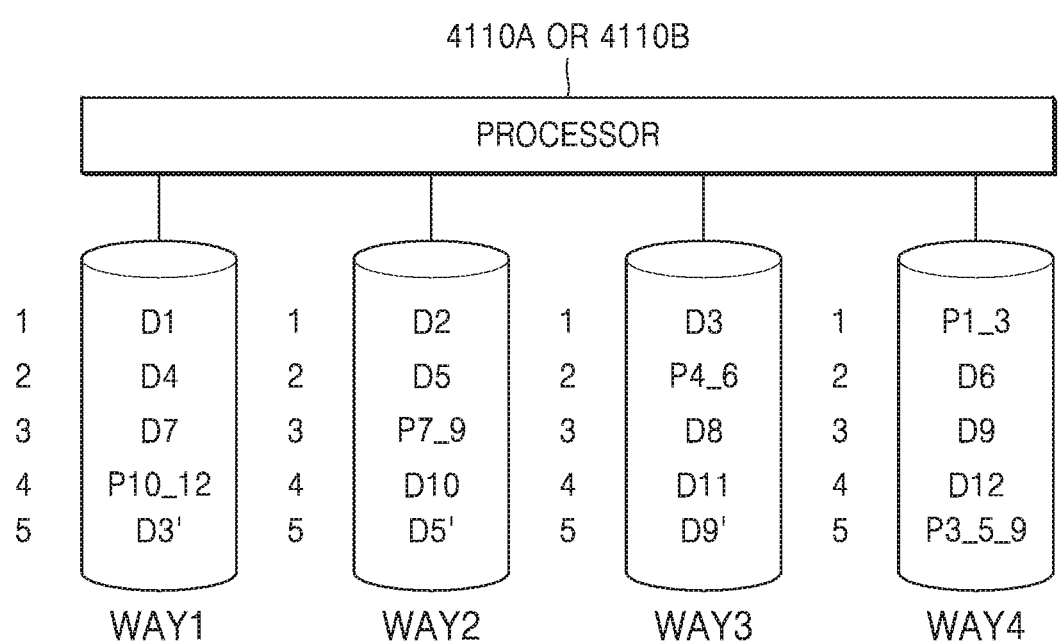
FIG. 35 shows another example of stripe constitution in the storage system of FIG. 31.

FIG. 35 shows another example of stripe constitution in the storage system 4000 of FIG. 31.

FIG. 35 shows an example in which the processor 4110A or 4110B forms a stripe by using memory blocks of flash memory chips included in first through fourth ways WAY1 through WAY4. In other words, respective memory blocks of the flash memory chips respectively included in the first through fourth ways WAY1 through WAY4 form one stripe.

Next, a stripe reconstituting method and a garbage collection operation performed in various kinds of storage systems including the exemplary embodiments illustrated in FIGS. 1 to 4, FIG. 26, or FIG. 31 will be described with reference to FIGS. 36-48.

Figure 36:
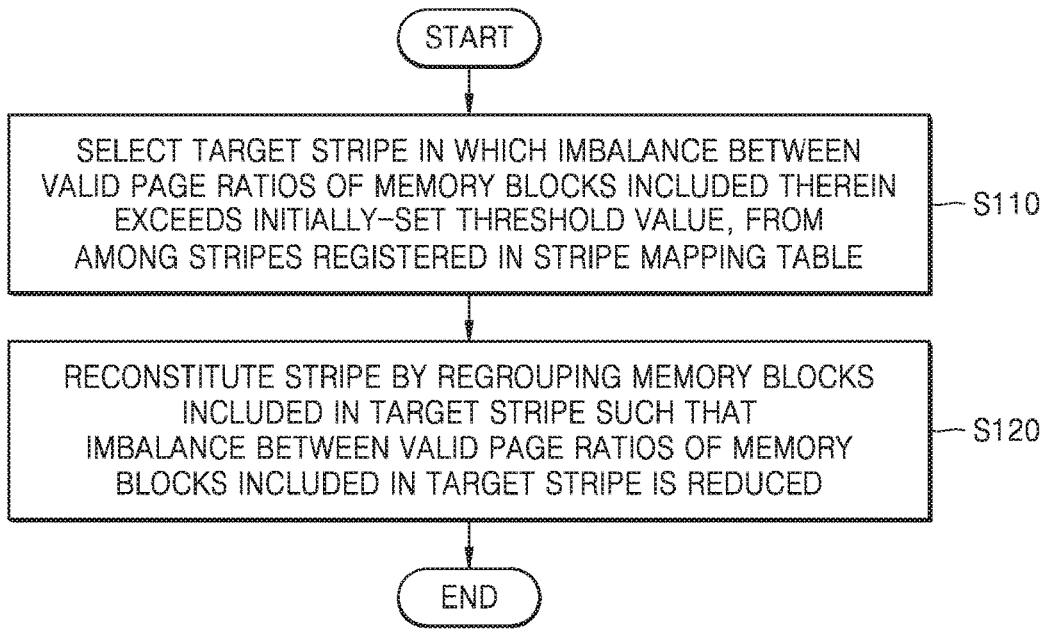
FIG. 36 is a flowchart of a stripe reconstituting method in a storage system according to an exemplary embodiment of the disclosure.

FIG. 36 is a flowchart of a stripe reconstituting method in a storage system according to an exemplary embodiment of the disclosure.

First, in operation S110, the storage system selects a target stripe in which an imbalance between the valid page ratios of memory blocks included therein exceeds an initially-set threshold value, from among stripes registered in a stripe mapping table. For example, a stripe in which valid page ratios of at least N (where N is an integer equal to or greater than 1) memory blocks included therein are less than an initially-set first threshold value TH1 and valid page ratios of the remaining memory blocks are greater than an initially-set second threshold value TH2, which is greater than the initially-set first threshold value TH1, is set as a target stripe. If there exist a plurality of target stripes selected in the above-described manner, a single stripe may be selected from the plurality of selected target stripes, based on at least one selected from a descending order of values of N, an ascending order of valid page ratios that are less than the first threshold value TH1, and a descending order of valid page ratios that are greater than the second threshold value TH2.

Then, in operation S120, the storage system reconstitutes a stripe by regrouping the memory blocks included in the target stripe such that an imbalance between the valid page ratios of the memory blocks included in the target stripe is reduced. For example, the stripe reconstitution may be performed using the memory block sharing technique, the stripe size shrinking technique, the stripe cross-merging technique without garbage collection, or the stripe cross-merging technique with garbage collection.

First, exemplary embodiments of performing stripe reconstitution by using the memory block sharing technique as illustrated in FIGS. 37-40 will be described.

Figure 37:
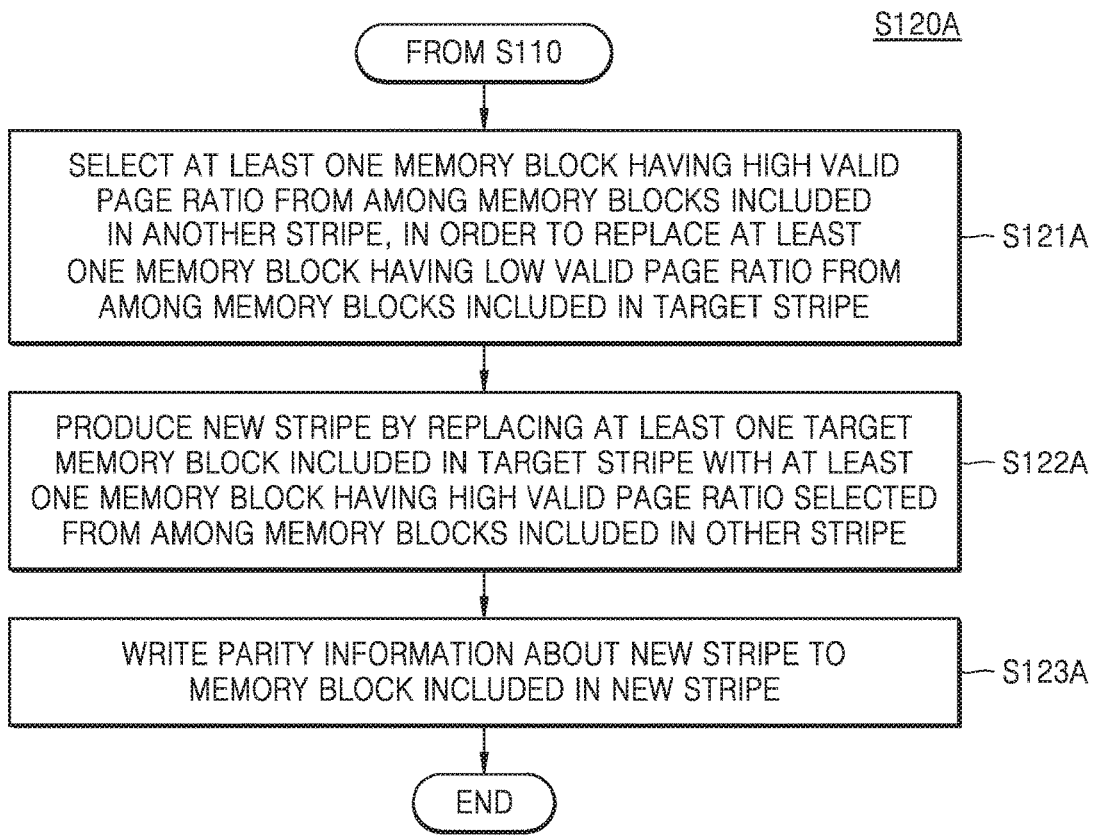
FIG. 37 is a flowchart of an example of a stripe reconstituting operation included in the stripe reconstituting method of FIG. 36.

FIG. 37 is a flowchart of an operation S120A, which is an example of operation S120 of FIG. 36.

In operation S121A, to replace at least one memory block having a low valid page ratio from among the memory blocks included in the target stripe, the storage system selects at least one memory block having a high valid page ratio from among the memory blocks included in another stripe. For example, to replace the memory blocks #4 of the third and fourth SSDs 1300-3 and 1300-4, which are target memory blocks having relatively low valid page ratios in a target stripe from among stripes formed as in FIG. 16A, the storage system may select the memory blocks #5 of the third and fourth SSDs 1300-3 and 1300-4 that have higher valid page ratios than the memory blocks #4 of the third and fourth SSDs 1300-3 and 1300-4 and are included in another stripe.

Next, in operation S122A, the storage system produces a new stripe by replacing the at least one target memory block included in the target stripe with the at least one memory block having a high valid page ratio selected from among the memory blocks included in another stripe. For example, as illustrated in FIG. 16B, the storage system produces a new stripe by replacing the memory blocks #4 of the third and fourth SSDs 1300-3 and 1300-4 having relatively low valid page ratios in the target stripe with the memory blocks #5 of the third and fourth SSDs 1300-3 and 1300-4 having relatively high valid page ratios in another stripe.

Next, in operation S123A, the storage system writes parity information about the new stripe to a memory block included in the new stripe. For example, as illustrated in FIG. 16B, the storage system may write the parity information about the new stripe to a memory block #6 of the N-th SSD 1300-N which is included in the new stripe.

Figure 38:
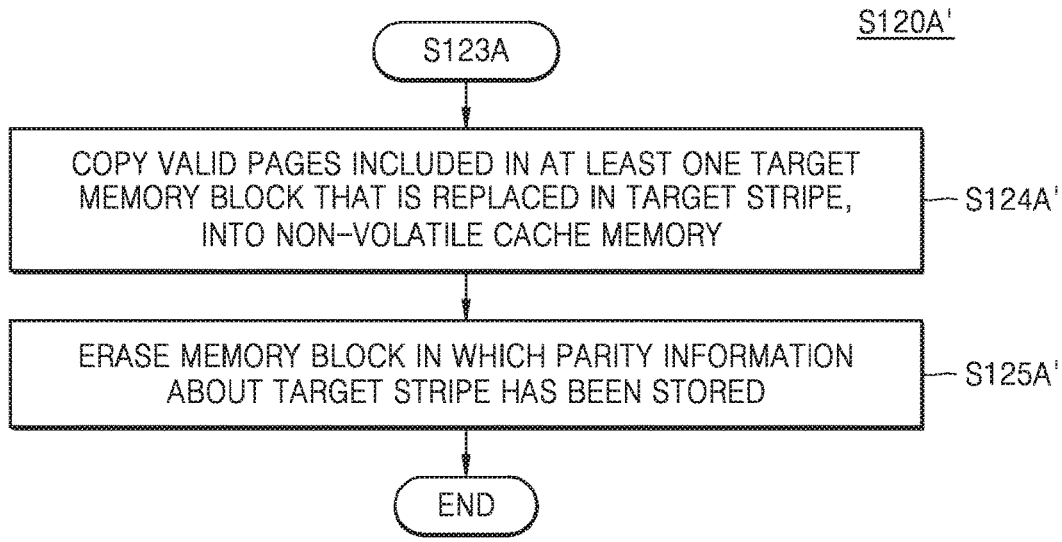
FIG. 38 is a flowchart of another example of the stripe reconstituting operation included in the stripe reconstituting method of FIG. 36.

FIG. 38 is a flowchart of an operation S120N, which is another example of operation S120 of FIG. 36.

In operation S124A', after performing operation S123A of FIG. 37, the storage system copies the valid pages included in the at least one target memory block that is replaced in the target stripe, into a non-volatile cache memory. For example, the non-volatile cache memory may be the NVRAM 1200 or 103 of the storage system of FIGS. 1-4. As another example, the NVRAM cache regions 3300-1A and 4100-2 of FIGS. 26 and 31 may be used as the non-volatile cache memory. For example, as illustrated in FIGS. 16A and 16B, the valid pages included in the memory blocks #4 of the third and fourth SSDs 1300-3 and 1300-4 that are replaced may be copied into the orphan cache 1200-1 of the NVRAM 1200.

Next, in operation S125A', the storage system erases the memory block in which the parity information about the target stripe has been stored. For example, as illustrated in FIGS. 16A and 16B, the storage system may erase the memory block #4 of the N-th SSD 1300-N in which the parity information about the target stripe has been stored.

Figure 39:
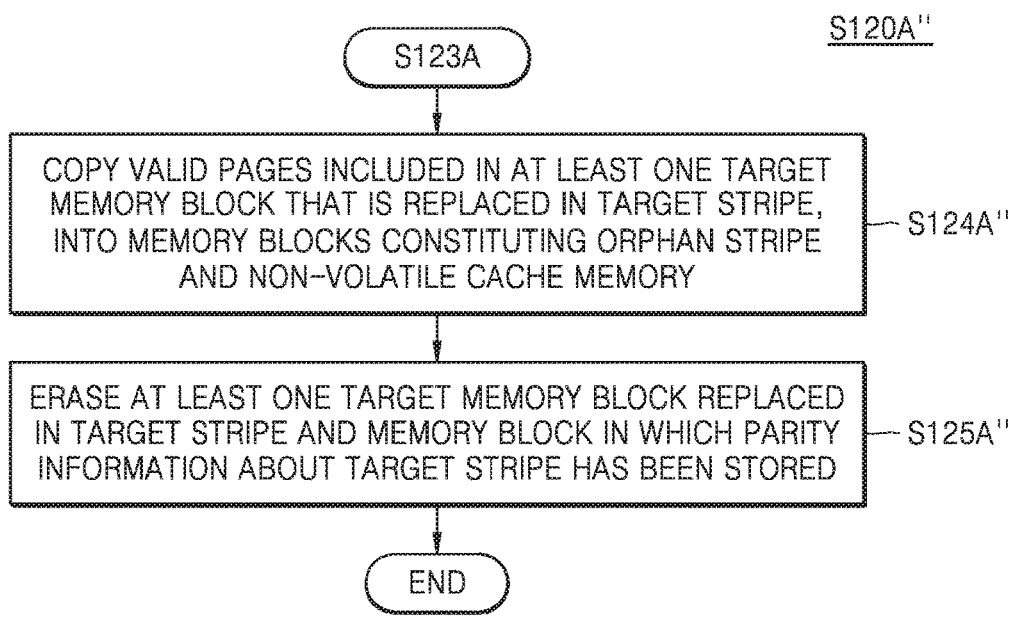
FIG. 39 is a flowchart of another example of the stripe reconstituting operation included in the stripe reconstituting method of FIG. 36.

FIG. 39 is a flowchart of an operation S120A", which is another example of operation S120 of FIG. 36.

In operation S124A", after performing operation S123A of FIG. 37, the storage system copies the valid pages included in the at least one target memory block that is replaced in the target stripe into memory blocks constituting an orphan stripe and a non-volatile cache memory. For example, the non-volatile cache memory may be the NVRAM 1200 or 103 of the storage system of FIGS. 1-4. As another example, the NVRAM cache regions 3300-1A and 4100-2 of FIGS. 26 and 31 may be used as the non-volatile cache memory. For example, as illustrated in FIGS. 16A and 16B, the valid pages included in the memory blocks #4 of the third and fourth SSDs 1300-3 and 1300-4 that are replaced may be copied into the orphan cache 1200-1 of the NVRAM 1200 and the memory blocks #M of the third and fourth SSDs 1300-3 and 1300-4, which constitute an orphan stripe. The orphan stripe is a stripe designated as a stripe into which valid pages are copied during garbage collection.

Next, in operation S125A", the storage system erases the at least one target memory block replaced in the target stripe and the memory block in which the parity information about the target stripe has been stored. For example, as illustrated in FIGS. 16A and 16B, the storage system may erase the respective memory blocks #4 of the third and fourth SSDs 1300-3 and 1300-4 replaced in the target stripe and the memory block #4 of the N-th SSD 1300-N in which the parity information about the target stripe has been stored.

Figure 40:
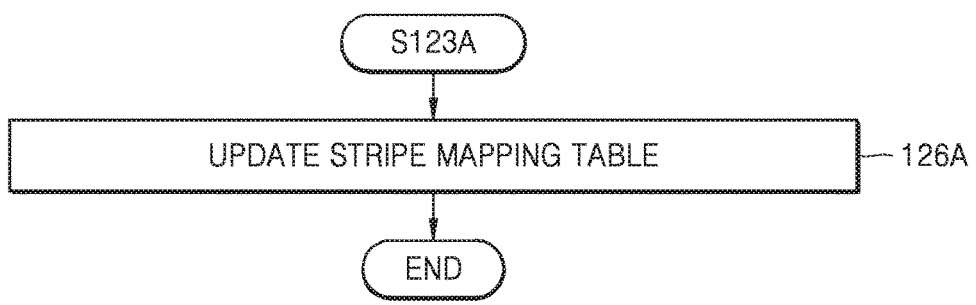
FIG. 40 is a flowchart of another example of the stripe reconstituting operation included in the stripe reconstituting method of FIG. 36.

FIG. 40 is a flowchart of another example of operation S120 of FIG. 36.

In operation S126A, after performing operation S123A of FIG. 37, the storage system updates the stripe mapping table. In detail, the storage system adds information about the new stripe to the stripe mapping table and deletes information about the target stripe from the stripe mapping table.

Figure 41:
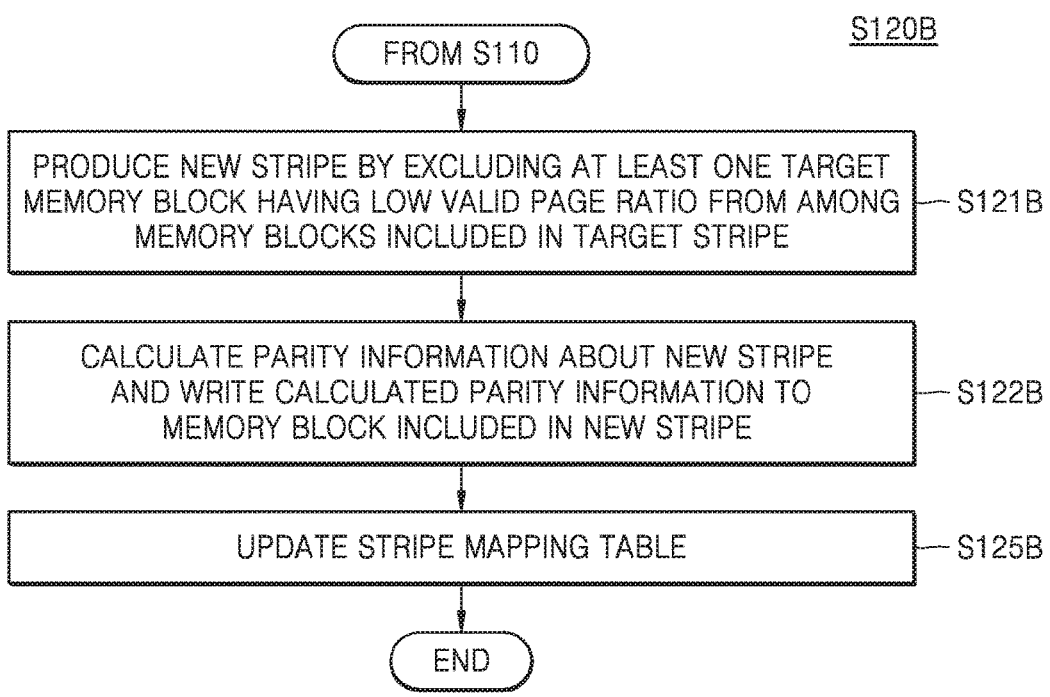
FIG. 41 is a flowchart of another example of the stripe reconstituting operation included in the stripe reconstituting method of FIG. 36.
Figure 42:
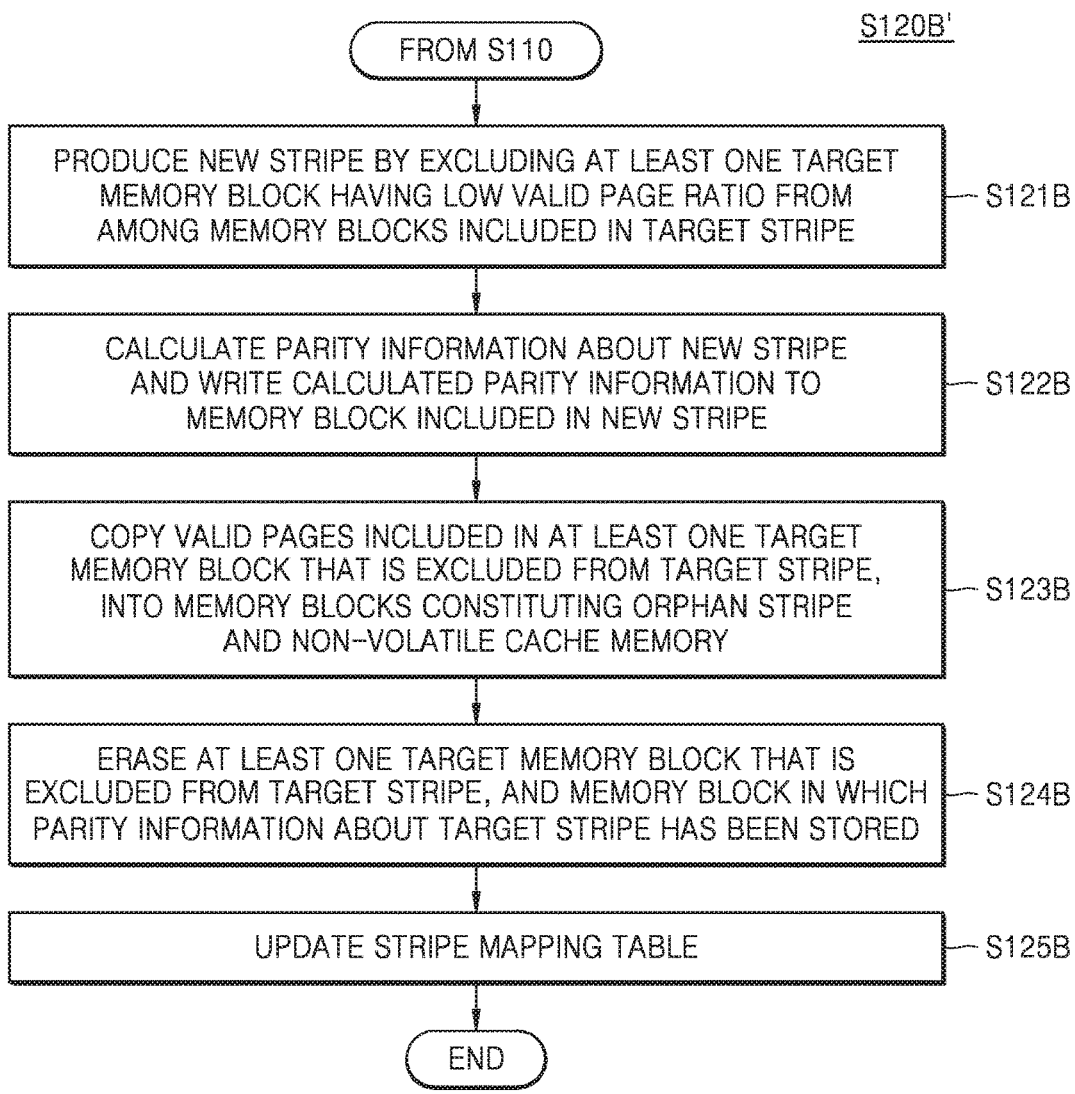
FIG. 42 is a flowchart of another example of the stripe reconstituting operation included in the stripe reconstituting method of FIG. 36.

Next, exemplary embodiments of performing stripe reconstitution by using the stripe size shrinking technique as illustrated in FIGS. 41 and 42 will be described.

FIG. 41 is a flowchart of an operation S120B, which is another example of operation S120 of FIG. 36.

In operation S121B, the storage system produces a new stripe by excluding at least one target memory block having a low valid page ratio from among the memory blocks included in the target stripe, which is an imbalanced stripe, from the target stripe. For example, as illustrated in FIGS. 17A and 17B, in the target stripe comprised of the memory blocks #4, the memory block #4 of the third SSD 1300-3 and the memory block #4 of the fourth SSD 1300-4 have lower valid page ratios than the memory block #4 of the first SSD 1300-1 and the memory block #4 of the second SSD 1300-2. Accordingly, the memory block #4 of the third SSD 1300-3 and the memory block #4 of the third SSD 1300-4 are selected as target memory blocks, and are excluded from the target stripe, thereby producing a new stripe.

Next, in operation S122B, the storage system calculates parity information about the new stripe and writes the calculated parity information to a memory block included in the new stripe. For example, as illustrated in FIGS. 17A and 17B, the storage system calculates parity information about the new stripe including the memory blocks #4 of the first and second SSDs 1300-1 and 1300-2, and writes the calculated parity information to the memory block #6 of the N-th SSD 1300-N.

Next, in operation S125B, the storage system updates the stripe mapping table. In detail, the storage system adds information about the new stripe to the stripe mapping table and deletes information about the target stripe from the stripe mapping table.

FIG. 42 is a flowchart of an operation S120B', which is another example of operation S120 of FIG. 36.

Operations S121B and S122B have already been described above with reference to FIG. 41, and thus repeated descriptions thereof will be omitted. After performing operations S121B and S122B of FIG. 37, in operation S123B, the storage system copies the valid pages included in the at least one target memory block that is excluded from the target stripe, into memory blocks constituting an orphan stripe and a non-volatile cache memory. For example, as illustrated in FIGS. 17A and 17B, the storage system copies the valid pages included in the memory blocks #4 of the third and fourth SSDs 1300-3 and 1300-4 that are excluded from the target stripe, into the orphan cache 1200-1 of the NVRAM 1200 and respectively into the memory blocks #M of the third and fourth SSDs 1300-3 and 1300-4, which constitute an orphan stripe.

Next, in operation S124B, the storage system erases the at least one target memory block that is excluded from the target stripe, and the memory block in which the parity information about the target stripe has been stored. For example, as illustrated in FIGS. 17A and 17B, the storage system erases the memory blocks #4 of the third and fourth SSDs 1300-3 and 1300-4 that are excluded from the target stripe, and the memory block #4 of the N-th SSD 1300-N storing parity information about the target stripe.

Next, in operation S125B, the storage system updates the stripe mapping table. In detail, the storage system adds information about the new stripe to the stripe mapping table and deletes information about the target stripe from the stripe mapping table.

Figure 43:
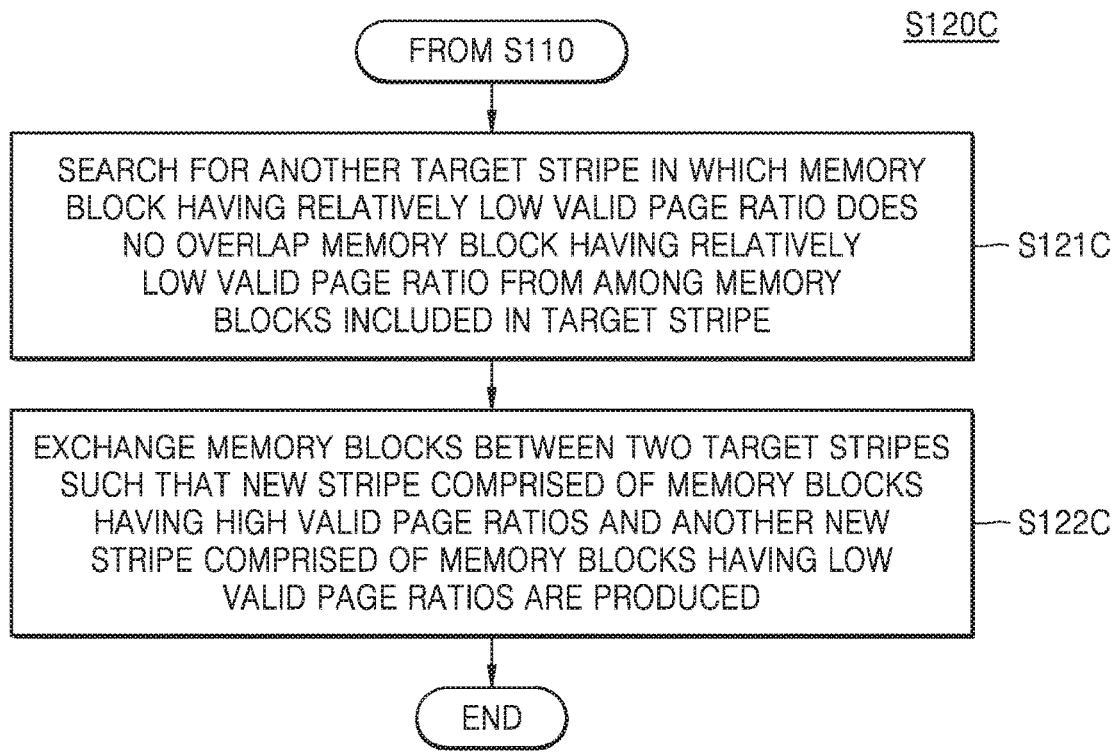
FIG. 43 is a flowchart of another example of the stripe reconstituting operation included in the stripe reconstituting method of FIG. 36.
Figure 44:
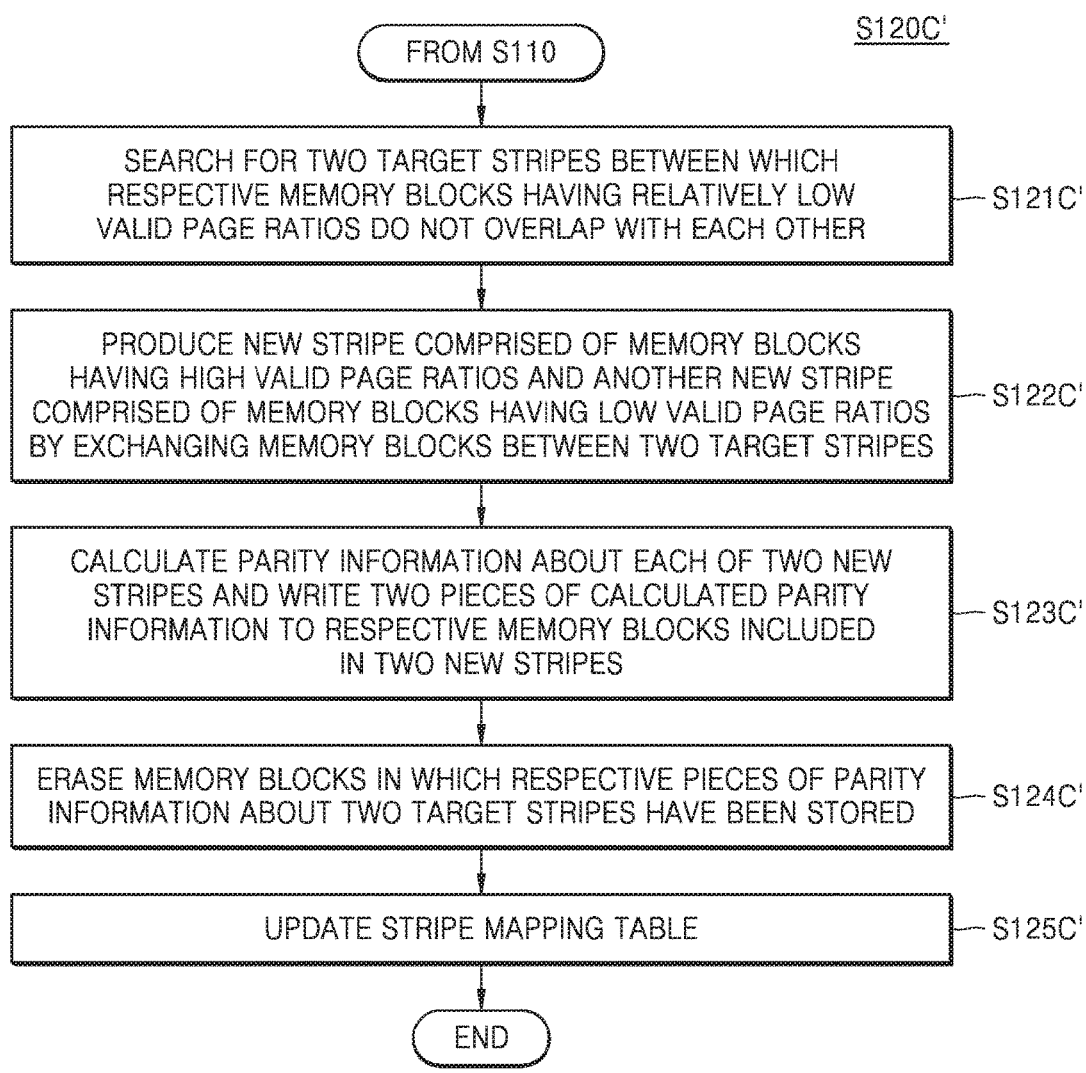
FIG. 44 is a flowchart of another example of the stripe reconstituting operation included in the stripe reconstituting method of FIG. 36.

Next, exemplary embodiments of performing stripe reconstitution by using the stripe cross-merging technique without garbage collection as illustrated in FIGS. 43 and 44 will be described.

FIG. 43 is a flowchart of an operation S120C, which is another example of operation S120 of FIG. 36.

In operation S121C, the storage system searches for another target stripe in which a memory block having a relatively low valid page ratio does not overlap a memory block having a relatively low valid page ratio from among the memory blocks included in the target stripe, which is an imbalanced stripe. For example, as illustrated in FIG. 18A, a stripe comprised of memory blocks #4 is selected as a first target stripe. Next, an imbalanced stripe in which memory blocks having relatively low valid page ratios do not overlap memory blocks having relatively low valid page ratios from among the memory blocks included in the first target stripe is selected as a second target stripe. For example, as illustrated in FIG. 18A, a stripe comprised of memory blocks #5 is selected as a second target stripe.

Next, in operation S122C, the storage system regroups the memory blocks constituting the first and second target stripes such that a new stripe comprised of memory blocks having high valid page ratios and another new stripe comprised of memory blocks having low valid page ratios are produced. For example, as shown in FIG. 18B, the two new stripes may be produced by exchanging the memory blocks of the third and fourth SSDs 1300-3 and 1300-4 between the first and second target stripes. In other words, a new stripe comprised of a memory block #4 of the first SSD 1300-1 having a high valid page ratio, a memory block #4 of the second SSD 1300-2 having a high valid page ratio, a memory block #5 of the third SSD 1300-3 having a high valid page ratio, and a memory block #5 of the fourth SSD 1300-4 having a high valid page ratio may be produced, and another new stripe comprised of a memory block #5 of the first SSD 1300-1 having a low valid page ratio, a memory block #5 of the second SSD 1300-2 having a low valid page ratio, a memory block #4 of the third SSD 1300-3 having a low valid page ratio, and a memory block #4 of the fourth SSD 1300-4 having a low valid page ratio may be produced.

FIG. 44 is a flowchart of an operation S120C, which is another example of operation S120 of FIG. 36.

In operation S121C', the storage system searches for two target stripes between which respective memory blocks having relatively low valid page ratios do not overlap with each other. For example, as illustrated in FIG. 18A, two imbalanced stripes between which respective memory blocks having relatively low valid page ratios do not overlap with each other are selected as two target stripes.

Next, in operation S122C', the storage system produces a new stripe comprised of memory blocks having high valid page ratios and another new stripe comprised of memory blocks having low valid page ratios by exchanging memory blocks between the two target stripes. For example, as illustrated in FIGS. 18A and 18B, a new stripe comprised of a memory block #4 of the first SSD 1300-1 having a high valid page ratio, a memory block #4 of the second SSD 1300-2 having a high valid page ratio, a memory block #5 of the third SSD 1300-3 having a high valid page ratio, and a memory block #5 of the fourth SSD 1300-4 having a high valid page ratio may be produced, and another new stripe comprised of a memory block #5 of the first SSD 1300-1 having a low valid page ratio, a memory block #5 of the second SSD 1300-2 having a low valid page ratio, a memory block #4 of the third SSD 1300-3 having a low valid page ratio, and a memory block #4 of the fourth SSD 1300-4 having a low valid page ratio may be produced.

Next, in operation S123C', the storage system calculates parity information about each of the two new stripes and writes the two pieces of calculated parity information to respective memory blocks included in the two new stripes. For example, as illustrated in FIG. 18B, the respective pieces of parity information about the two new stripes are written to memory blocks #6 and #7 of the N-th SSD 1300-N.

Next, in operation S124C', the storage system erases the memory blocks in which the respective pieces of parity information about the two target stripes have been stored. For example, as illustrated in FIG. 18B, the memory blocks #4 and #5 of the N-th SSD 1300-N in which the respective pieces of parity information about the two target stripes have been stored are erased.

Next, in operation S125C', the storage system updates the stripe mapping table. In detail, the storage system adds information about the two new stripes to the stripe mapping table and deletes information about the two target stripes from the stripe mapping table.

Figure 45:
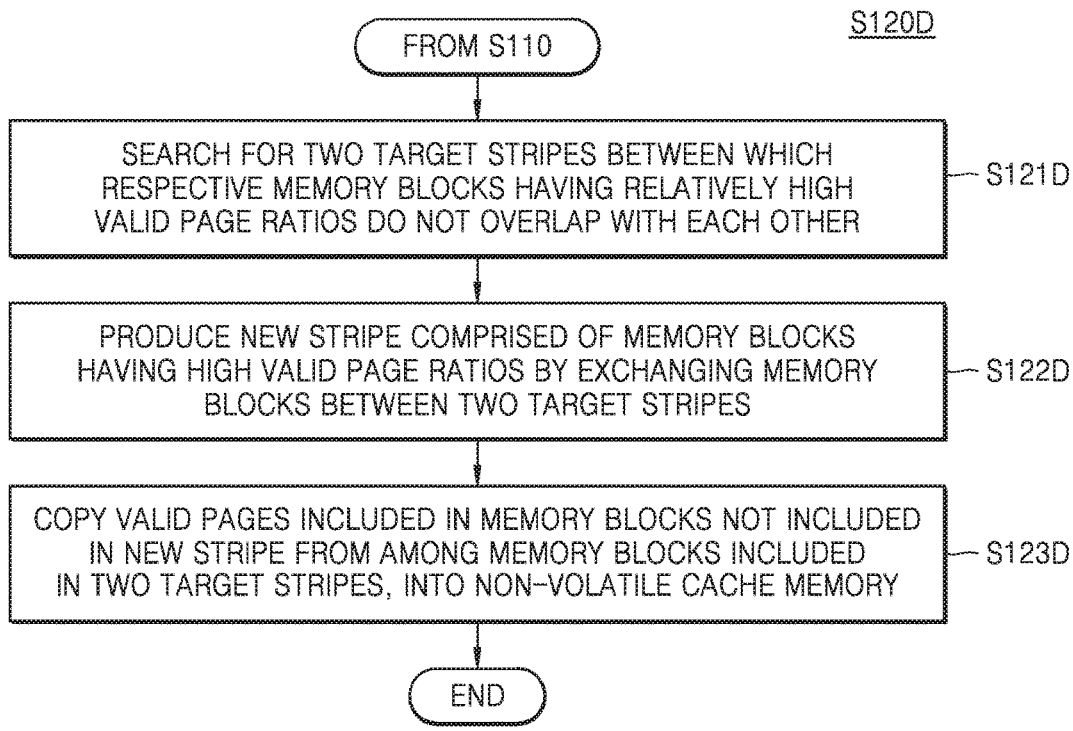
FIG. 45 is a flowchart of another example of the stripe reconstituting operation included in the stripe reconstituting method of FIG. 36.
Figure 46:
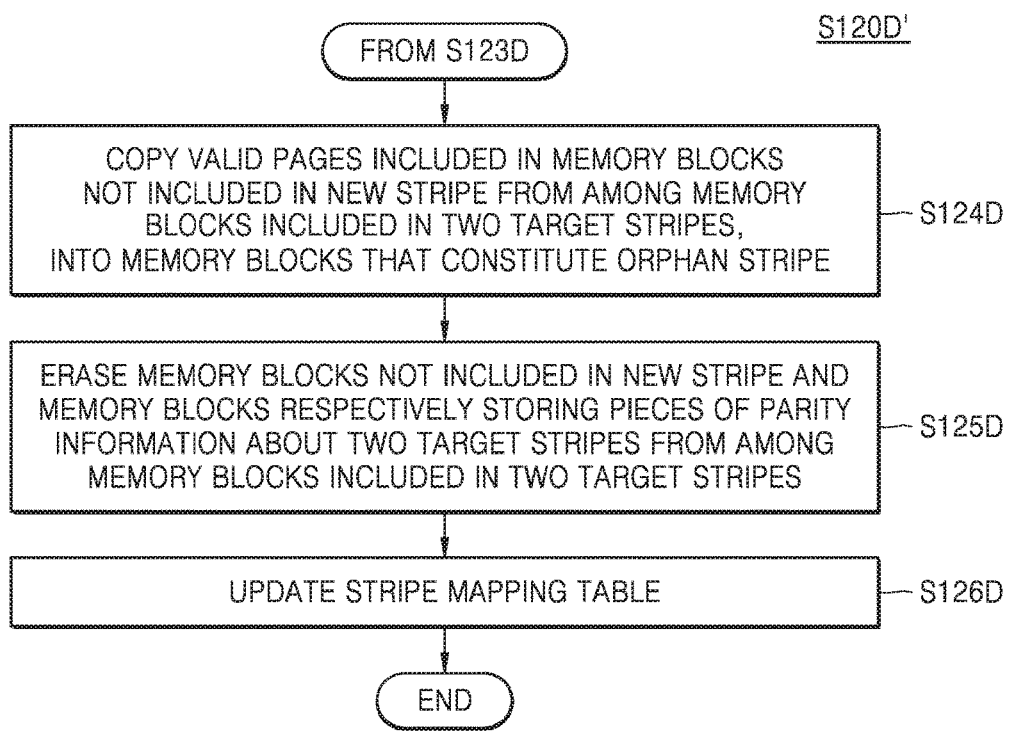
FIG. 46 is a flowchart of another example of the stripe reconstituting operation included in the stripe reconstituting method of FIG. 36.

Next, exemplary embodiments of performing stripe reconstitution by using the stripe cross-merging technique with garbage collection as illustrated in FIGS. 45 and 46 will be described.

FIG. 45 is a flowchart of an operation S120D, which is another example of operation S120 of FIG. 36.

In operation S121D, the storage system searches for two target stripes between which respective memory blocks having relatively high valid page ratios do not overlap with each other. For example, as illustrated in FIG. 19A, two imbalanced stripes between which respective memory blocks having relatively high valid page ratios do not overlap with each other are selected as two target stripes.

Next, in operation S122D, the storage system produces a new stripe comprised of memory blocks having high valid page ratios by exchanging memory blocks between the two target stripes. For example, as illustrated in FIGS. 19A and 19B, a new stripe comprised of a memory block #4 of the first SSD 1300-1 having a high valid page ratio, a memory block #4 of the second SSD 1300-2 having a high valid page ratio, a memory block #5 of the third SSD 1300-3 having a high valid page ratio, and a memory block #5 of the fourth SSD 1300-4 having a high valid page ratio is produced by exchanging memory blocks between the two target stripes, which are two imbalanced stripes.

Next, in operation S123D, the storage system copies the valid pages included in memory blocks not included in the new stripe from among the memory blocks included in the two target stripes, into a non-volatile cache memory. For example, as illustrated in FIG. 19B, the storage system copies the valid pages included in the memory block #5 of the first SSD 1300-1, the memory block #5 of the second SSD 1300-2, the memory block #4 of the third SSD 1300-3, and the memory block #4 of the fourth SSD 1300-4, which are not included in the new stripe from among the memory blocks included in the two target stripes, into the orphan cache 1200-1 of the NVRAM 1200.

FIG. 46 is a flowchart of an operation S120D', which is another example of operation S120 of FIG. 36.

After performing operation S123D of FIG. 45, in operation S124D, the storage system copies the valid pages included in memory blocks not included in the new stripe from among the memory blocks included in the two target stripes, into memory blocks that constitute an orphan stripe. For example, as illustrated in FIG. 19B, the storage system copies the valid pages included in the memory block #5 of the first SSD 1300-1, the memory block #5 of the second SSD 1300-2, the memory block #4 of the third SSD 1300-3, and the memory block #4 of the fourth SSD 1300-4, which are not included in the new stripe from among the memory blocks included in the two target stripes, into the memory blocks #M of the first through fourth SSDs 1300-1 through 1300-4, which constitute an orphan stripe.

Next, in operation S125D, the storage system erases the memory blocks not included in the new stripe and memory blocks respectively storing pieces of parity information about the two target stripes from among the memory blocks included in the two target stripes. For example, as illustrated in FIG. 19B, the storage system erases the memory block #5 of the first SSD 1300-1, the memory block #5 of the second SSD 1300-2, the memory block #4 of the third SSD 1300-3, and the memory block #4 of the fourth SSD 1300-4, which are not included in the new stripe from among the memory blocks included in the two target stripes.

Next, in operation S126D, the storage system updates the stripe mapping table. In detail, the storage system adds information about the single new stripe to the stripe mapping table and deletes information about the two target stripes from the stripe mapping table.

Figure 47:
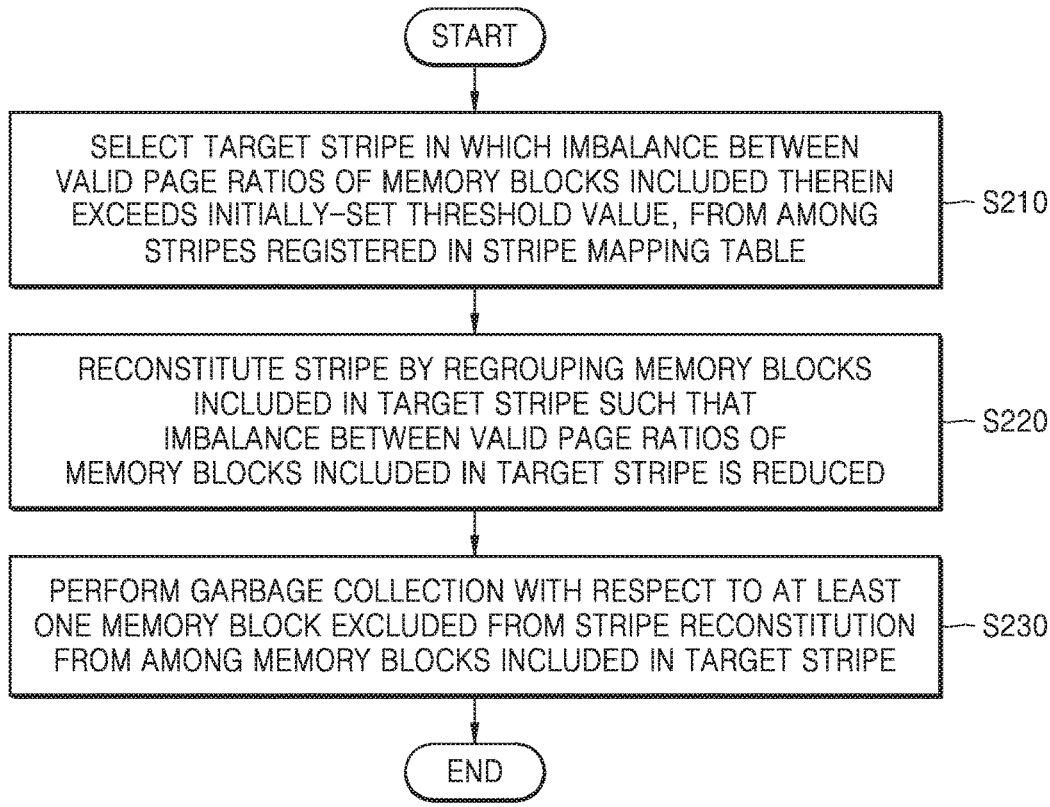
FIG. 47 is a flowchart of a method of performing garbage collection in a storage system according to an exemplary embodiment of the disclosure.

FIG. 47 is a flowchart of a garbage collection operation in a storage system according to an exemplary embodiment of the disclosure.

First, in operation S210, the storage system selects a target stripe in which an imbalance between the valid page ratios of memory blocks included therein exceeds an initially-set threshold value, from among stripes registered in a stripe mapping table. Operation S210 is substantially the same as operation S110 of FIG. 36, and thus a repeated description thereof will be omitted.

Then, in operation S220, the storage system reconstitutes a stripe by regrouping the memory blocks included in the target stripe such that an imbalance between the valid page ratios of the memory blocks included in the target stripe is reduced. Operation S220 is substantially the same as operation S120 of FIG. 36, and thus a repeated description thereof will be omitted.

Next, in operation S230, the storage system performs garbage collection with respect to at least one memory block excluded from stripe reconstitution from among the memory blocks included in the target stripe. For example, while stripe reconstitution is being performed using the memory block sharing technique, the stripe size shrinking technique, the stripe cross-merging technique without garbage collection, or the stripe cross-merging technique with garbage collection, garbage collection is performed with respect to memory blocks excluded from new stripe constitution from among the memory blocks included in the target stripe. In other words, during stripe reconstitution, garbage collection is performed to convert the memory blocks excluded from new stripe constitution from among the memory blocks included in the target stripe into free blocks.

Figure 48:
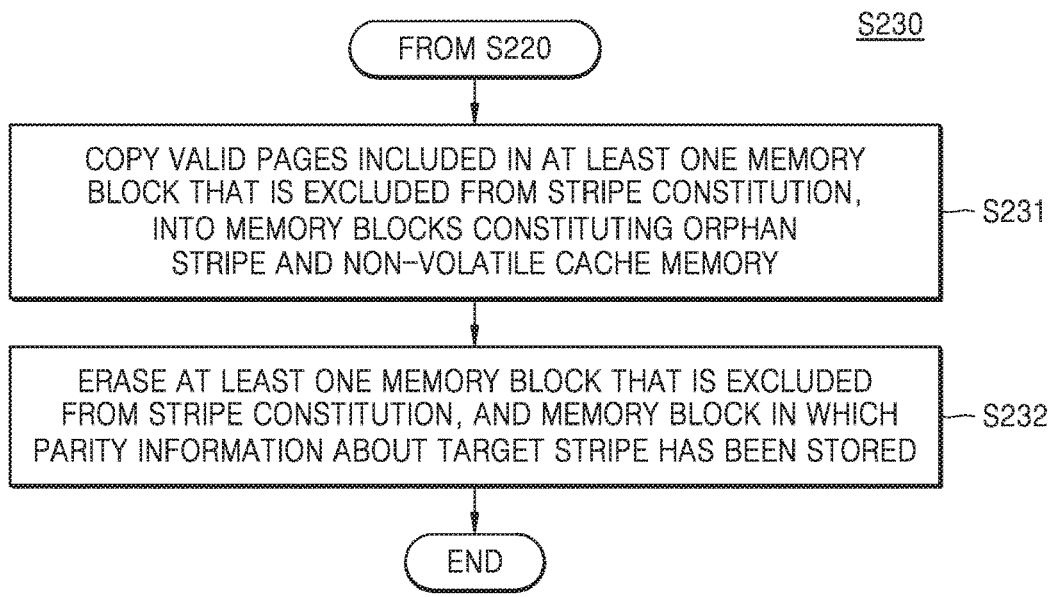
FIG. 48 is a flowchart of a garbage collection performing operation included in the method of performing garbage collection of FIG. 47.

FIG. 48 is a flowchart of operation S230 of FIG. 47.

In operation S231, the storage system copies the valid pages included in the at least one memory block that is excluded from the stripe constitution, into memory blocks constituting an orphan stripe and a non-volatile cache memory. For example, the non-volatile cache memory may be the NVRAM 1200 or 103 of the storage system of FIGS. 1-4. As another example, the NVRAM cache regions 3300-1A and 4100-2 of FIGS. 26 and 31 may be used as the non-volatile cache memory. The orphan stripe is a stripe designated as a stripe into which valid pages are copied during garbage collection.

Next, in operation S232, the storage system erases the at least one memory block that is excluded from the stripe constitution, and the memory block in which the parity information about the target stripe has been stored. After this erase operation is completed, the at least one memory block becomes a free block.

Meanwhile, a storage system according to the disclosure may be mounted by using various types of packages, e.g., a package on package (POP), a ball grid array (BGA), a chip scale package (CSP), a plastic leaded chip carrier (PLCC), a plastic dual in-line package (PDIP), a die in waffle pack, a die in wafer form, a chip on board (COB), a ceramic dual in-line package (CERDIP), a plastic metric quad flat pack (MQFP), a thin quad flat pack (TQFP), a small-outline integrated circuit (SOIC), a shrink small outline package (SSOP), a thin small outline package (TSOP), a system in package (SIP), a multi chip package (MCP), a wafer-level fabricated package (WFP), and a wafer-level processed stack package (WSP).

While the disclosure has been particularly shown and described with reference to exemplary embodiments thereof, it will be understood that various changes in form and details may be made therein without departing from the spirit and scope of the following claims.

What is claimed is:

1. A stripe reconstituting method in a log-structured storage system, the stripe reconstituting method comprising:
   identifying, based on an analysis for an imbalance between valid page ratios of memory blocks included in a target stripe that exceeds an initially-set threshold value;
   selecting, by a memory controller, the target stripe in which the imbalance between valid page ratios of memory blocks included in the target stripe exceeds the initially-set threshold value, from among stripes produced in the log-structured storage system; and
   reconstituting, by the memory controller, a stripe by regrouping the memory blocks included in the target stripe such that the imbalance between the valid page ratios of the memory blocks included in the target stripe is reduced.

2. The stripe reconstituting method of claim 1, wherein, in the selecting of the target stripe, a stripe in which valid page ratios of at least one memory block in the stripe are less than an initially-set first threshold value and valid page ratios of remaining memory blocks in the stripe are greater than an initially-set second threshold value is selected as the target stripe, and the initially-set second threshold value is greater than the initially-set first threshold value.

3. The stripe reconstituting method of claim 2, wherein, in the selecting of the target stripe, when there exists a plurality of stripes in each of which valid page ratios of at least N (where N is an integer equal to or greater than 1) memory blocks are less than the initially-set first threshold value and valid page ratios of remaining memory blocks are greater than the initially-set second threshold value, a single target stripe is selected from the plurality of stripes, based on at least one selected from a descending order of values of N, an ascending order of valid page ratios that are less than the first threshold value, and a descending order of valid page ratios that are greater than the second threshold value.

4. The stripe reconstituting method of claim 1, wherein, in the reconstituting of the stripe, the memory blocks of the target stripe are regrouped such that at least one target memory block having a low valid page ratio from among the memory blocks included in the target stripe is replaced by a memory block having a higher valid page ratio than the at least one target memory block from among memory blocks included in another stripe.

5. The stripe reconstituting method of claim 4, wherein the reconstituting of the stripe comprises:
   selecting at least one memory block having a high valid page ratio from among the memory blocks included in the other stripe in order to replace the at least one target memory block having a low valid page ratio in the target stripe;
   producing a new stripe by replacing the at least one target memory block having a low valid page ratio in the target stripe with the at least one memory block having a high valid page ratio in the other stripe; and
   writing parity information about the new stripe to a memory block included in the new stripe.

6. The stripe reconstituting method of claim 5, wherein the selecting of the at least one memory block comprises selecting a replacement memory block from a storage device in which the memory block to be replaced in the target stripe exists.

7. The stripe reconstituting method of claim 5, wherein the parity information about the new stripe is calculated by performing an XOR calculation on the parity information about the target stripe, data stored in the memory block that is replaced, and data stored in a replacement memory block.

8. The stripe reconstituting method of claim 5, further comprising:
   adding information about the new stripe to a stripe mapping table and deleting information about the target stripe from the stripe mapping table.

9. The stripe reconstituting method of claim 5, wherein the reconstituting of the stripe comprises:
   copying valid pages included in the at least one target memory block replaced in the target stripe into a non-volatile cache memory; and
   erasing a memory block in which the parity information about the target stripe has been stored.

10. The stripe reconstituting method of claim 5, wherein the reconstituting of the stripe comprises:
    copying valid pages included in the at least one target memory block replaced in the target stripe into memory blocks constituting an orphan stripe and a non-volatile cache memory; and
    erasing the at least one target memory block replaced in the target stripe and a memory block in which the parity information about the target stripe has been stored,
    wherein, the orphan stripe is a stripe designated as a stripe into which valid pages are copied during garbage collection.

11. The stripe reconstituting method of claim 5, further comprising:
    updating information about a number of stripes formed by each of the memory blocks included in the target stripe and information about a number of stripes formed by each of the memory blocks included in the new stripe.

12. The stripe reconstituting method of claim 1, wherein, in the reconstituting of the stripe, the memory blocks of the target stripe are regrouped such that at least one target memory block having a low valid page ratio from among the memory blocks included in the target stripe is excluded from the target stripe.

13. The stripe reconstituting method of claim 12, wherein the reconstituting of the stripe comprises:
producing a new stripe by excluding the at least one target memory block from the target stripe;
calculating parity information about the new stripe and writing the calculated parity information to a memory block included in the new stripe; and
adding information about the new stripe to a stripe mapping table and deleting information about the target stripe from the stripe mapping table.

14. The stripe reconstituting method of claim 13, wherein the reconstituting of the stripe comprises:
copying valid pages included in the at least one target memory block excluded from the target stripe into memory blocks constituting an orphan stripe and a non-volatile cache memory; and
erasing the at least one target memory block excluded from the target stripe and a memory block in which the parity information about the target stripe has been stored,
wherein, the orphan stripe is a stripe designated as a stripe into which valid pages are copied during garbage collection.

15. The stripe reconstituting method of claim 1, wherein the reconstituting of the stripe comprises searching for another target stripe in which a memory block having a relatively low valid page ratio does not overlap a memory block having a relatively low valid page ratio from among the memory blocks included in the target stripe, and exchanging memory blocks between the target stripe and the other target stripe to produce a new stripe comprised of memory blocks having high valid page ratios and another new stripe comprised of memory blocks having low valid page ratios.

16. The stripe reconstituting method of claim 15, wherein the reconstituting of the stripe comprises:
producing the new stripe comprised of memory blocks having high valid page ratios and the other new stripe comprised of memory blocks having low valid page ratios by exchanging memory blocks between the target stripe and the other target stripe;
calculating parity information about each of the new stripe and the other new stripe and writing each of the calculated parity information to respective memory blocks included in the new stripe and the other new stripe;
erasing the memory blocks in which respective pieces of parity information about the target stripe and the other target stripe have been stored; and
adding information about the new stripe and the other new stripe to a stripe mapping table and deleting information about the target stripe and the other target stripe from the stripe mapping table.

17. The stripe reconstituting method of claim 1, wherein the reconstituting of the stripe comprises:
searching for another target stripe in which a memory block having a relatively high valid page ratio does not overlap a memory block having a relatively high valid page ratio from among the memory blocks included in the target stripe, and producing a single new stripe comprised of memory blocks having high valid page ratios by exchanging memory blocks between the target stripe and the other target stripe; and
copying valid pages included in memory blocks not included in the new stripe from among the memory blocks included in the target stripe and the other target stripe, into a non-volatile cache memory.

18. The stripe reconstituting method of claim 17, wherein the reconstituting of the stripe comprises:
copying the valid pages included in the memory blocks not included in the new stripe from among the memory blocks included in the target stripe and the other target stripe, into memory blocks that constitute an orphan stripe;
erasing the memory blocks not included in the new stripe and memory blocks respectively storing pieces of parity information about the target stripe and the other target stripe from among the memory blocks included in the target stripe and the other target stripe; and
adding information about the single new stripe to a stripe mapping table and deleting information about the target stripe and the other target stripe from the stripe mapping table.

19. A storage system comprising:
a plurality of storage devices (SDs) comprising memory blocks for storing data;
a main memory which stores a stripe mapping table comprising information about a constitution of stripes; and
a controller which controls the plurality of SDs based on a log-structured storage environment,
wherein the controller identifies, based on an analysis for an imbalance between valid page ratios of memory blocks included in a target stripe that exceeds an initially-set threshold value; selects the target stripe in which the imbalance between the valid page ratios of memory blocks included in the target stripe exceeds the initially-set threshold value, from stripes registered in the stripe mapping table, reconstitutes a stripe by regrouping the memory blocks included in a found target stripe in order to reduce the imbalance between the valid page ratios of the memory blocks included in the target stripe to obtain a reconstituted stripe, and updates the stripe mapping table based on the reconstituted stripe.

20. The storage system of claim 19, wherein the plurality of SDs comprise a plurality of solid state drives (SSDs).

* * * * *